United States Patent
Ishikawa et al.

(10) Patent No.: US 6,693,658 B2
(45) Date of Patent: Feb. 17, 2004

(54) LIGHT BEAM SCANNING APPARATUS

(75) Inventors: Daisuke Ishikawa, Tokyo (JP); Koji Tanimoto, Kawasaki (JP); Kenichi Komiya, Kawasaki (JP); Koji Kawai, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 167 days.

(21) Appl. No.: 10/022,699

(22) Filed: Dec. 20, 2001

(65) Prior Publication Data

US 2003/0117483 A1 Jun. 26, 2003

(51) Int. Cl.[7] ................................................. B41J 2/435
(52) U.S. Cl. ....................................... 347/236; 347/246
(58) Field of Search ................................. 347/234, 235, 347/236, 241, 246, 248, 250, 256; 250/236; 356/609; 369/44.25

(56) References Cited

U.S. PATENT DOCUMENTS

| | | | | |
|---|---|---|---|---|
| 4,424,442 A | * | 1/1984 | Kitamura | 250/236 |
| 5,448,359 A | * | 9/1995 | Schick et al. | 356/609 |
| 5,675,561 A | * | 10/1997 | Yoshioka | 369/44.25 |
| 5,892,533 A | | 4/1999 | Tanimoto et al. | 347/257 |
| 5,929,891 A | | 7/1999 | Komiya et al. | 347/235 |
| 5,995,246 A | | 11/1999 | Komiya et al. | 358/481 |
| 6,188,424 B1 | | 2/2001 | Komiya et al. | 347/235 |
| 6,208,367 B1 | | 3/2001 | Tanimoto et al. | 347/235 |
| 6,243,123 B1 | | 6/2001 | Tanimoto et al. | 347/235 |
| 6,297,839 B1 | | 10/2001 | Komiya et al. | 347/129 |
| 6,392,684 B1 | | 5/2002 | Tanimoto et al. | 347/234 |
| 6,411,321 B2 | | 6/2002 | Tanimoto et al. | 347/235 |
| 6,426,767 B1 | | 7/2002 | Tanimoto et al. | 347/115 |
| 6,462,855 B1 | | 10/2002 | Komiya et al. | 359/212 |
| 6,496,212 B1 | | 12/2002 | Tanimoto et al. | 347/234 |
| 6,509,921 B2 | | 1/2003 | Komiya et al. | 347/235 |

* cited by examiner

Primary Examiner—Hai Pham
(74) Attorney, Agent, or Firm—Foley & Lardner

(57) ABSTRACT

When a light beam scans a scanned surface in a horizontal scan direction, a sensor is arranged on the scanned surface or a position equivalent to the scanned surface. The sensor converts a light quantity of the light beam into an electric signal to be output. The light beam's passage position is gradually moved in a vertical scan direction to detect a maximum value of the electric signal output from the sensor. When the detected maximum value is smaller than a specified reference value, the light beam is determined to be defocused.

21 Claims, 34 Drawing Sheets

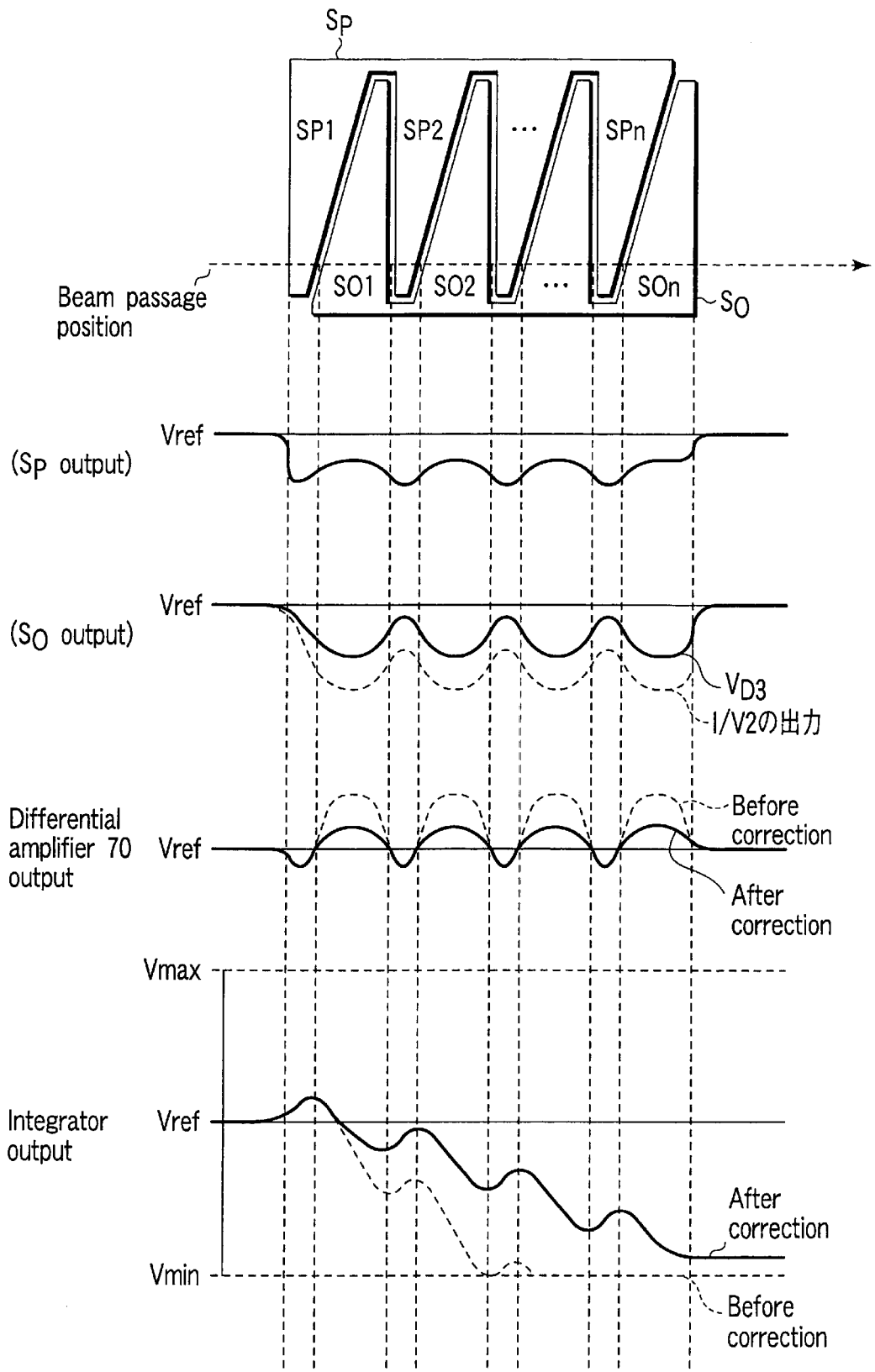
F I G. 16

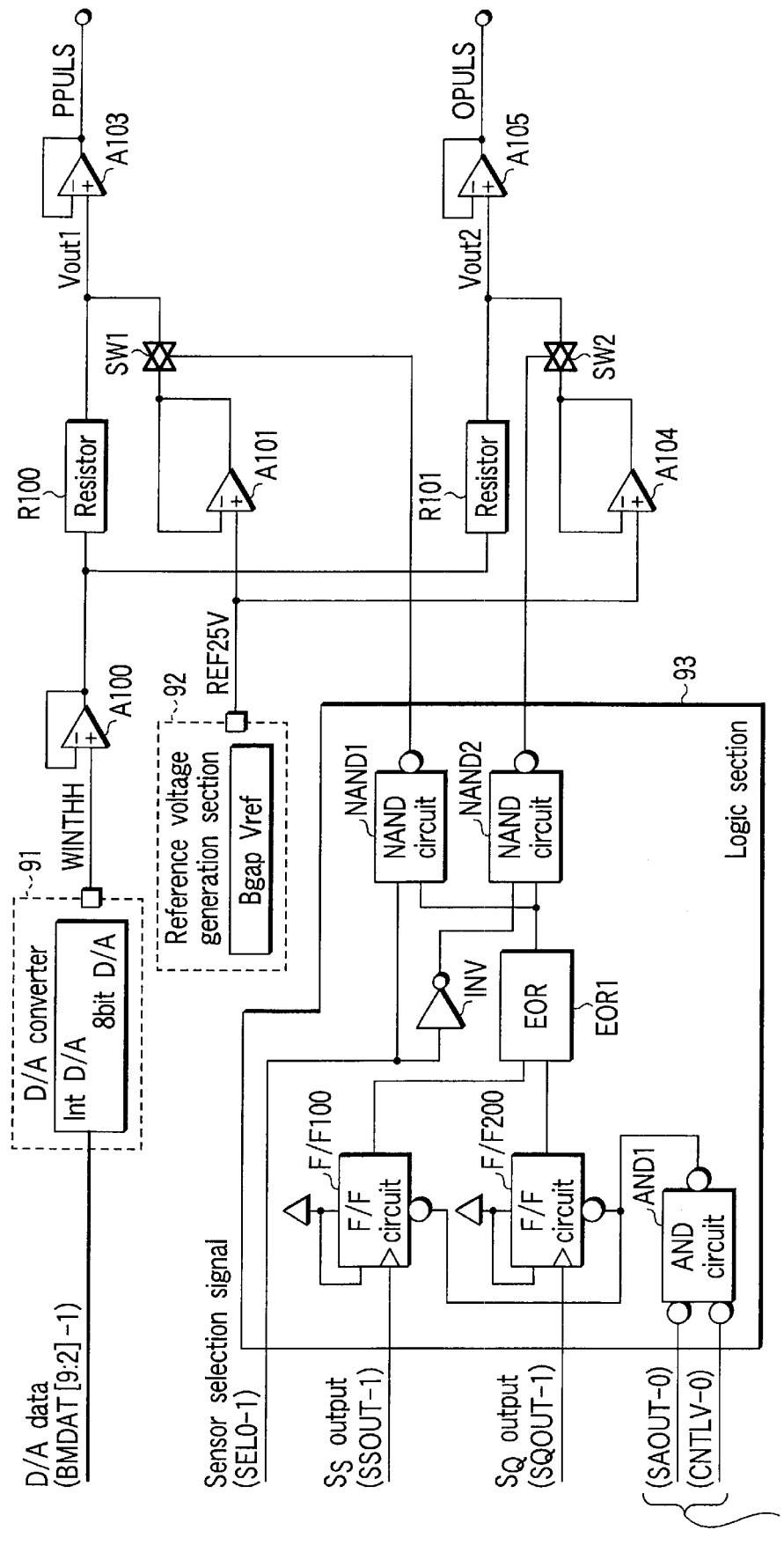
F I G. 19

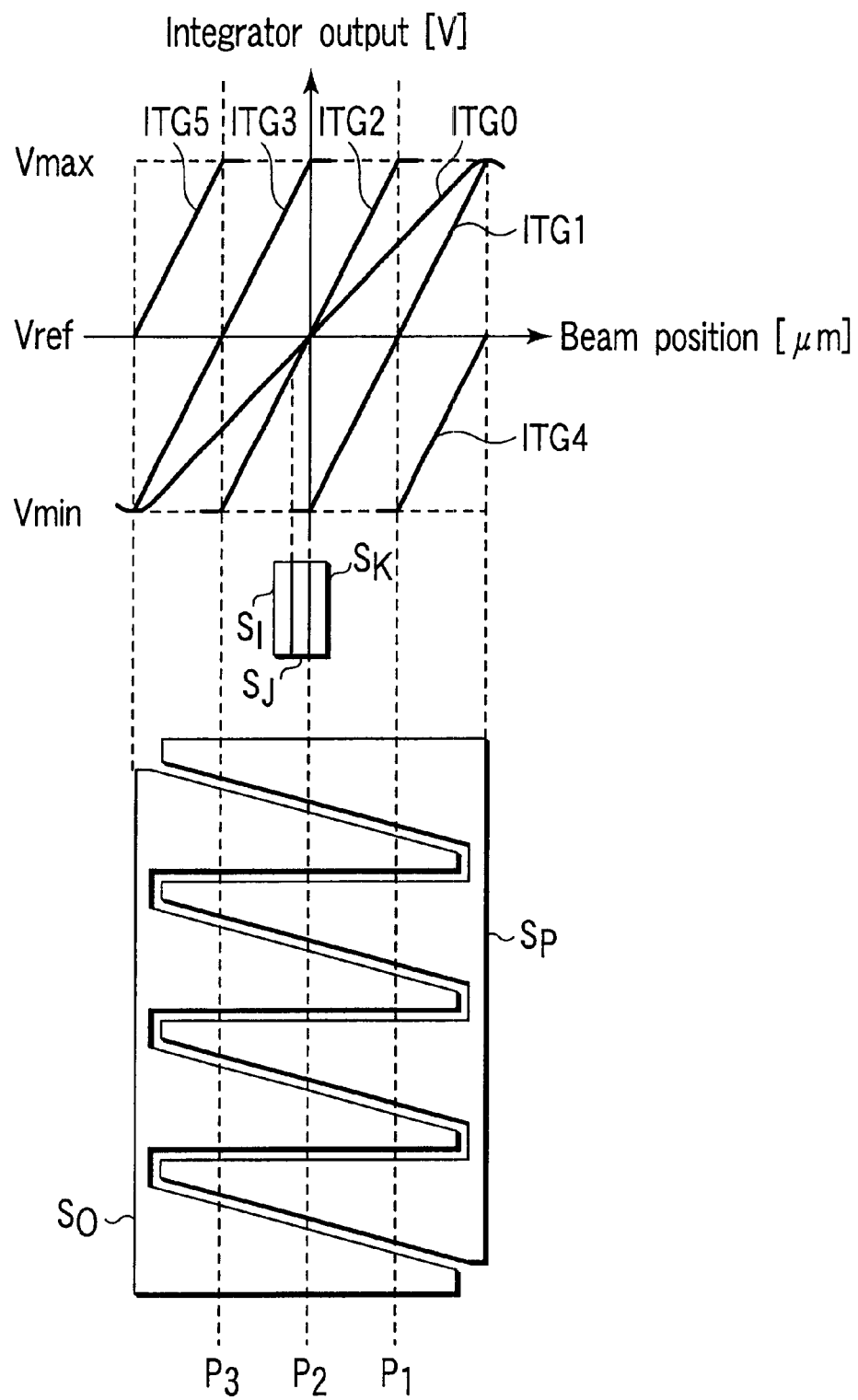
F I G. 25

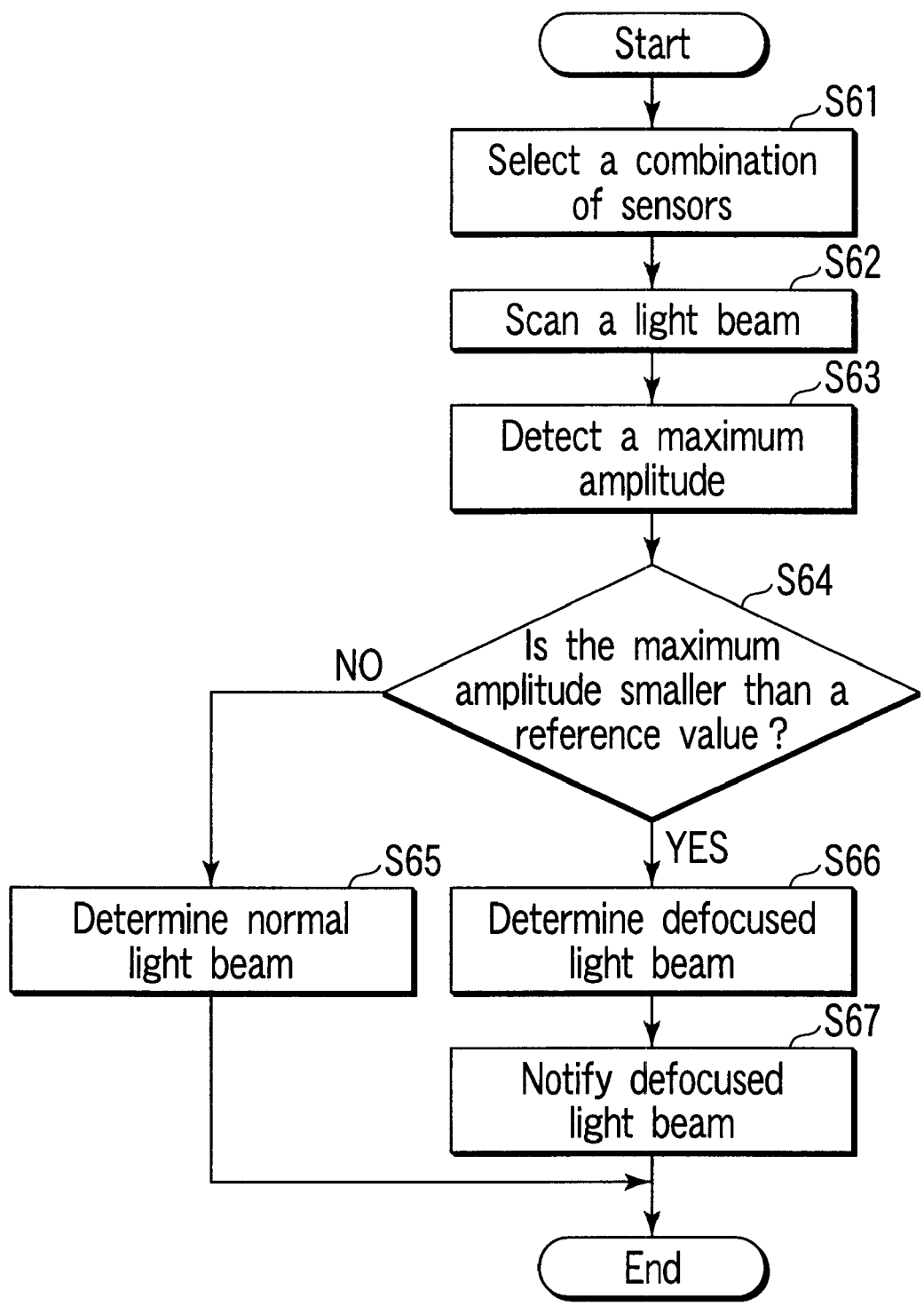
F I G. 29

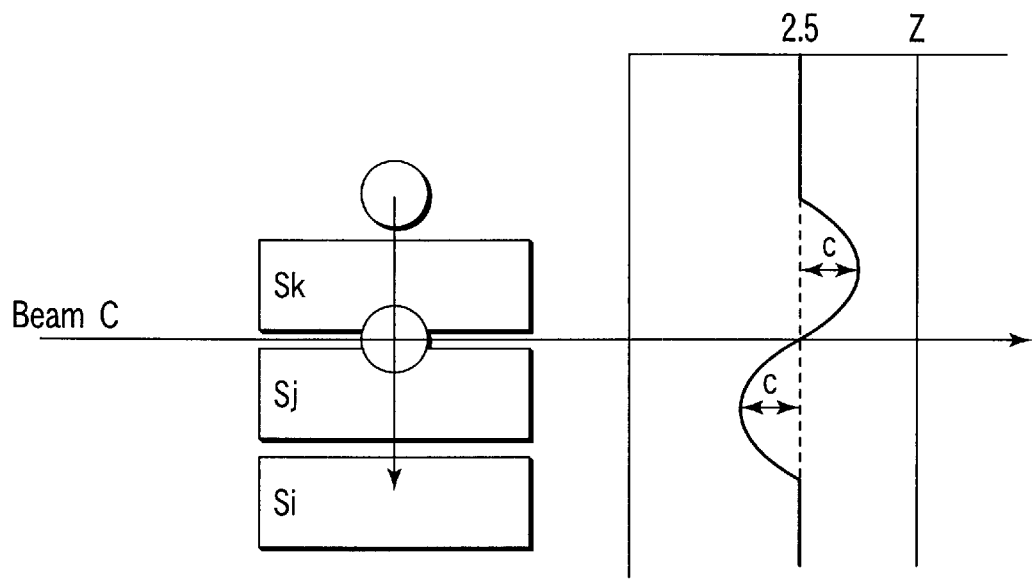
F I G. 30
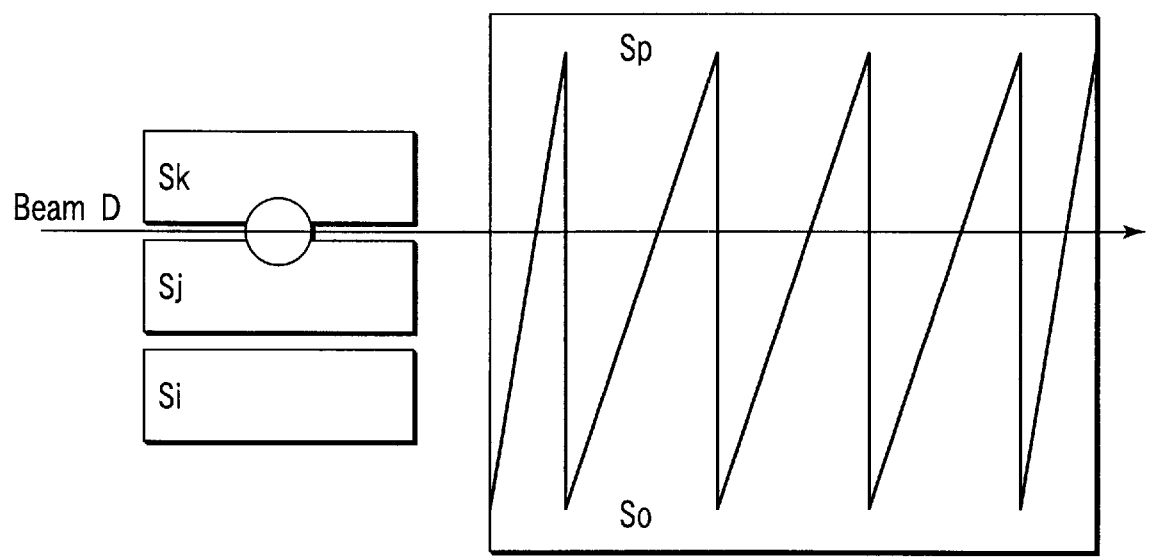
F I G. 31

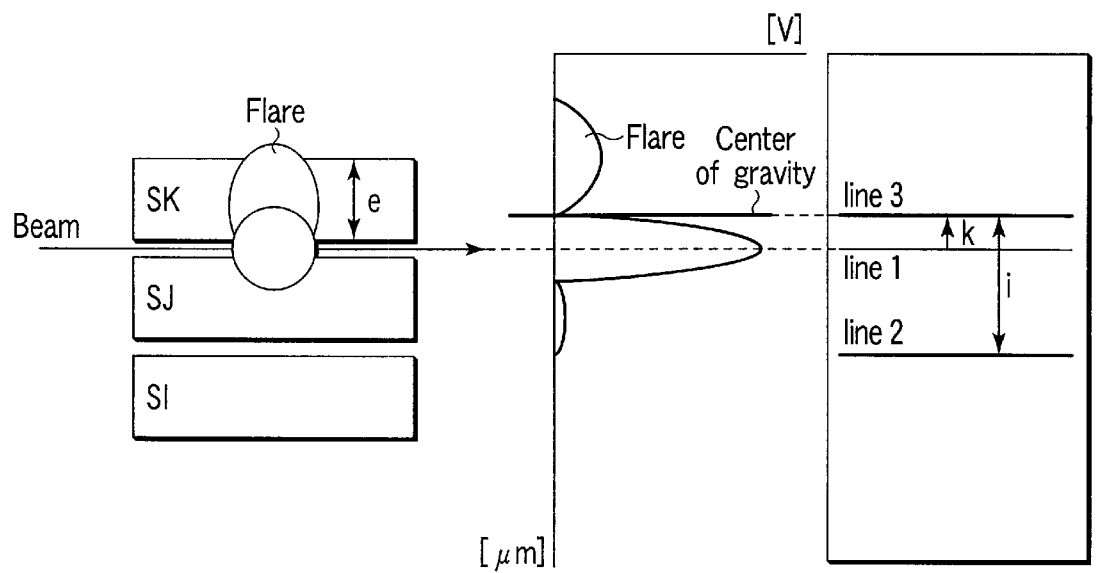
F I G. 39
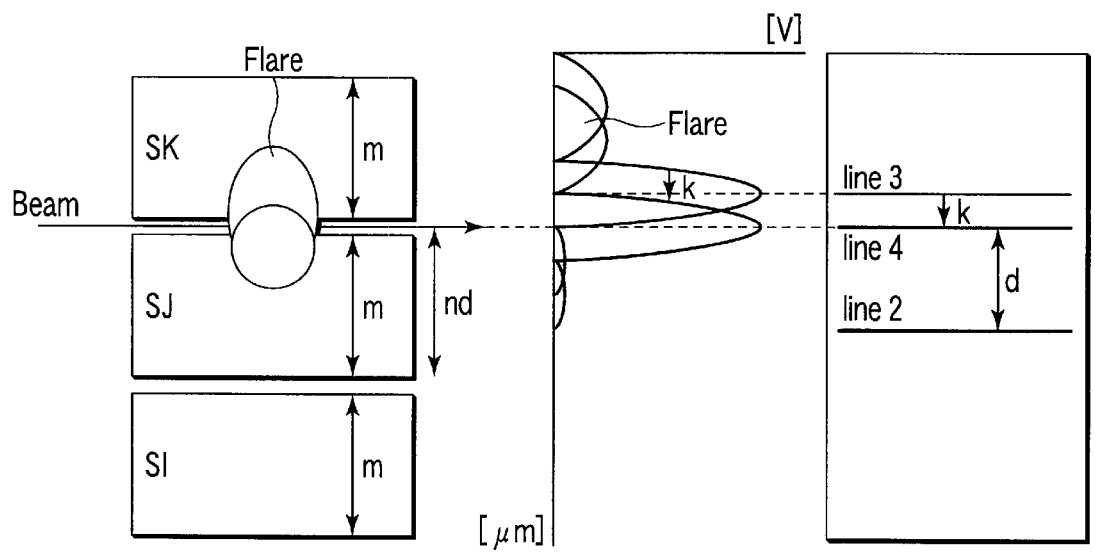
F I G. 40

LIGHT BEAM SCANNING APPARATUS

BACKGROUND OF THE INVENTION

The present invention relates to a light beam scanning apparatus for scanning a plurality of laser beams in an image formation apparatus such as a digital copier or a laser printer which forms a single electrostatic latent image on a single photoconductor drum by simultaneously performing scanning and exposure on the photoconductor drum by using the plurality of laser beams.

In recent years, there have been developed various digital copiers according to scanning and exposure using a laser light beam (hereafter referred to as the light beam) and an electrophotographic process.

Recently, a multi-beam digital copier is developed for increasing an image formation speed. The multi-beam system generates a plurality of light beams and simultaneously scans a plurality of lines using these light beams.

Such a multi-beam digital copier is equipped with a semiconductor laser oscillator for generating a plurality of light beams and an optical unit as a light beam scanning apparatus. The optical unit chiefly comprises a rotating polygon such as a polygon mirror, a collimator lens and an f-θ lens for reflecting each light beam from the plurality of laser oscillators toward a photoconductor drum and scanning on a photoconductor drum using each light beam.

Conventionally, the optical unit of the multi-beam digital copier controls scanning direction exposure positions and passage positions of light beams. The scanning direction exposure position control relates to controlling light beam positions in a horizontal scan direction. The passage position control relates to controlling light beam positions in a vertical scan direction.

An embodiment of this technology is proposed in U.S. patent application Ser. No. 9/667,317. According to the embodiment, a pair of sensors detect passage points of light beams scanning a photoconductor drum surface in the vertical scan direction in order to control light beam positions by detecting light beams with high precision in a wide range. Each of the pair of sensors is formed of a trapezoid pattern, for example. The pair of sensors are arranged at a position equivalent to the surface to be scanned and symmetrically to each other with a specified interval. A light beam scanning position is determined by a value obtained by integrating output differences from the pair of sensors.

U.S. patent application Ser. No. 9/816,773 proposes a pair of sensors comprising two sawtooth patterns for detecting a light beam. Like U.S. patent application Ser. No. 9/667,317, the proposal in Ser. No. 9/816,773 determines a light beam scanning position by using the processing circuit for integrating output differences from the pair of sensors.

However, when a light beam is defocused due to a chronological change in the optical system, etc., the light beam accuracy is degraded, disabling a correct image from being output. A similar phenomenon may occur when a light beam quantity becomes insufficient due to a chronological change, etc. In these cases, a conventional light beam scanning apparatus cannot easily detect light beam defocusing or insufficient power, causing the possibility of deteriorating the light beam accuracy and the output image quality.

Further, a complicatedly configured optical system may generate light called a flare near an irradiated light beam spot. This flare is not so serious as to affect a formed image, but may affect the light beam control. Due to the flare, the conventional light beam scanning apparatus may not be able to control the light beam to a specified position or control positioning of a plurality of light beams at a specified interval.

BRIEF SUMMARY OF THE INVENTION

It is an object of the present invention to provide light beam scanning apparatus capable of controlling a light beam with high precision.

A light beam scanning apparatus according to the present invention comprises: a light emitting device which generates a light beam; a light beam scanning member which scans a light beam against a scanned surface so that the light beam output from the light emitting device scans on the scanned surface in a horizontal scan direction; a sensor which is arranged on the scanned surface or a position equivalent to a scanned surface, detects a light beam scanned by the light beam scanning member, and outputs an electric signal; a mirror which changes a passage position for a vertical scan direction of a light beam scanned by the light beam scanning member in a horizontal scan direction; a detection section which detects a maximum value for an electric signal output from the sensor in response to a light beam with its passage position gradually moved by the mirror; and a control section which determines a normal light beam when a maximum value detected by the detection section is greater than a specified reference value, and determines a defocused light beam when the maximum value is smaller than a specified reference value.

A light beam scanning apparatus according to the present invention comprises: a light emitting device which generates a light beam; a light beam scanning member which scans a light beam against a scanned surface so that the light beam output from the light emitting device scans on the scanned surface in a horizontal scan direction; a sensor which is arranged on the scanned surface or a position equivalent to a scanned surface, detects a light beam scanned by the light beam scanning member, and outputs an electric signal; a mirror which changes a passage position for a vertical scan direction of a light beam scanned by the light beam scanning member in a horizontal scan direction; a detection section which detects a maximum value for an electric signal output from the sensor in response to a light beam with its passage position gradually moved by the mirror; and light quantity detection section which detects the light beam quantity when a maximum value detected by this detection section is smaller than a specified reference value; and a control section which determines a normal light beam when a maximum value detected by the detection section is greater than a specified reference value, determines an insufficient light beam quantity when the maximum value is smaller than a specified reference value and a light beam quantity detected by the light quantity detection section is smaller than a specified reference quantity, and determines a defocused light beam when the maximum value is smaller than a specified reference value and a light beam quantity detected by the light quantity detection section satisfies a specified reference quantity.

A light beam scanning apparatus according to the present invention comprises: a light emitting device which generates a light beam; a light beam scanning member which scans a light beam against a scanned surface so that the light beam output from the light emitting device scans on the scanned surface in a horizontal scan direction; a plurality of sensors each of which is formed wider than a width in a vertical scan direction of the light beam including light generated near an irradiated spot of the light beam, is arranged on the scanned surface or a position equivalent to a scanned surface so that a fine gap is provided in the horizontal scan direction, and outputs an electric signal corresponding to an irradiated light beam quantity. A mirror which changes a passage position for a vertical scan direction of a light beam scanned by the light beam scanning member in a horizontal scan direction; and a control section which controls a light beam's passage position by using the mirror so that a centrobaric position of the light beam quantity detected by two adjacent sensors out of the plurality of sensors matches a gap between the two sensors.

A light beam scanning apparatus according to the present invention comprises: a plurality of light emitting devices configured to output an light beam; a light beam scanning member which scans a light beam against a scanned surface so that the light beam output from the light emitting device scans on the scanned surface in a horizontal scan direction; a plurality of sensors each of which is formed wider than a width in a vertical scan direction of the light beam including light generated near an irradiated spot of the light beam, is arranged on the scanned surface or a position equivalent to a scanned surface so that a fine gap is provided in the horizontal scan direction, and outputs an electric signal corresponding to an irradiated light beam quantity; a mirror which changes a passage position for a vertical scan direction of a light beam scanned by the light beam scanning member in a horizontal scan direction; and a position detection sensor which is arranged on the scanned surface or a position equivalent to a scanned surface and continuously changes output values according to changes in scanning positions of the light beam; a control section which computes a difference between two output values, i.e., an output value from the position detection sensor when a centrobaric position for the light beam quantity matches a gap between first and second sensors adjacent to each other out of the plurality of sensors and an output value from the position detection sensor when a centrobaric position for the light beam quantity matches a gap between the second sensor and a third sensor adjacent thereto, and provides control so that an interval between light beams equals the computed difference.

A light beam scanning apparatus according to the present invention comprises: a light emitting means for outputting a light beam; a light beam scanning means for scanning a light beam output from this light emitting means onto a scanned surface in a horizontal scan direction; a detection means, arranged on the scanned surface or a position equivalent to a scanned surface, for detecting a light beam scanned by the light beam scanning means, and outputting an electric signal; a change means for changing a passage position for a vertical scan direction of a light beam scanned by the light beam scanning means in a horizontal scan direction; a detection means for detecting a maximum value for an electric signal output from the detection means in response to a light beam with its passage position gradually moved by change means; and a control means for determining a normal light beam when a maximum value detected by the detection means is greater than a specified reference value, and for determining a defocused light beam when the maximum value is smaller than a specified reference value.

A light beam scanning apparatus according to the present invention comprises: a light emitting means for outputting a light beam; a light beam scanning means for scanning a light beam output from this light emitting means onto a scanned surface in a horizontal scan direction; a detection means, arranged on the scanned surface or a position equivalent to a scanned surface, for detecting a light beam scanned by the light beam scanning means, and outputting an electric signal; a change means for changing a passage position for a vertical scan direction of a light beam scanned by the light beam scanning means in a horizontal scan direction; a detection means for detecting a maximum value for an electric signal output from the detection means in response to a light beam with its passage position gradually moved by change means; and a light quantity detection means for detecting the light beam quantity when a maximum value detected by this detection means is smaller than a specified reference value; and a control means for determining a normal light beam when a maximum value detected by the detection means is greater than a specified reference value, determining an insufficient light beam quantity when the maximum value is smaller than a specified reference value and a light beam quantity detected by the light quantity detection means is smaller than a specified reference quantity, and determining a defocused light beam when the maximum value is smaller than a specified reference value and a light beam quantity satisfies a specified reference quantity.

A light beam scanning apparatus according to the present invention comprises: a light emitting means for outputting a light beam; a light beam scanning means for scanning a light beam output from this light emitting means onto a scanned surface in a horizontal scan direction; a plurality of detection means each of which is formed wider than a width in a vertical scan direction of the light beam including light generated near an irradiated spot of the light beam, is arranged on the scanned surface or a position equivalent to a scanned surface so that a fine gap is provided in the horizontal scan direction, and outputs an electric signal corresponding to an irradiated light beam quantity; a change means for changing a passage position for a vertical scan direction of a light beam scanned by the light beam scanning means in a horizontal scan direction; and a control means for controlling a light beam's passage position by using the change means so that a centrobaric position of the light beam quantity detected by two adjacent detection means out of the plurality of detection means matches a gap between the two detection means.

A light beam scanning method according to the present invention comprises: scanning a light beam output from a light emitting device onto a scanned surface in a horizontal scan direction; detecting a light beam scanned in a horizontal scan direction and outputting an electric signal by using a sensor which is arranged on the scanned surface or a position equivalent to a scanned surface; gradually moving a passage position for a vertical scan direction of the light beam scanned in a horizontal scan direction; detecting a maximum value for an electric signal output from the sensor in response to a light beam with its passage position gradually moved; determining a normal light beam when the detected maximum value is greater than a specified reference value; detecting the light beam quantity by using a light quantity detection section when the maximum value is smaller than a specified reference value; determining an insufficient light beam quantity when the maximum value is smaller than a specified reference value and the light beam quantity is smaller than a specified reference quantity; and determining a defocused light beam when the maximum value is smaller than a specified reference value and a light beam quantity satisfies a specified reference quantity.

A light beam scanning method according to the present invention comprises the steps of: scanning a light beam output from a light emitting device onto a scanned surface in a horizontal scan direction; detecting a light beam scanned in a horizontal scan direction and outputting an electric signal by using a sensor which is arranged on the scanned surface or a position equivalent to a scanned surface; gradually moving a passage position for a vertical scan direction of the light beam scanned in a horizontal scan direction; detecting a maximum value for an electric signal output from the sensor in response to a light beam with its passage position gradually moved; determining a normal light beam when a maximum value detected by this step is greater than a specified reference value; and determining a defocused light beam when the maximum value is smaller than a specified reference value.

A light beam scanning method according to the present invention comprises the steps of: scanning a light beam output from a light emitting device onto a scanned surface in a horizontal scan direction; detecting a light beam scanned in a horizontal scan direction and outputting an electric signal by using a sensor which is arranged on the scanned surface or a position equivalent to a scanned surface; gradually moving a passage position for a vertical scan direction of the light beam scanned in a horizontal scan direction; detecting a maximum value for an electric signal output from the sensor in response to a light beam with its passage position gradually moved; determining a normal light beam when this detected maximum value is greater than a specified reference value; detecting the light beam quantity by using a light quantity detection section when the maximum value is smaller than a specified reference value; determining an insufficient light beam quantity when the maximum value is smaller than a specified reference value and the light beam quantity is smaller than a specified reference quantity; and determining a defocused light beam when the maximum value is smaller than a specified reference value and a light beam quantity satisfies a specified reference quantity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 exemplifies a sensor output, a differential amplifier output, and an integrator output according to a light beam passage position;

FIG. 19 shows a schematic configuration example of a correction pulse generation circuit;

FIG. 25 shows relationship between a light beam passage position and an integration output;

FIG. 29 is a flowchart describing an operation of detecting the light beam defocus;

FIG. 30 exemplifies a light beam with a smaller light quantity than a specified quantity;

FIG. 31 shows a configuration example of sensors SP and SO for detecting a light quantity;

FIG. 39 shows relationship between the flare for a light beam and sensors; and

FIG. 40 is a configuration example of sensors for detecting a light beam including the flare.

DETAILED DESCRIPTION OF THE INVENTION

Embodiments of the present invention will be described in further detail with reference to the accompanying drawings.

First, the following describes a light beam scanning apparatus and an image formation apparatus to which the embodiments of the present invention are applied.

Figure 1:
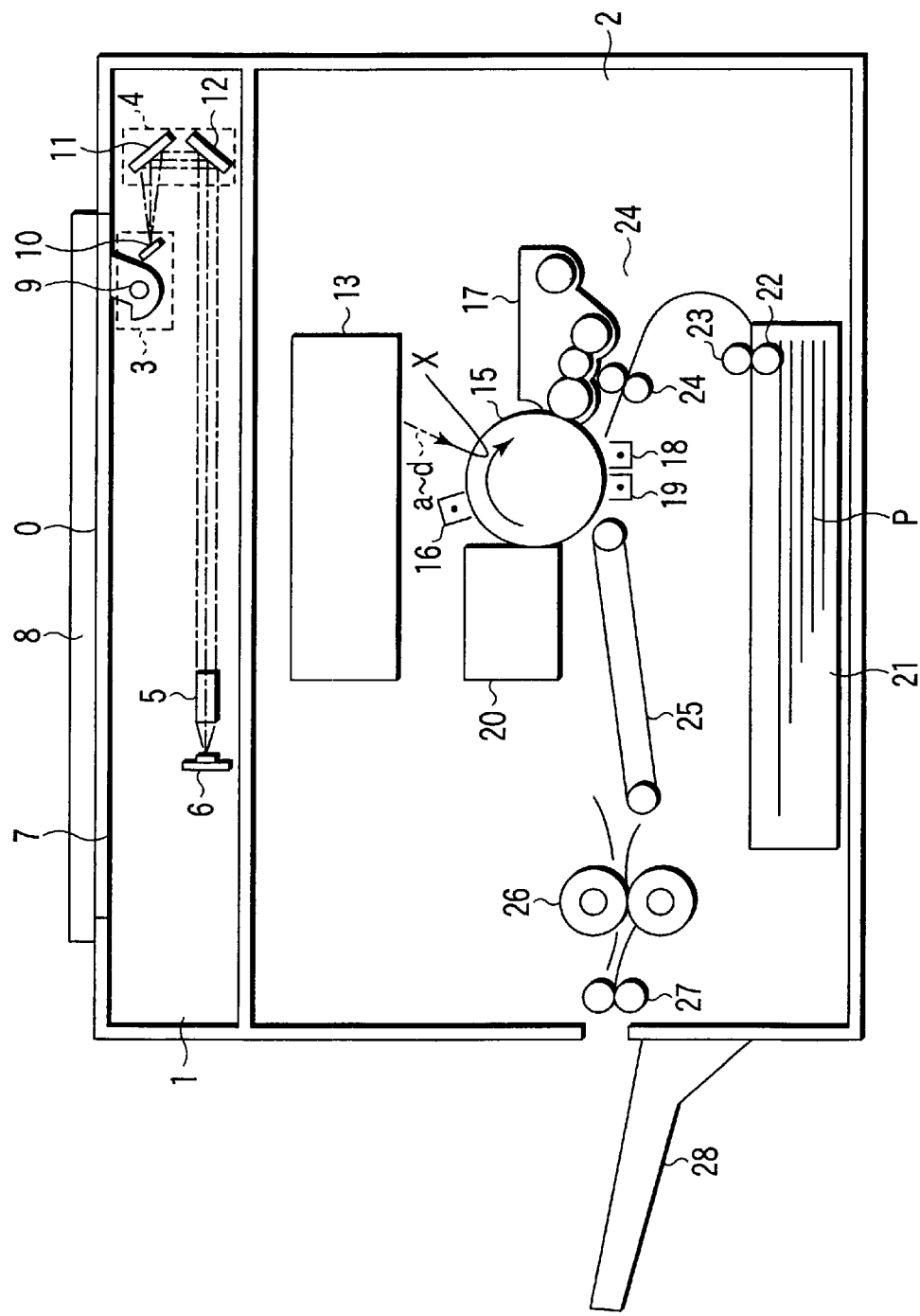
FIG. 1 shows a schematic configuration of a digital copier.

FIG. 1 schematically shows a configuration of a digital copier as an image formation apparatus to which a light beam scanning apparatus is applied. The digital copier comprises a scanner 1 to read images and a printer 2 to form images on an image formation medium. The scanner 1 comprises a first carriage 3 and a second carriage 4 movable in a direction of an arrow, an image formation lens 5, a photoelectric conversion element 6, etc.

In FIG. 1, a document O is placed face down on a transparent document glass plane 7 and is pressed against the document glass plane 7 with a document cover 8 which opens and closes freely.

The document O is illuminated by a light source 9. The reflected light is condensed on a light receiving face of the photoelectric conversion element 6 via mirrors 10, 11, and 12, and the image formation lens 5. The first carriage 3 is equipped with the light source 9 and the mirror 10. The second carriage 4 is equipped with the mirrors 11 and 12. The first carriage 3 and the second carriage 4 move at a relative speed of 2:1 to always keep an optical path length constant. Driven by a carriage drive motor (not shown), the first carriage 3 and the second carriage 4 move from right to left in synchronization with a read timing signal.

The scanner sequentially reads an image of the document O placed on the document glass plane 7 line by line. An image processing section (not shown) converts a read output to an 8-bit digital image signal representing gradation of the image.

The printer 2 comprises a combination of an optical unit (light beam scanning apparatus) 13 and an image formation section 14 coupled with the electrophotography capable of image formation on paper P as an image formation medium. An image signal read by the scanner 1 from the document O is processed in an image processing section (not shown), and then is converted to a laser beam (hereafter referred to as the light beam) from the semiconductor laser oscillator.

The following describes the optical unit 13 according to a multi-beam optical system using a plurality of semiconductor laser oscillators (e.g. four oscillators). An optical unit according to a single-beam optical system comprises only one semiconductor laser oscillator. This optical unit operates similarly to the optical unit according to the multi-beam optical system except relative position control of a plurality of light beams.

A plurality of semiconductor laser oscillators in the optical unit 13 emits light to generate a plurality of light beams according to a laser modulation signal output from the image processing section (not shown). The plurality of light beams is reflected on a polygon mirror to become scanning light which is output outside the unit. The optical unit 13 will be detailed later.

A plurality of light beams output from the optical unit 13 is formed as spot light having necessary resolution at an exposure position X on a photoconductor drum 15 as an image support. The light is scanned on the photoconductor drum 15 in the horizontal scan direction (along the photoconductor drum's rotation axis). Further, rotating the photoconductor drum 15 forms an electrostatic latent image corresponding to the image signal on the photoconductor drum 15.

Near the photoconductor drum 15, there are provided an electrostatic charger 16 for charging the surface thereof, a developing machine 17, a transfer charger 18, and a release charger 19, a cleaner 20, and the like. The photoconductor drum 15 is rotatively driven by a drive motor (not shown) at a peripheral speed and is electrostatically charged by the electrostatic charger 16 facing the surface of the drum. A plurality of light beams are arranged in the vertical scan direction (in the direction of movement of the photoconductor drum surface) and is imaged as spots at the exposure position X on the charged photoconductor drum 15.

The electrostatic latent image formed on the photoconductor drum 15 is developed as a toner image by means of toner (developer) from the developing machine 17. The toner image formed on the photoconductor drum 15 is transferred to paper P supplied from a paper feed system at a proper timing.

The paper feed system feeds paper from a paper feed cassette 21 mounted at the bottom by selecting a sheet of paper using a paper feed roller 22 and a separation roller 23. The paper is transported to a resist roller 24 and is fed to a transfer position at a specified timing. Downstream from the transfer charger 18, there are provided a paper transport mechanism 25, a fixer 26, and an eject roller 27 for ejecting the imaged paper P. The fixer 26 fixes the toner image transferred to the paper P which is then ejected to an external eject tray 28 via the eject roller 27.

After completion of transfer to the paper P, the cleaner 20 removes toner remaining on the surface of the photoconductor drum 15. The drum then returns to an initial state and is ready for next image formation.

By repeating the above process, an image formation operation is performed successively.

As mentioned above, the document placed on the document glass plane 7 is read by the scanner 1. The read information is subject to a series of processing in the printer 2 and is recorded on the paper P as a toner image.

The following describes the optical unit (light beam scanning apparatus) 13.

Figure 2:
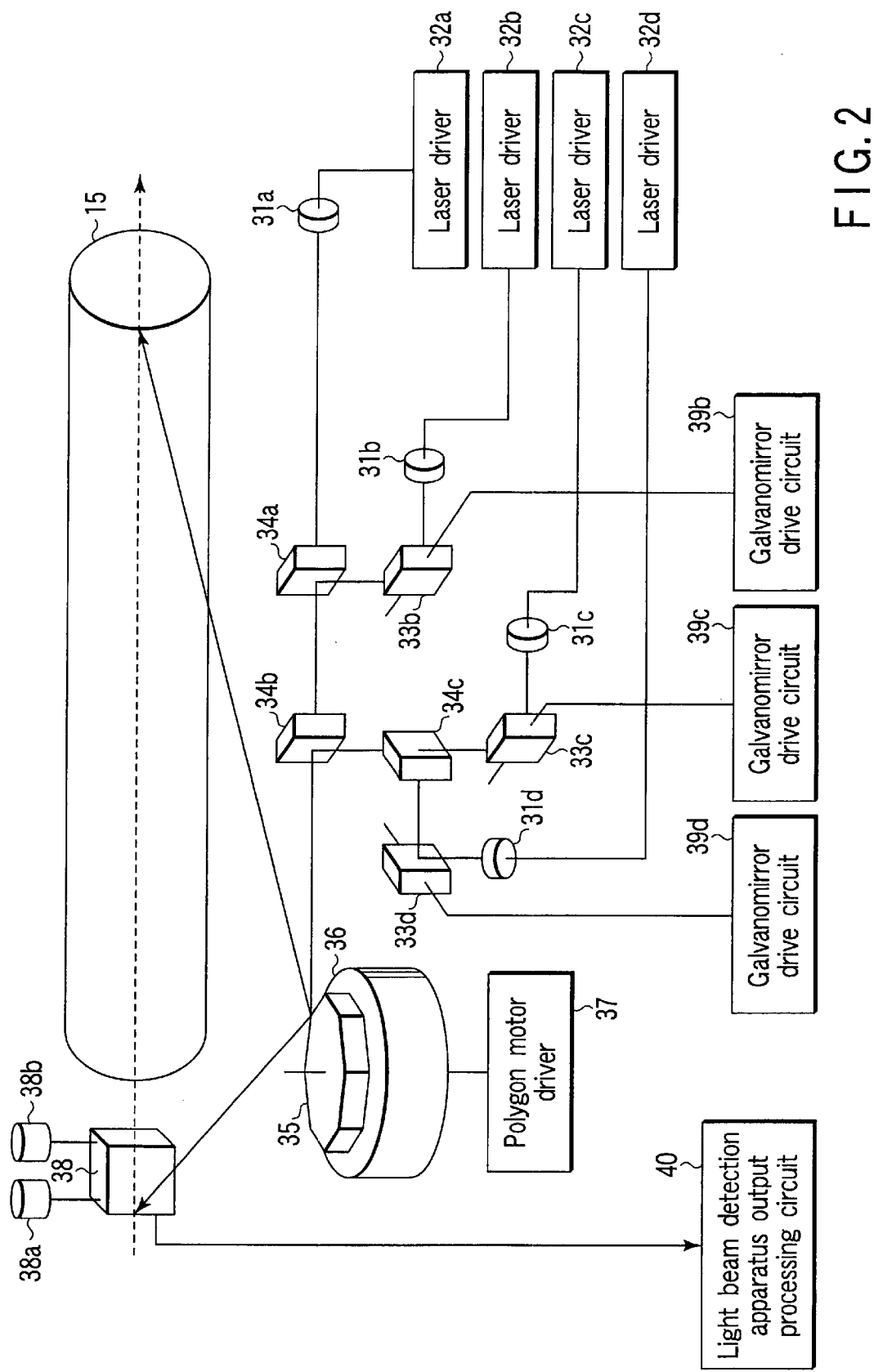
FIG. 2 shows a schematic configuration of an optical unit.

FIG. 2 shows a configuration of the optical unit 13 according to the multi-beam optical system and positioning of the photoconductor drum 15. The optical unit according to the single-beam optical system is configured similarly except that only one light beam is controlled.

As shown in FIG. 2, the optical unit 13 according to the multi-beam optical system includes semiconductor laser oscillators 31a, 31b, 31c, and 31d for generating four light beams, for example. Each of the laser oscillators 31a to 31d can form an image one scanning line at a time. Because of this, the optical unit according to the multi-beam optical system permits fast image formation without significantly increasing a polygon mirror rotation speed.

The semiconductor laser oscillator 31a is driven by a laser driver 32a. A light beam output from the semiconductor laser oscillator 31a passes a collimator lens (not shown), then half mirrors 34a and 34b, and finally enters a polygon mirror 35 as a rotating polygon mirror.

A polygon motor 36 is driven by a polygon motor driver 37 and rotates the polygon mirror 35 at a constant speed. Light reflected on the polygon mirror 35 scans the photoconductor drum in a given direction at an angular speed determined by a rotation speed of the polygon motor 36. A light beam scanned by the polygon mirror 35 passes an f-θ lens (not shown) According to the f-θ characteristic, the light beam scans on a light receiving face of a light beam detection section 38 and on the photoconductor drum 15 at a constant speed. The light beam detection section 38 detects a light beam position, light beam passage timing, light beam power, etc.

A semiconductor laser oscillator 31b is driven by a laser driver 32b. A light beam output from the semiconductor laser oscillator 31b passes the collimator lens (not shown) and is reflected on a galvanomirror 33b and then on the half mirror 34a. The reflected light from the half mirror 34a passes a half mirror 34b and enters the polygon mirror 35. A path following the polygon mirror 35 is the same as that for the laser oscillator 31a. The light passes the f-θ lens (not shown) and scans the light receiving face of the light beam detection section 38 and the photoconductor drum 15 at a constant speed.

A semiconductor laser oscillator 31c is driven by a laser driver 32c. A light beam output from the laser oscillator 31c passes the collimator lens (not shown) and is reflected on a galvanomirror 33c. The reflected light passes a half mirror 34c, is reflected on the half mirror 34b, and enters the polygon mirror 35. A path following the polygon mirror 35 is the same as that for the laser oscillators 31a and 31b. The light passes the f-θ lens (not shown) and scans the light receiving face of the light beam detection section 38 and the photoconductor drum 15 at a constant speed.

A semiconductor laser oscillator 31d is driven by a laser driver 32d. A light beam output from the laser oscillator 31d passes the collimator lens (not shown) and is reflected on a galvanomirror 33d. The reflected light is further reflected on the half mirrors 34c and 34b, and then enters the polygon mirror 35. A path following the polygon mirror 35 is the same as that for the laser oscillators 31a, 31b, and 31c. The light passes the f-θ lens (not shown) and scans the light receiving face of the light beam detection section 38 and the photoconductor drum 15 at a constant speed.

Each of the laser drivers 32a to 32d contains an automatic power control (APC) circuit and always drives the laser oscillators 31a to 31d with an emission power level controlled by a main control section (CPU) to be described later.

Respective light beams output from the laser oscillators 31a, 31b, 31c, and 31d are synthesized through the half mirrors 34a, 34b, and 34c. The four light beams advance toward the polygon mirror 35. Accordingly, the four light beams can simultaneously scan on the photoconductor drum 15.

The galvanomirrors 33b, 33c, and 33d are driven by galvanomirror drive circuits 39b, 39c, and 39d, respectively. The galvanomirrors adjust or control positions of light beams output from laser oscillators 31b, 31c, and 31d in the vertical scan direction with reference to a light beam output from the laser oscillator 31a.

The light beam detection section 38 is equipped with light beam detection section adjustment motors 38a and 38b for adjusting an installation position of the apparatus and an inclination of a light beam against the scanning direction.

The light beam detection section 38 detects passage positions, passage timings, and powers (light quantities) of the four light beams. The light beam detection section 38 is provided near the end of the photoconductor drum 15. Its light receiving surface is level with that of the photoconductor drum 15. A detection signal from the light beam detection section 38 is used for controlling the galvanomirrors 33b, 33c, and 33d corresponding to respective light beams (controlling an image formation position in the vertical scan direction), emission powers of the laser oscillators 31a, 31b, 31c, and 31d, and emission timings (controlling an image formation position in the horizontal scan direction). Details are described later. To generate a signal for these control operations, the light beam detection section 38 is connected to a light beam detection section output processing circuit (processing circuit) 40.

Described below is the digital copier's control system.

Figure 3:
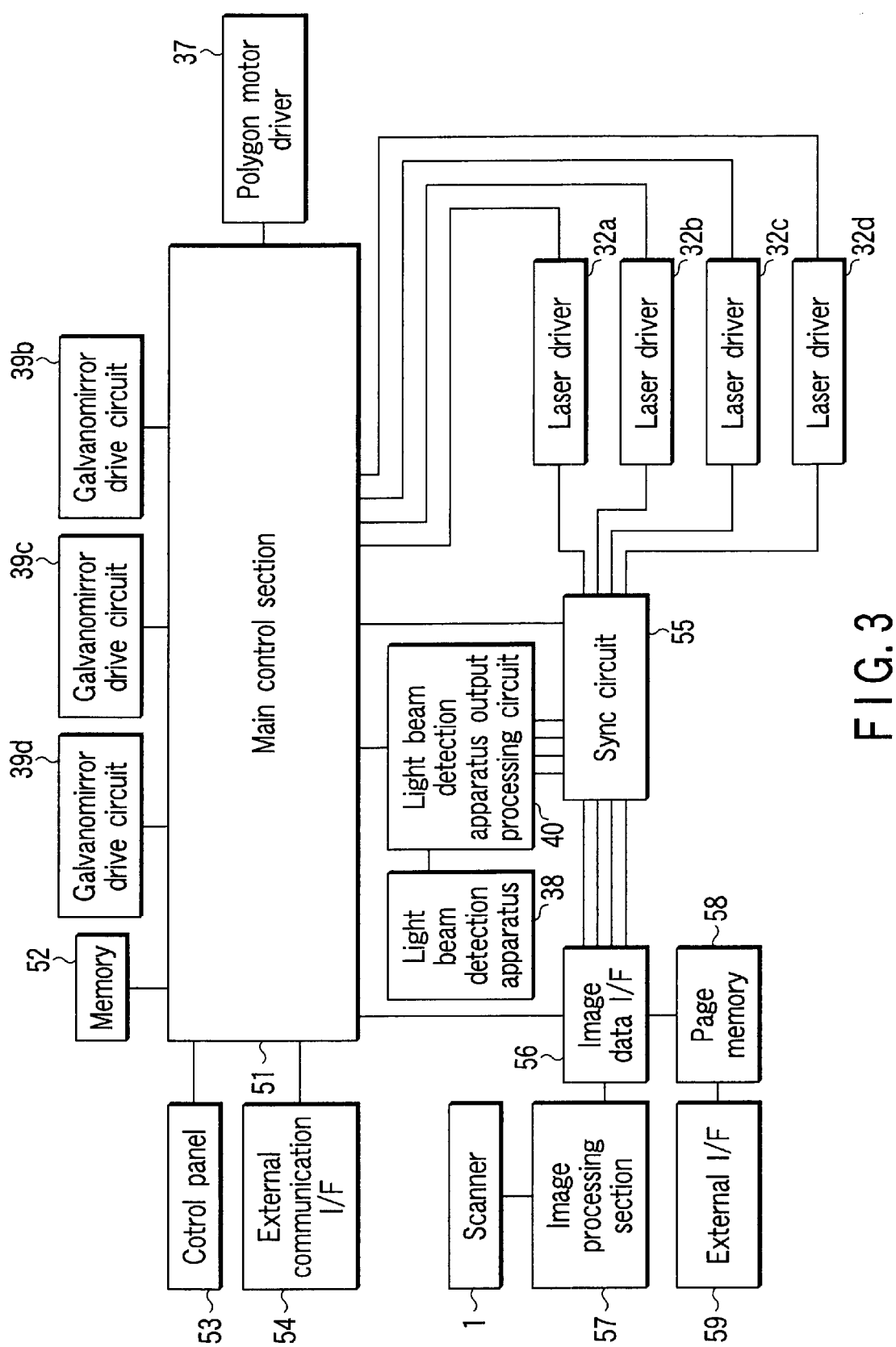
FIG. 3 is a block diagram showing a configuration example of an optical control system.

FIG. 3 shows a control system configuration of the digital copier provided with an optical unit according to the multi-beam optical system. A main control section 51 is responsible for overall control and comprises a CPU, for example. The control section 51 is connected to the memory 52, a control panel 53, an external communication interface (I/F) 54, laser drivers 32a, 32b, 32c, and 32d, a polygon mirror motor driver 37, galvanomirror drive circuits 39b, 39c, and 39d, a light beam detection section output processing circuit 40, a sync circuit 55, an image data interface (I/F) 56, etc.

The sync circuit 55 is connected to the image data I/F 56. The image data I/F 56 is connected to an image processing section 57 and page memory 58. The image processing section 57 is connected to the scanner 1. The page memory 58 is connected to an external interface (I/F) 59.

The following describes a flow of image data forming an image.

During a copy operation, the scanner 1 reads an image from the document O placed on the document glass plane 7. The read image is sent to the image processing section 57. The image processing section 57 provides the image signal from the scanner 1 with known shading correction, various filtering processes, gradation, gamma correction, and the like.

Image data from the image processing section 57 is sent to the image data I/F 56. The image data I/F 56 distributes the image data to the four laser drivers 32a, 32b, 32c, and 32d.

The sync circuit 55 generates a clock synchronized with timing each light beam passing on the light beam detection section 38. Synchronously with this clock, the image data I/F 56 sends the image data as a laser modulation signal to the laser drivers 32a, 32b, 32c, and 32d.

The sync circuit 55 includes a sample timer, a logic circuit, and the like. The sample timer forcibly operates the laser oscillators 31a, 31b, 31c, and 31d in a non-image region and controls each light beam power. When each beam scans on the light beam detection section 38, the logic circuit operates the laser oscillators 31a, 31b, 31c, and 31d and detects a horizontal scan direction position of each light beam.

Transmitting image data synchronously with each light beam scanning provides image formation at a correct position in synchronization with the horizontal scan direction.

The control panel 53 is a man-machine interface for starting a copy operation or setting the number of sheets of paper. The control panel 53 comprises hardware keys, a liquid crystal display with a touch panel, etc. The control panel 53 uses the liquid crystal display to display operational states, digital copier anomalies, or the necessity of maintenance by the maintenance personnel.

The external communication I/F 54 is as an interface for data communication with external devices connected via a communication line. For example, the external communication I/F 54 is connected to a personal computer. When the external communication I/F 54 is connected to a personal computer, the digital copier functions as a printer for image formation in response to an instruction from the personal computer.

The external communication I/F 54 may be networked with LANs or the Internet. In this case, the digital copier can form images in response to a networked external device and notify the external device of digital copier states or maintenance information via the network.

This digital copier is capable of not only a copy operation, but also image formation of image data externally input via the external I/F 59 connected to the page memory 58. Image data externally input from the external I/F 59 is temporarily stored in the page memory 58, and then is sent to the sync circuit 55 via the image data I/F 56.

When the digital copier is externally controlled via a network, for example, the external communication I/F 54 works as the control panel 53.

The galvanomirror drive circuits 39b, 39c, and 39d drive the galvanomirrors 33b, 33c, and 33d according to a value supplied from the main control section 51. Accordingly, the main control section 51 can freely control angles of the galvanomirrors 33b, 33c, and 33d via the galvanomirror drive circuits 39b, 39c, and 39d.

The polygon motor driver 37 drives the polygon motor 36 for rotating the polygon mirror 35 which scans the four light beams. The main control section 51 instructs the polygon motor driver 37 to start or stop the rotation and change the rotation speed. When the light beam detection section 38 confirms the light beam's passage position, the polygon motor 36 rotates at a lower speed than for image formation.

The laser drivers 32a, 32b, 32c, and 32d not only generate a laser beam according to image data as mentioned above, but also forcibly operate the laser oscillators 31a, 31b, 31c, and 31d independently of image data according to a forced emission signal from the main control section 51.

The main control section 51 specifies power for beams emitted from the laser oscillators 31a, 31b, 31c, and 31d by using the laser drivers 32a, 32b, 32c, and 32d, respectively. The emission power setting is changed according to a change in the process condition or detection of a light beam passage position.

The memory 52 stores information needed for control. For example, the memory 52 stores control amounts for the galvanomirrors 33b, 33c, and 33d, various characteristics of the processing circuit for detecting light beam passage positions (e.g. amplifier offset values), an arrival order of light beams, etc. For example, values stored in the memory 52 are used for initiating a control operation as immediately as possible after power-on.

The following describes a first operation example of the light beam scanning apparatus.

The first operation example describes detection and control of light beam passage positions in a light beam scanning apparatus having the single-beam optical system which performs a scan using a single light beam.

Figure 4:
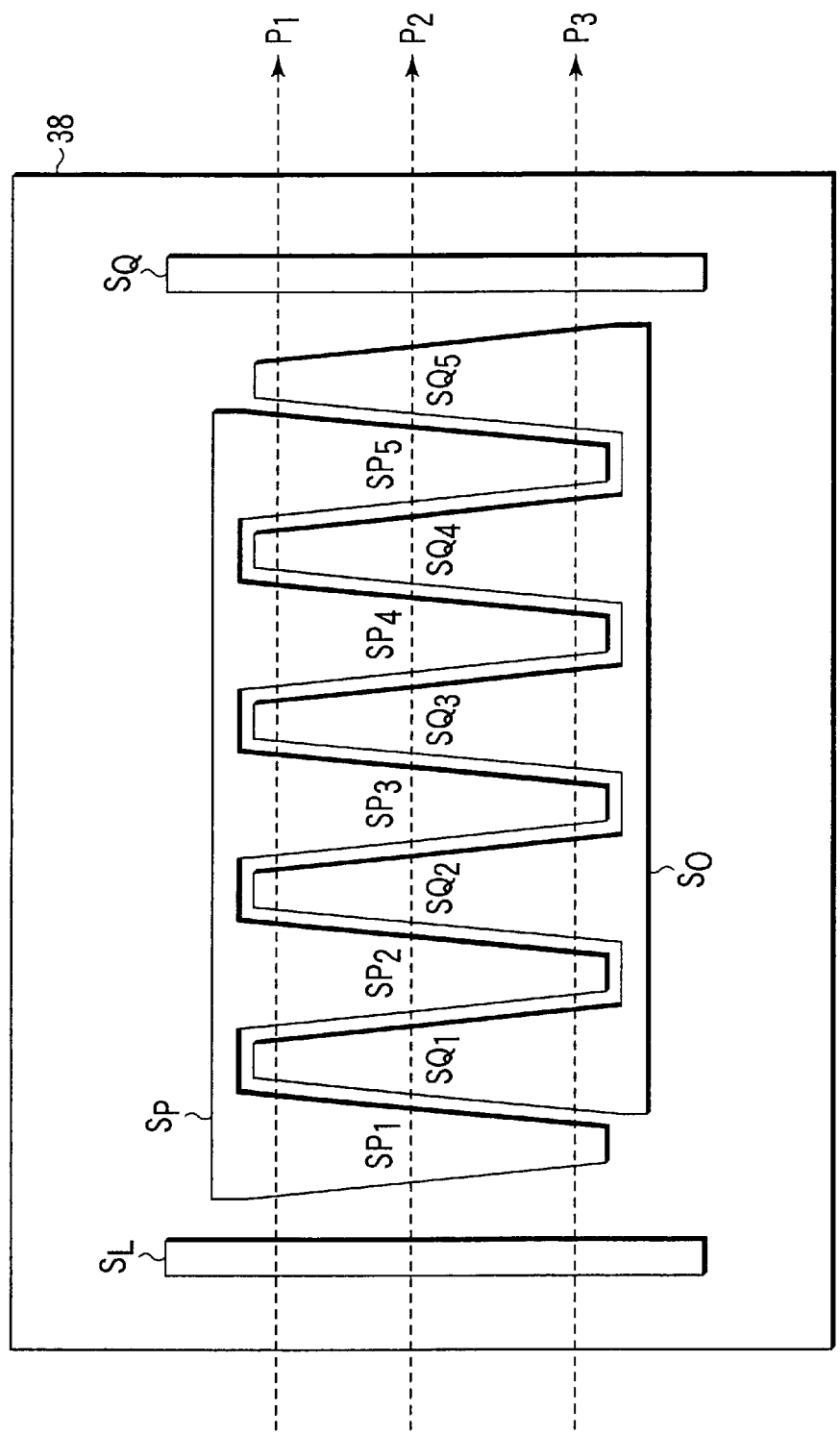
FIG. 4 shows a configuration of a light beam detection section.

FIG. 4 shows relationship between the light beam detection section 38's configuration and a light beam's scanning direction. A light beam from one semiconductor laser oscillator is scanned by a polygon mirror 35's rotation from left to right and passes over the light beam detection section 38.

The light beam detection section 38 comprises a pair of longitudinal sensors SL and SQ, a pair of sensors (sensor patterns) SP and SO provided between the sensors SL an SQ, and a support substrate for integrally supporting these sensors.

The sensor SL detects passage of the light beam and generates a reset signal (integration start signal) for an integrator to be described later. This reset signal is used for discharging an electrical charge from an integral capacitor up to the reference voltage. The integration starts upon completion of a reset operation.

Like the sensor SL, the sensor SQ detects passage of the light beam and generates a conversion start signal for a signal converter (A/D converter or window comparator) which converts an analog signal to a digital signal (to be described later). The signal is used as an A/D conversion start signal for the A/D converter or as a timing signal for the window comparator. The timing signal is used for holding a comparator output.

A pair of sensors SP and SO are patterns used for detecting a light beam's passage position. The sensors SP and SO are formed as a plurality of triangular or trapezoid patterns. The sensors SP and SO comprising a plurality of triangles and trapezoids are arranged so that respective triangles or trapezoids form a plurality of pairs. For example, the sensors SP and SO each are formed to be sawtooth and are placed with a given gap so that these patterns engage with each other.

In the example of FIG. 4, sensor patterns SP1 to SP5 represent a plurality of triangular or trapezoid patterns constituting the above-mentioned sensor SP. Likewise, sensor patterns SO1 to SO5 represent a plurality of triangular or trapezoid patterns constituting the above-mentioned sensor SO. The sensors SP and SO are arranged so that the sensor patterns SP1 to SP5 engage with the sensor patterns SO1 to SO5, respectively.

As shown in FIG. 4, the sensor pattern SP1 is so formed as to increase a distance for the light beam crossing or passing sensor pattern SP1 as a light beam's passage position is settled upward in the figure. Likewise, the sensor pattern SO1 is so formed as to increase a distance for the light beam crossing or passing sensor pattern SO1 as a light beam's passage position is settled downward in the figure.

A passage position change is measured along the vertical scan direction, namely a direction orthogonal to the light beam scan direction (horizontal scan direction). As the passage position changes, an output from one sensor pattern (SP1 or SO1) continuously increases and an output from the other sensor pattern (SO1 or SP1) continuously decreases.

The sensors SP and SO comprise light detection members such as photodiodes and are integrally configured on the support substrate. When the light beam passes, it moves from left to right in FIG. 4. The light is detected in the order of sensor patterns SP1, SO1, SP2, SO2, SP3, SO3, SP4, SO4, SP5, and SO5. The sensors SP and SO generate detection outputs.

Figure 5:
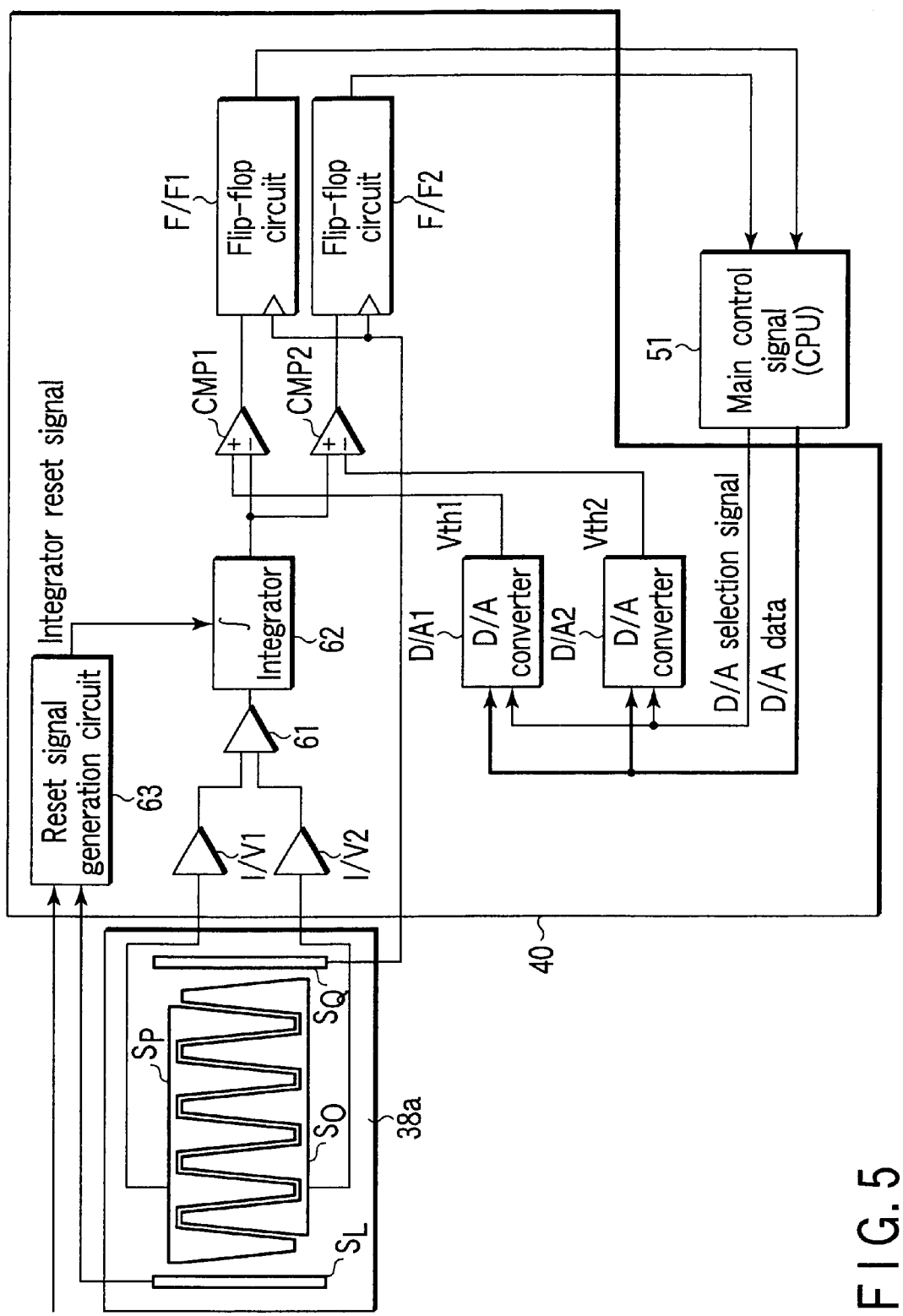
FIG. 5 is a block diagram showing a configuration example of a processing circuit to process an output signal from the beam detection section.

FIG. 5 is a block diagram showing a major part of the light beam detection output processing circuit 40 using the light beam detection section 38 shown in FIG. 4. This part should detect a beam position in the vertical scan direction.

As shown in FIG. 5, the major part of the light beam detection output processing circuit 40 computes a difference between detection outputs from the sensors SP and SO. Further, the light beam detection output processing circuit 40 uses an integrator 62 to integrate a detected difference between the sensors SP and SO. The result (integration result) integrated by the integrator 62 is supplied to the main control section (CPU) 51 via window comparators CMP1 and CMP2, etc.

The following details the major part of the light beam detection output processing circuit 40. Here, the description covers a detection operation for a single light beam.

The sensors SP and SO output a current when the light beam passes. The sensors SP and SO are connected to current/voltage conversion amplifiers IV1 and IV2, respectively. A current output from these sensors is converted to a voltage output.

An output from the current/voltage conversion amplifier (IV1, IV2) is connected to a differential amplifier 61 which computes a difference and amplifies the output with a proper gain. The amplified output is then integrated by the integrator 62.

The integrator 62 stores electrical charge in the integral capacitor and generates it as an integration output. Before use, the integral capacitor needs to be discharged. This operation is hereafter referred to as an integration reset.

The integration reset operation is performed by a reset signal which is generated by a combination of outputs from the sensors in the light beam detection section. The reset signal is supplied from a sensor SA (not shown) and the sensor SL and is generated from a reset signal generation circuit 63.

When the light beam passes, signals are output from the sensors SA and SL. The integrator 62 is reset between these sensors. Just after a reset, signals are output from the sensors SP and SO and are integrated.

An output signal from the integrator 62 is input to window comparators CMP1 and CMP2. The window comparator (CMP1, CMP2) compares an output signal (analog voltage) from the integrator 62 with a voltage value as the threshold given from the main control section (CPU) 51.

A comparison result from the window comparator (CMP1, CMP2) is input to a flip-flop circuit (F/F1, F/F2) and is held here. A pulse signal is output from the sensor SQ and is input to the flip-flop circuit (F/F1, F/F2). The SQ output timing (pulse signal rise) holds the output from the window comparator (CMP1, CMP2).

An output from the flip-flop circuit (F/F1, F/F2) is sent to the CPU 51. The CPU 51 connects with an output signal from a timing sensor SR (not shown) in the beam detection section 38. This signal functions as an interrupt signal. The CPU 51 reads data from the flip-flop circuit (F/F1, F/F2) each time the CPU receives an interrupt signal (output signal) from the timing sensor SR.

Detailed below are operations of the window comparator (CMP1, CMP2).

As shown in FIG. 5, an output from the integrator 62 is supplied to an inverting input section of the comparator CMP1 and to a non-inverting input section of the comparator CMP2. The non-inverting input section of the comparator CMP1 is connected to the main control section 51 via a D/A converter (D/A1). The inverting input section of the comparator CMP2 is connected to the main control section 51 via a D/A converter (D/A2).

The CPU 51 supplies threshold Vth1 to the non-inverting section of the window comparator CMP1 via the D/A converter (D/A1). In addition, the CPU 51 supplies threshold Vth2 to the inverting section of the window comparator CMP2 via the D/A converter (D/A2). Here, the condition is threshold Vth1>threshold Vth2.

When an output voltage from the integrator 62 is smaller than the threshold Vth1 and is larger than the Vth2, both comparators CMP1 and CMP2 output "1s". When an output from the window comparators CMP1 and CMP2, namely an output from the flip-flop circuits F/F1 and F/F2 is "1, 1", the CPU 51 assumes that an output from the integrator 62 exists in a range (window) between the thresholds Vth1 and Vth2. The CPU correctly determines an output voltage from the integrator 62, i.e., information about the light beam passage position by gradually decreasing the window width. Based on the thus acquired information about the light beam passage position, the main control section 51 controls the light beam's passage position.

Though not shown in FIG. 5, there are actually provided a current/voltage conversion amplifier for converting output currents of the sensors SO and SP to voltage values and a signal processing circuit such as a binarization circuit for binarizing outputs from the current/voltage conversion amplifier.

Referring to FIG. 5, the following describes operations when a light beam passes the light beam detection section 38 in FIG. 4.

A light beam is scanned by the polygon mirror 35 in the direction of the arrow in the figure. The sensors SL, SP, SO, and SQ generate currents as the light beam passes. A current output from the sensor SL is converted to a voltage value by the current/voltage conversion amplifier (not shown) and is binarized by the binarization circuit (not shown). The binarized signal is input to the reset signal generation circuit 63. This circuit synthesizes the binarized signal and an output signal from the SA sensor (not shown) to generate a reset signal. This reset signal is input to the integrator 62 to reset it. The reset signal also functions as a clear signal for the flip-flop circuits F/F1 and F/F2 to clear them.

When the light beam passes the sensors SP and SO, these sensors output pulse currents corresponding to positions scanned by the light beam. These output currents are converted to voltage values by the current/voltage conversion amplifiers IV1 and IV2. A difference between voltage-converted signals is amplified by the differential amplifier 61 and is integrated by the integrator 62. An output from the integrator 62 is input to the window comparators CMP1 and CMP2 functioning as analog/digital converters. The input is compared with the threshold specified via the D/A converters D/A1 and D/A2 and is converted to a digital signal.

When the light beam passes the sensor SQ, an output current from the sensor SQ is converted to a voltage value by the current/voltage conversion amplifier (not shown) and then is binarized by the binarization circuit. The binarized signal is input to the flip-flop circuits F/F1 and F/F2. The leading edge of the binarized signal allows the flip-flop circuits F/F1 and F/F2 to hold outputs from the window comparators CMP1 and CMP2.

A signal from the sensor pattern SR (not shown) is input to the main control section 51 as an interrupt signal. Using this signal, the main control section 51 reads outputs from the window comparators CMP1 and CMP2, namely outputs from the flip-flop circuits F/F1 and F/F2.

Described below is a case where the light beam's passage position is P2.

Figure 6:
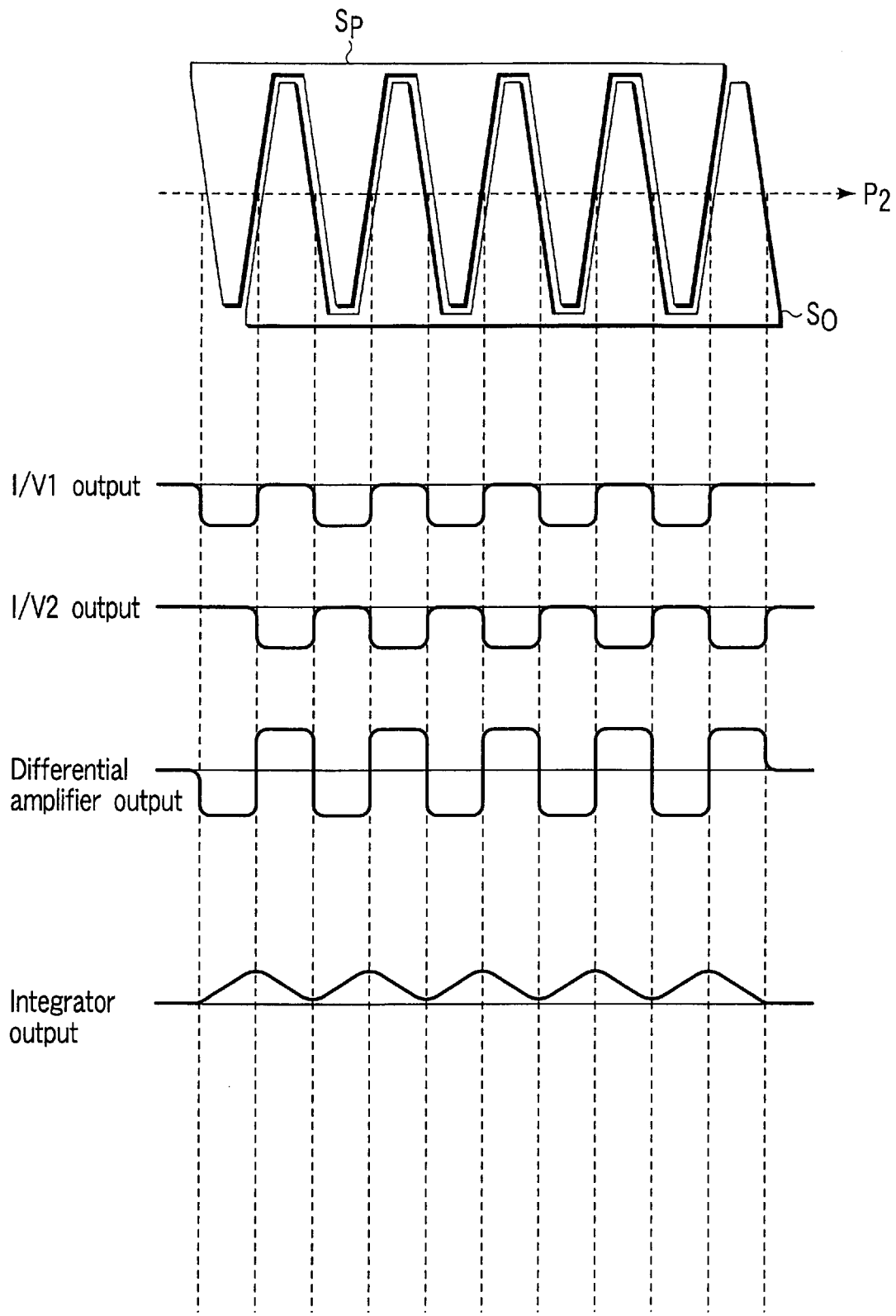
FIG. 6 exemplifies a sensor output, a differential amplifier output, and an integrator output according to a light beam passage position.

FIG. 6 shows signals from processing circuit components when a light beam passes an approximate center (P2) of the vertical scan direction for the sensors SP and SO.

As shown in FIG. 6, the light beam passage position is approximately centered at P2 on the sensors SP and SO. Accordingly, the light beam travels the same distance on the sensor patterns SP1 to SP5 of the sensor pattern SP and on the sensor patterns SO1 to SO5 of the sensor pattern SO. Namely, the current/voltage conversion amplifiers I/V1 and I/V2 output phase-shifted signals with almost equal pulse widths.

The differential amplifier 61 computes a difference between outputs from the current/voltage conversion amplifiers I/V1 and I/V2 and generates an output amplified with a specified gain. The output from the differential amplifier 61 is integrated by the integrator 62 with combinations of (SP1 and SO1), (SP2 and SO2), (SP3 and SO3), (SP4 and SO4), and (SP5 and SO5). Consequently, the output signal from the integrator 62 finally becomes identical to the reference voltage (Vref) for the processing circuit.

When the light beam passage position is P2, the differential amplifier 61 outputs a signal with the equal amplitude and the reverse direction. An integration result becomes ±0 against the reference voltage.

Figure 7:
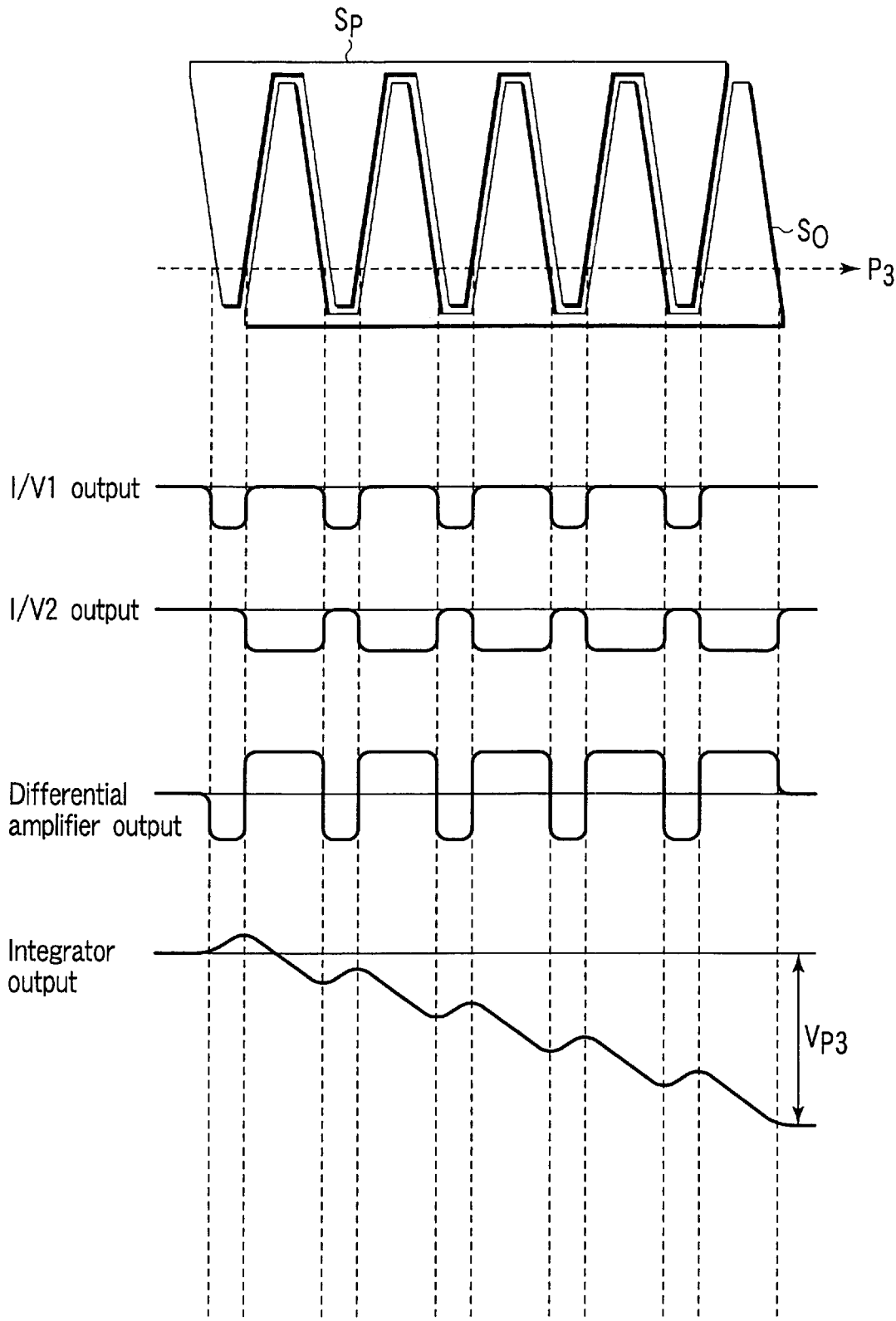
FIG. 7 exemplifies a sensor output, a differential amplifier output, and an integrator output according to a light beam passage position.

FIG. 7 shows signals from processing circuit components when a light beam passes a position P3 below the center (P2) of the sensors SP and SO.

As shown in FIG. 7, the light beam passage position is set to the position P3 below the approximate center P2 of the sensors SP and SO. When the light beam passes these sensors, the distance for the sensor patterns SO1 to SO5 of the sensor SO becomes longer than the distance for the sensor patterns SP1 to SP5 of the sensor SP.

As regards outputs from the current/voltage conversion amplifiers (IV/1 and IV/2), I/V2 generates a signal with a longer pulse width. Therefore, an output from the differential amplifier 61 looks like as shown in the figure. Like the case in FIG. 6, an output from the differential amplifier 61 is integrated by the integrator 62 in pairs such as (SP1 and SO1), (SP2 and SO2), (SP3 and SO3), (SP4 and SO4), and (SP5 and SO5). An output signal from the integrator 62 is repeatedly increased and decreased according to an output from the differential amplifier 61. The output signal finally becomes −VP3 which is output below the reference voltage Vref.

When the light beam passage position is set to a position P1 above the center position P2, an integration result is the reverse of that for the position P3 in FIG. 7. In the case of the position P1, an output signal from the integrator 62 finally becomes +VP3 which is output above the reference voltage Vref.

Accordingly, this processing circuit 40 outputs the reference voltage Vref when a light beam passage position is set to the center position P2 for the sensors SP and SO. The processing circuit 40 outputs a value larger than the reference voltage Vref when a light beam passage position is set to the position P1 above the center position P2. The processing circuit 40 outputs a value smaller than the reference voltage Vref when a light beam passage position is set to the position P3 below the center position P2.

It is possible to detect a light beam passage position by integrating a differential signal between outputs from the sensors SP and SO.

Figure 8:
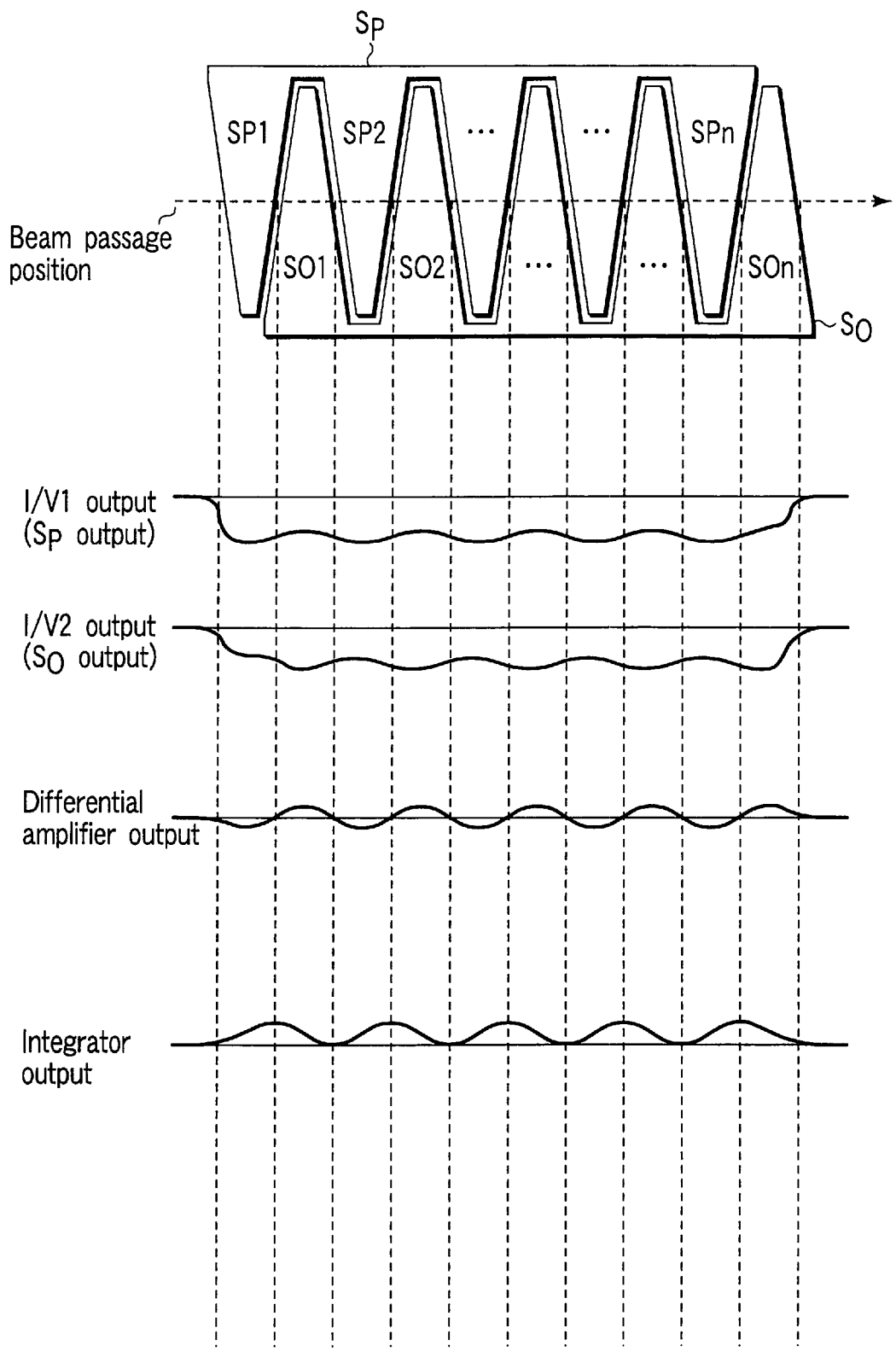
FIG. 8 exemplifies a sensor output, a differential amplifier output, and an integrator output according to a light beam passage position.
Figure 9:
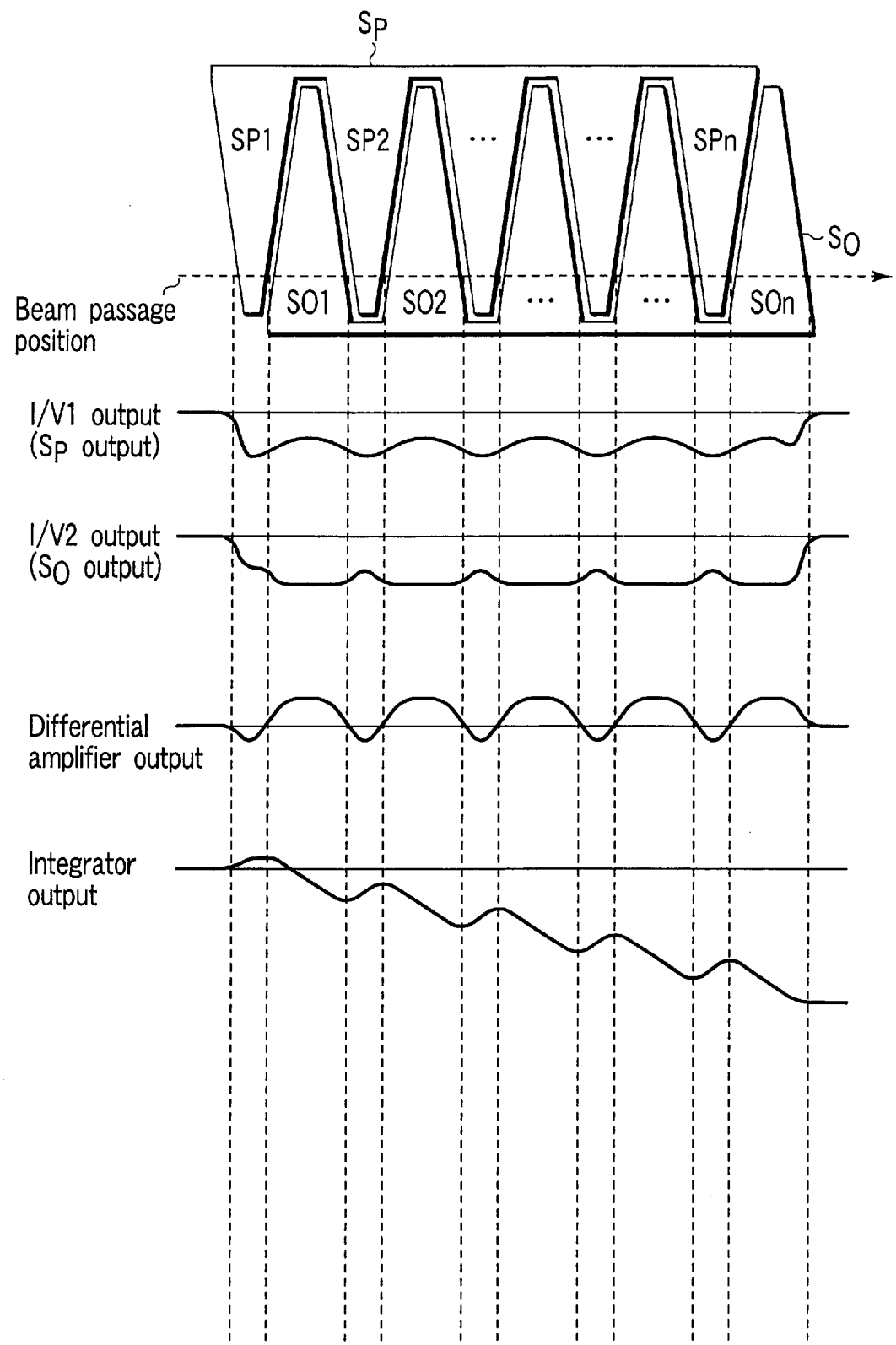
FIG. 9 exemplifies a sensor output, a differential amplifier output, and an integrator output according to a light beam passage position.

FIGS. 8 and 9 show cases where the sensors SP and SO comprise sawtooth sensor patterns which are sufficiently smaller than a beam diameter. When the light beam passage position is set to the center position P2 as shown in FIG. 8, the light beam detection section output processing circuit 40 outputs the reference voltage Vref like in FIG. 6. When the light beam passage position is set to the position P3 below the center position P2 as shown in FIG. 9, the light beam detection section output processing circuit 40 outputs a value smaller than the reference voltage Vref like in FIG. 7.

Operations of the light beam detection section output processing circuit 40 in FIGS. 8 and 9 are the same as those in FIGS. 6 and 7. Detailed description of operations is omitted.

Figure 10:
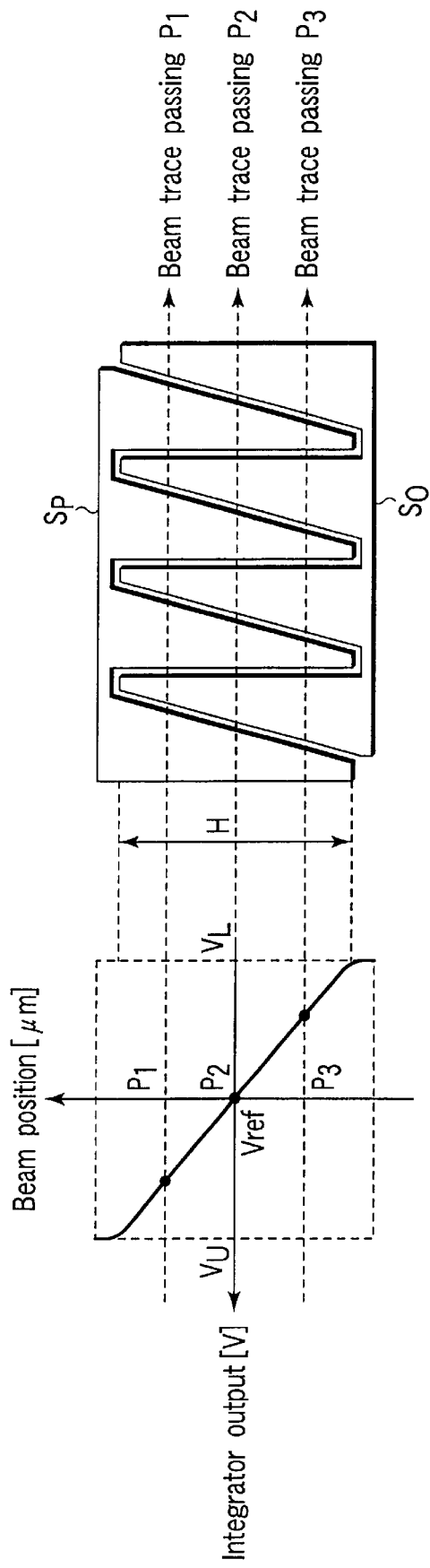
FIG. 10 shows relationship between a light beam passage position and an integration output.

FIG. 10 shows relationship between a light beam position scanned on the sensors SP and SO and an output value from the integrator 62. It is seen from FIG. 10 that the integrator 62's output deviates from the reference voltage Vref as a light beam scan position on the sensors SP and SO deviates from the center. It is possible to determine how a light beam scan position deviates from the center by comparing an output from the integrator 62 with the reference voltage Vref.

The following describes a second operation example of the light beam scanning apparatus.

The second operation example applies to a light beam scanning apparatus having the multi-beam optical system which performs a scan using a plurality of light beams, e.g., four light beams. The principle of detecting and controlling a light beam passage position is the same as the above-mentioned first operation example. The description thereof is omitted here.

Described below is multi-beam passage position control using the light beam detection section 38 in FIG. 4. The multi-beam optical system uses four laser oscillators. This example assumes a 4-beam multi-beam optical system having four actuators (galvanomirrors in this example) for moving light beams in the vertical scan direction. It is assumed that the multi-beam optical system has 600 dpi resolution.

As explained in the first operation example, the light beam detection section 38 has the detection characteristic as shown in FIG. 7. The integration output is approximately |VU−VL|/H=Vunit[V/$\mu$m]. For providing a 4-beam pitch with the 600 dpi resolution, galvanomirrors just need to be adjusted so that integration outputs for adjacent light beams produce a difference of approximately Vunit×42.3[V].

When a first light beam is targeted to pass the position P2, for example, a first laser oscillator is activated and a polygon mirror is rotated. A galvanomirror for the first light beam is operated so that the light beam passes within the sensor patterns. When the light beam is adjusted to pass within the sensor patterns, the galvanomirror is used to adjust a first light beam passage position so that an integration output becomes Vref.

Then, a second light beam passage position is adjusted. A second laser oscillator is activated and the polygon mirror is rotated. Like the first light beam, a galvanomirror for the second light beam is operated so that the light beam passes within the sensor patterns. Thereafter, the galvanomirror for the second light beam is used to adjust the second light beam passage position so that an integration output becomes Vref−Vunit×42.3[V].

These operations control a pitch of 42.3[μm] between passage positions for the first and second light beams. Likewise, galvanomirrors for the third and fourth light beams are adjusted so that integration outputs for the adjacent light beams produce a difference of approximately Vunit×42.3[V] equivalent to 42.3[μm].

The above-mentioned operations control a specified interval such as a 42.3[μm] pitch between the four light beam passage positions.

The following describes a third operation example of the light beam scanning apparatus.

Like the second operation example, the third operation example applies to a light beam scanning apparatus having the multi-beam optical system. In the third operation example, at least one of a plurality of light beams is fixed. Based on this fixed light beam passage position, the third operation example controls the remaining light beam passage positions to a specified pitch (relative position control).

Figure 11:
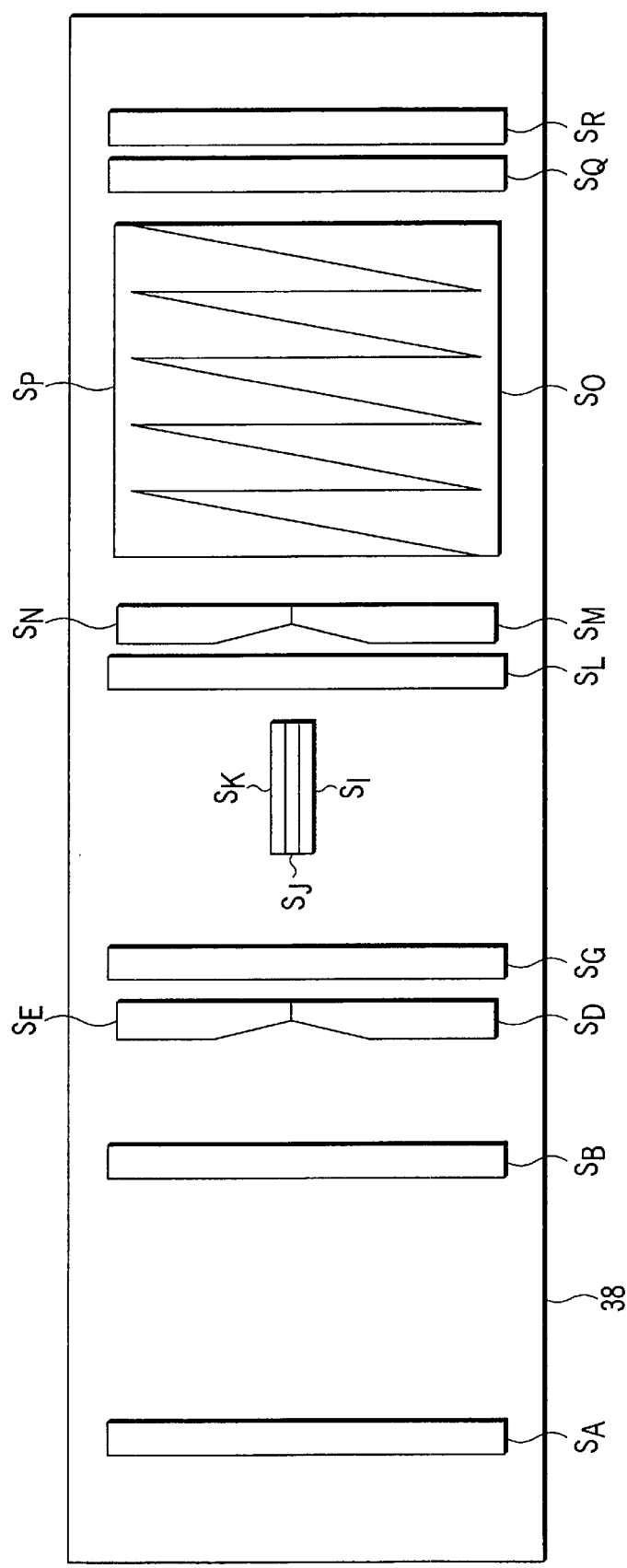
FIG. 11 shows a schematic configuration example of the light beam detection section.

FIG. 11 shows a configuration of the light beam detection section 38. The light beam detection section 38 comprises the following sensors configured on the support substrate. Long sensors SA, SB, SG, SL, SQ, and SR are arranged in a direction orthogonal to the light beam scan direction. Long sensors SI, SJ, and SK are arranged in the light beam scan direction. The sensors SP and SO are configured in the same manner as described for the first and second operation examples.

In FIG. 11, outputs from the two sensors SA and SL generate a reset signal for the integrator 62. Further, an output signal from the sensor SQ determines timing to start converting an integration output (analog signal) to a digital signal. An output signal from the sensor SR determines timing for reading into the main control section 51.

The sensors SI, SJ, and SK adjust intervals between light beams in the vertical scan direction. The sensors SI, SJ, and SK are approximately centered on the support substrate 38a in the vertical scan direction and are placed parallel at a 42.3[μm] pitch (600 dpi resolution) in the vertical scan direction. The first passage target is a gap G1 between the sensors SJ and SK in the vertical scan direction. The sensors SJ and SK are used for confirming that a light beam passes the first passage target. The second passage target is a gap G2 between the sensors SI and SJ in the vertical scan direction. The sensors SI and SJ are used for confirming that a light beam passes the second passage target.

Sensors SD, SE, SM, and SN are patterns for detecting a relative inclination of the light beam to be scanned against the light beam detection section 38. The sensors SD and SE are placed vertically and are paired. Likewise, the sensors SM and SN are placed vertically and are paired. Centers of these pairs are positioned on the same line.

Figure 12:
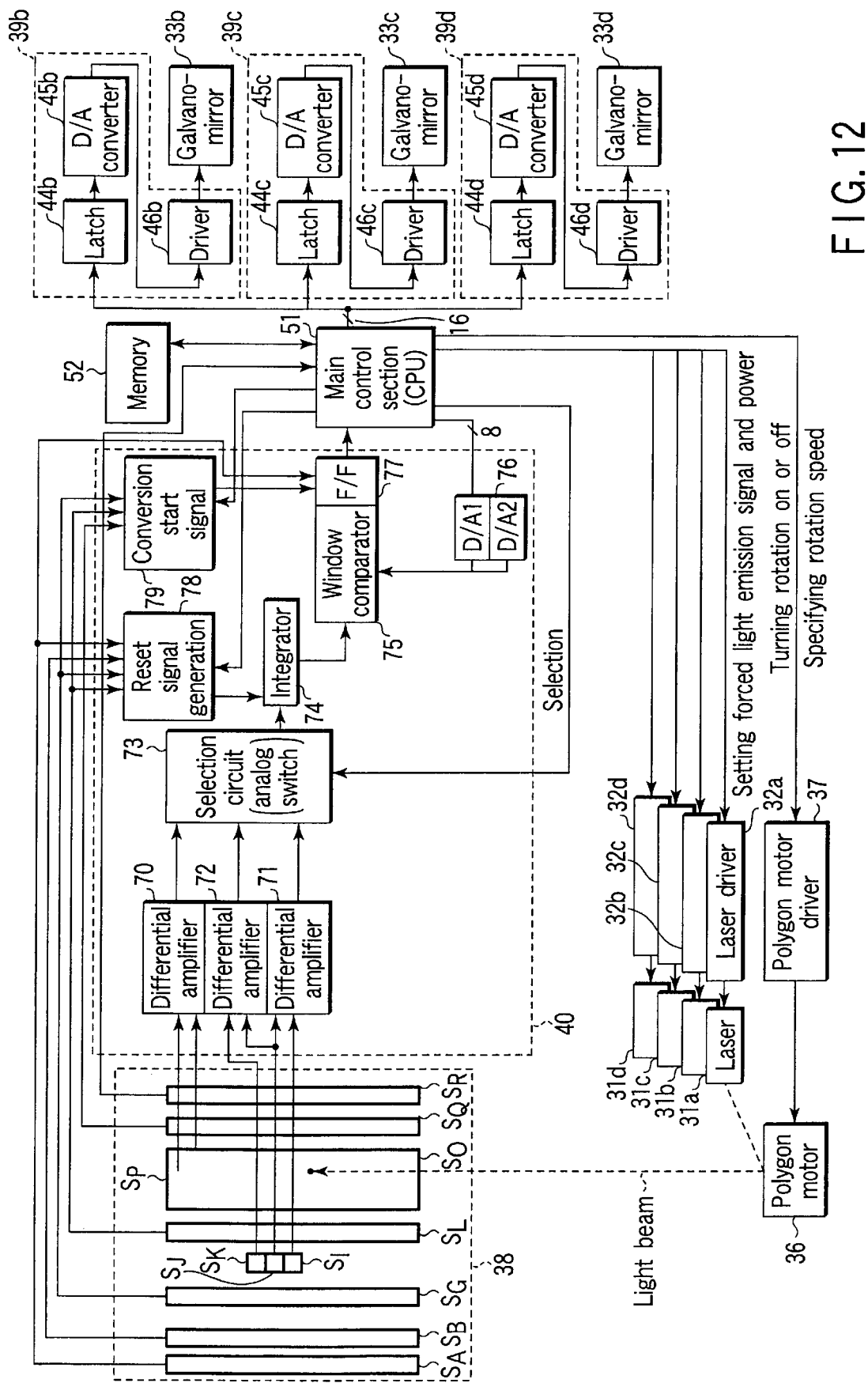
FIG. 12 is a block diagram schematically showing a configuration example of the optical control system.

FIG. 12 diagrams a configuration of the light beam detection section output processing circuit 40 using the light beam detection section 38 in FIG. 11 and peripheral sections for the light beam detection section output processing circuit 40 shown in FIGS. 2 and 3.

Output signals from the sensors SO and SP are input to corresponding input terminals of the differential amplifier 70. Output signals from the sensors SI and SJ are input to corresponding input terminals of the differential amplifier 71. Output signals from the sensors SJ and SK are input to corresponding input terminals of the differential amplifier 72. The main control section (CPU) 51 can set amplification factors for the differential amplifiers 70, 71, and 72.

Output signals from the differential amplifiers 70, 71, and 72 are sent to a selection circuit (analog switch) 73. Using a sensor selection signal from the main control section 51, the selection circuit 73 selects one of these output signals to be input to the integrator 74. The signal selected by the selection circuit 73 is input to the integrator 74 and is integrated here.

An output signal from the integrator 74 is input to a window comparator 75. The window comparator 75 converts an integration output (analog signal) from the integrator 74 to a digital signal. The window comparator 75 is provided with a threshold by the main control section 51 via a D/A converter 76. The D/A converter 76 comprises two D/A converters (D/A1 and D/A2).

An output from the window comparator 75 is sent to a flip-flop circuit (F/F) 77. The flip-flop circuit (F/F) 77 holds an output from the window comparator 75. An output from the flip-flop circuit (F/F) 77 is sent to the main control section 51.

An output signal from the sensor SA is sent to a flip-flop circuit 77 as a clear signal. Output signals from the sensors SA, SH, and SL are sent to a reset signal generation circuit 78. In response to a selection signal from the main control section 51, the reset signal generation circuit 78 generates a reset signal from output signals of the sensors SA, SH, and SL. The integrator 74 is reset by the reset signal to start integration.

Output signals of the sensors SL and SQ are sent to the conversion start signal circuit 79. In response to a selection signal from the main control section 51, the conversion start signal circuit 79 selects one of the output signals of the sensors SL and SQ. The selected signal is sent to the flip-flop circuit 77 as a conversion start signal. A sensor SR's output signal is sent to the main control section 51 as an interrupt signal.

After receiving the interrupt signal from the sensor SR, the main control section 51 reads an output from the flip-flop circuit 77 to obtain the most recent light beam passage position information. Based on the thus obtained light beam passage position information, the main control section 51 computes control amounts for the galvanomirrors 33b, 33c, and 33d. The computation results are stored in memory 52 as needed and are sent to the galvanomirror drive circuits 39b, 39c, and 39d.

The galvanomirror drive circuits 39b, 39c, and 39d are provided with latches 44b, 44c, and 44d for holding the computation results. Once the main control section 51 writes data, these latches hold its value until the data is updated next.

The data held by the latches 44b, 44c, and 44d is converted to an analog signal (voltage) by D/A converters 45b, 45c, and 45d and is input to drivers 46b, 46c, and 46d for driving the galvanomirrors 33b, 33c, and 33d. The drivers 46b, 46c, and 46d drive the galvanomirrors 33b, 33c, and 33d according to the analog signals (voltages) input from the D/A converters 45b, 45c, and 45d.

Accordingly, the third operation example can control a light beam passage position by operating the semiconductor laser oscillator which generates a light beam to be controlled, reading an output from the window comparator 75, and controlling the galvanomirrors 33b, 33c, and 33d based on the read information.

Although not shown in FIG. 12, there are provided a current/voltage conversion amplifier for converting an output current of each sensor to a voltage value and a signal processing circuit such as a binarization circuit for binarizing an output from the current/voltage conversion amplifier.

In the configuration of FIG. 12, when the sensors SP and SO are used for detecting and controlling a light beam passage position, the main control section 51 issues a selection signal to the selection circuit 73 for selecting the differential amplifier 70. By doing so, the main control section 51 selects the sensors SP and SO.

Likewise, the main control section 51 sends a sensor selection signal to the reset signal generation circuit 78 and the conversion start signal circuit 79. By doing so, the main control section 51 generates a reset signal for the integrator 74 and a digital/analog conversion start signal. In this case, the integrator 74's reset signal rises at the leading edge of a sensor SA output and falls at the trailing edge of a sensor SH output. The conversion start signal is generated from an output signal of the sensor SL.

When a light beam passage position is detected and controlled by using the sensors SI and SJ or the sensors SJ and SK, the main control section 51 sends a selection signal for selecting the differential amplifier 70 or 71 to the selection circuit 73. By doing so, the main control section 51 selects either a pair of sensors SI and SJ or a pair of sensors SJ and SK.

Likewise, the main control section 51 sends a sensor selection signal to the reset signal generation circuit 78 and the conversion start signal circuit 79. By doing so, the main control section 51 generates a reset signal for the integrator 74 and a digital/analog conversion start signal. In this case, the integrator 74's reset signal rises at the leading edge of a sensor SA output and falls at the trailing edge of a sensor SL output. The conversion start signal is generated from an output signal of the sensor SQ.

Whichever sensor is selected, the sensor SR's signal output timing allows the main control section 51 to read an integration output of the integrator 74 held by the flip-flop circuit 77.

As mentioned above, one of four light beams is fixed. Accordingly, three galvanomirrors move the remaining three light beams in the vertical scan direction. Namely, the second, third, and fourth light beams correspond to the galvanomirrors 33b, 33c, and 33d, respectively.

Figure 13:
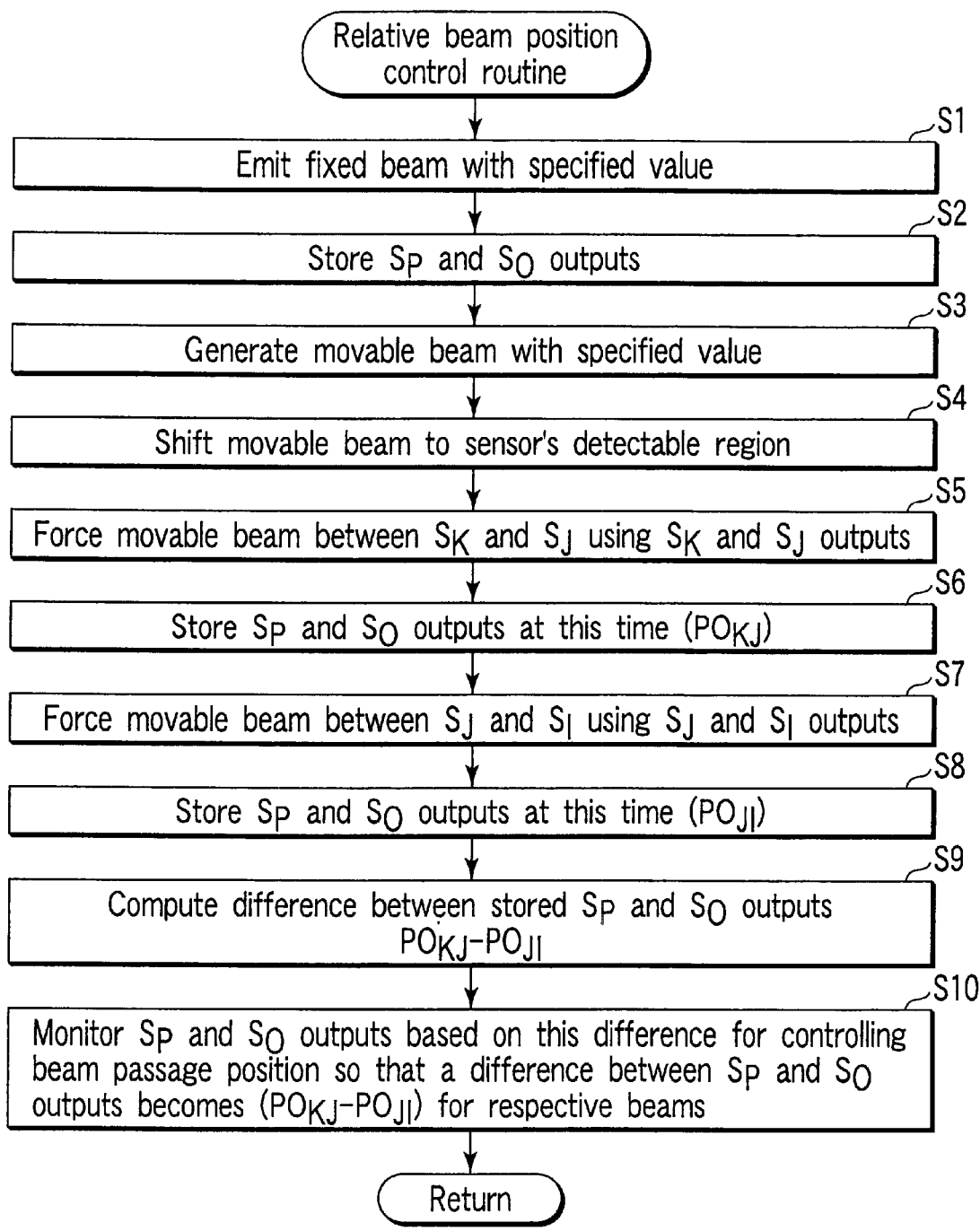
FIG. 13 is a flowchart showing an operation of relative light beam position control.

Described below is relative position control of a light beam in the multi-beam optical system according to the third operation example with reference to the flowchart in FIG. 13. This flowchart explains operations of the circuits configured as shown in FIG. 12.

The main control section 51 generates a fixed light beam with a specified power (step S1). Namely, the main control section 51 sends a specified value to the first laser driver 32a to activate the first laser oscillator 31a with a specified power. By doing so, the main control section 51 outputs a first light beam. In addition, the main control section 51 rotates the polygon mirror 35.

The main control section 51 then issues a selection signal to the selection circuit 73 for selecting the differential amplifier 70. The main control section 51 thus sends a differential output between the sensors SP and SO to the integrator 74. Likewise, the main control section 51 sends a sensor selection signal to the reset signal generation circuit 78 and the conversion start signal circuit 79. By doing so, the main control section 51 generates a reset signal for integrating a differential signal between the sensors SP and SO and an analog/digital conversion start signal. This step allows the main control section 51 to incorporate a differential output between the sensors SP and SO.

After completion of the above setting, the main control section 51 reads a differential output between the sensor patterns SP and SO (step S2). Namely, the main control section 51 detects a passage position of the first light beam (fixed light beam) as the reference using the differential output between the sensors SP and SO. Based on the first light beam's passage position detected at this step, the following steps proceed so that the remaining three light beam passage positions provide a specified pitch, e.g., 42.3 μm.

The main control section 51 then generates the movable second light beam with a specified power (step S3). For example, the main control section 51 sends a specified value to the second laser driver 32b to activate the second laser oscillator 31b with a specified power.

The main control section 51 monitors a differential output between the sensors SP and SO. Therefore, the main control section 51 can keep track of the second light beam's passage position. The main control section 51 operates the galvanomirror 33b so that the second light beam passes within a detection region for the sensors SP and SO. Thereafter, the main control section 51 operates the galvanomirror 33b so that the second light beam passes near the center of the sensors SP and SO. It should be noted that high precision is not required to adjust the light beam passage position at this step.

The main control section 51 controls the second light beam coarse adjusted at step S4 so that its passage position is centered on a gap between the sensors SK and SJ (step S5). The sensors SI, SJ, and SK are approximately centered between the sensors SP and SO.

Accordingly, the main control section 51 can center the light beam passage position on the gap between the sensors SK and SJ without excessively varying that position and consuming time. Detailed below is processing at step S5.

The main control section 51 sends a selection signal to the selection circuit 73 for selecting the differential amplifier 71. Doing so supplies the integrator 74 with a differential output between the sensors SK and SJ. Likewise, the main control section 51 sends a sensor selection signal to the reset signal generation circuit 78 and the conversion start signal circuit 79. By doing so, the main control section 51 generates a reset signal for integrating a differential signal between the sensors SK and SJ and an analog/digital conversion start signal. This setting enables the main control section 51 to incorporate the differential output between the sensors SK and SJ.

The main control section 51 then operates the galvanomirror 33b for the second light beam and provides control to center the second light beam passage position on the gap between the sensors SK and SJ. For operating the galvanomirror 33b, the main control section 51 first places a specified value in the D/A converter 45b.

A signal analog-converted by the D/A converter 45b is input to the driver 46b which outputs a current corresponding to the D/A converted value to the galvanomirror 33b. The galvanomirror 33b operates according to an output current value of the driver 46b. Accordingly, the main control section 51 can change the second light beam passage position by modifying the specified value for the D/A converter 45b.

The main control section 51 re-reads a differential output between the sensors SP and SO (step S6) without changing the setting for the galvanomirror 33b at step S5. The main control section 51 stores the value (POKJ) in the memory 52.

After the second light beam is centered on the gap between the sensors SK and SJ at step S6, the main control section 51 then centers this light beam on the gap between the sensors SJ and SI (step S7).

The main control section 51 sends a selection signal to the selection circuit 73 for selecting the differential amplifier 72. Doing so supplies the integrator 74 with a differential output between the sensors SJ and SI. Likewise, the main control section 51 sends a sensor selection signal to the reset signal generation circuit 78 and the conversion start signal circuit 79. By doing so, the main control section 51 generates a reset signal for integrating a differential signal between the sensors SJ and SI and an analog/digital conversion start signal. This setting enables the main control section 51 to incorporate the differential output between the sensors SJ and SI.

The main control section 51 operates the galvanomirror 33b for the second light beam to center the second light beam passage position on the gap between the sensors SJ and SP like step S5.

When the second light beam passes the center of the gap between the sensors SJ and SI, the main control section 51 re-reads a differential output between the sensors SP and SO and stores its value (POJI) in the memory (step S8).

Then, the main control section 51 computes a difference between the value POKJ in the memory 52 stored at step S6 and the value POJI in the memory 52 stored at step S8 (step S9). A pitch of 42.3 μm is provided between the center of sensors SK and SJ and the center of sensors SJ and SI. When the light beam is moved from step S5 (step S6) to step S7 (step S8), the moving distance is equivalent to 42.3 μm. The difference between POKJ and POJI computed at this step equals the difference between differential outputs from the sensors SP and SO and is equivalent to the moving distance (42.3 μm) for the second light beam.

The main control section 51 then controls to set a pitch of 42.3 μm between the passage position of the fixed light beam (first light beam) and that of the movable second light beam. This step uses a differential output between the sensors SP and SO.

The process at step S2 has already detected the passage position of the first light beam (fixed light beam). The main control section 51 operates the galvanomirror 33b to control the second light beam passage position so that the movable second light beam passage position provides a pitch of 42.3 μm with reference to the first light beam.

The main control section 51 changes the second light beam passage position so that the value found at step S9 (POKJ-POJI) matches a difference between the differential value stored at step S2 and the differential value between the sensors SP and SO indicating the second light beam passage position.

The above-mentioned operation maintains a pitch of 42.3 μm between the first and second light beam passage positions. A similar operation provides a pitch of 42.3 μm between the third and fourth light beam passage positions.

Described below are fourth, fifth, and sixth operation examples of the light beam scanning apparatus.

When the first, second, and third operation examples are used to improve the detection accuracy maximumly, however, an integration output may become incorrect due to characteristics of an operational amplifier constituting the integrator.

Figure 14:
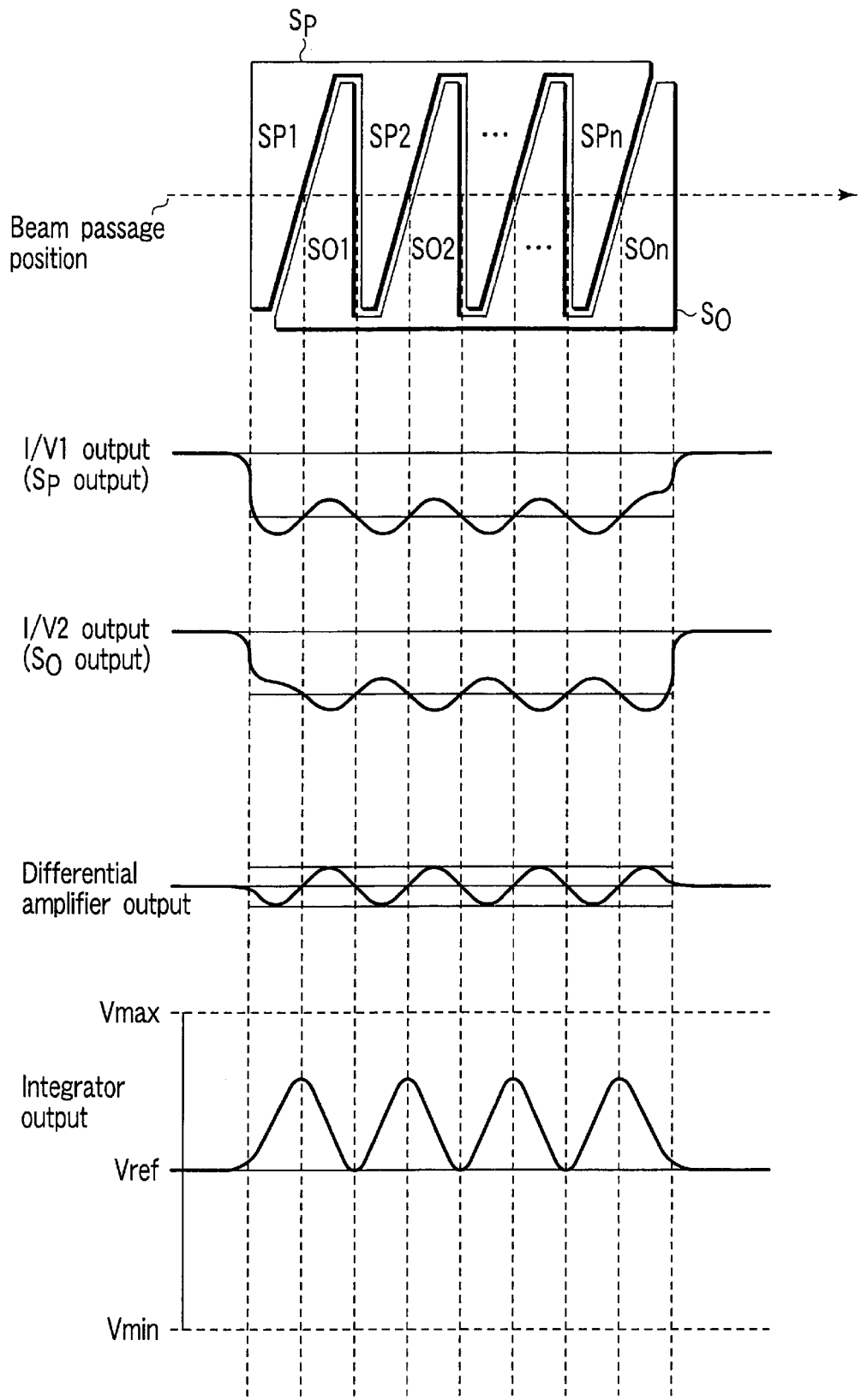
FIG. 14 exemplifies a sensor output, a differential amplifier output, and an integrator output according to a light beam passage position.
Figure 15:
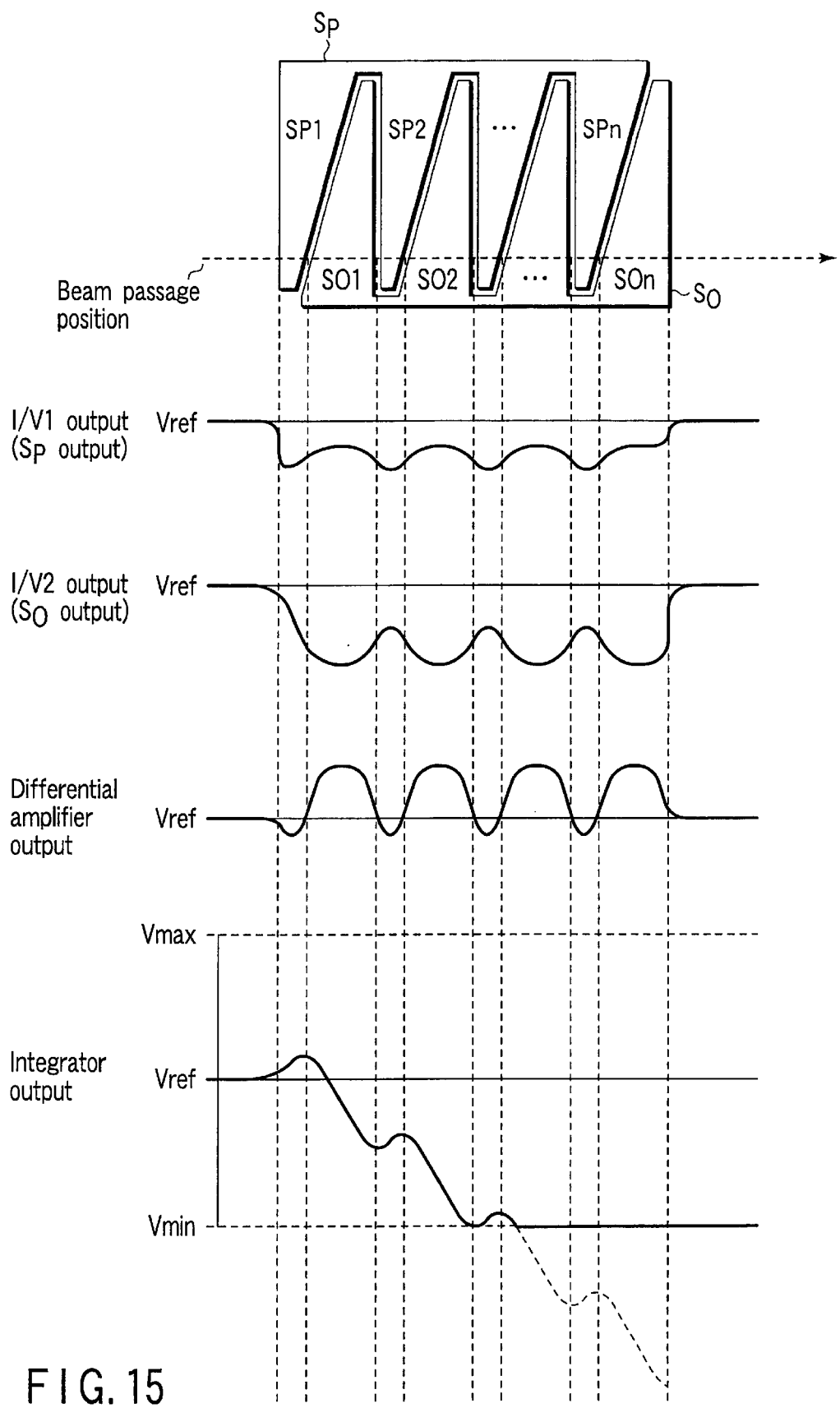
FIG. 15 exemplifies a sensor output, a differential amplifier output, and an integrator output according to a light beam passage position.

For further improving the detection accuracy in FIG. 8, FIGS. 14 and 15 provide examples of increasing gains of the current/voltage conversion amplifiers (I/V1 and I/V2) and moreover sensitizing the integration constant RC. FIG. 14 shows that a light beam passes almost the center between the sensors SP and SO.

The example in FIG. 14 increases gains of the current/voltage conversion amplifiers (I/V1 and I/V2), also increasing amplitudes of outputs from the current/voltage conversion amplifiers I/V1 and I/V2 compared to those in FIG. 8. These outputs are current-voltage converted outputs from the sensors SP and SO. In addition, the differential amplifier 61 produces an increased output amplitude. Since the integration constant RC is set to a small value for more sensitivity, the integrator 62 produces an output several times larger than that in FIG. 8. Since the beam passage position approximately corresponds to the center between the sensors SP and SO, an integration output finally becomes the reference voltage Vref.

FIG. 15 shows outputs from respective circuit components when the light beam passage position is shifted downward toward the bottom of the figure. Since the light beam passage position is lowered, the sensor pattern SP outputs a decreased amplitude in the current/voltage conversion amplifier I/V1. By contrast, the sensor pattern SO outputs an increased output in the current/voltage conversion amplifier I/V2. Accordingly, an output of the differential amplifier 61 is greatly generated above the Vref. When the integrator 62 integrates the differential amplifier 61's output, this means alternate integration of outputs from the sensors SP and SO. Since the sensor SO produces a large output, the integration output is generated below the Vref.

When the power supply voltage is configured with a single power supply, an integration output becomes saturated and fixed to Vmin (near the ground), preventing further integration below Vmin. If there are no restrictions on a power supply voltage, for example, an integration operation should continue as indicated with a broken line in the figure. Actually, however, the integration stops at Vmin. This prevents a normal integration operation and accurate detection of a light beam passage position. It takes some time to restore a normal operation from this state. In the worst case, the power supply voltage needs to be removed temporarily. The same may occur when the light beam passes toward the top in the figure. In this case, an integration output remains at Vmax, disabling a normal integration operation.

The fourth to sixth operation examples described below can solve this problem.

The fourth operation example of the light beam scanning apparatus is explained hereinafter.

The fourth operation example concerns the amplitude of an input signal to the integrator 62 for controlling the input signal amplitude. By doing this, the fourth operation example can prevent saturation of an output signal from the integrator 62 and provide a wide-range, high-precision light beam detection and control system.

FIG. 16 shows an example of controlling the amplitude of an input signal to the integrator 62 under the same conditions as in FIG. 14. In FIG. 16, a broken line indicates that no amplitude is controlled in an input signal to the integrator 62. A solid line indicates that the amplitude is controlled in that signal.

When the light beam scan position crosses below the center of a pair of sensors SO and SP, the lower sensor pattern SO provides a greater output. As shown with the broken-line wave in FIG. 16, the integrator 62's output is fixed to Vmin when the lower sensor SO's output exceeds a specified value. This is because the sensor SO's output increases according to the amplitude and the passage of time. Saturation of an integrator 62's output can be prevented by decreasing the output signal amplitude for the sensor SO to the extent that the integrator 62's output is not saturated.

In FIG. 16, the sensor SO's output is decreased to a signal level for VD3. As shown in the figure, the differential amplifier 61's output level decreases from the state before correction (broken line) to the state after correction (solid line). Accordingly, the integrator 62's output is not saturated.

When the light beam passage position goes below the center between a pair of sensors SO and SP, saturation of an integrator 62's output, if any, is corrected so that the lower sensor SO decreases the output signal amplitude. When the light beam passage position goes above the center of a pair of sensors SO and SP, saturation of an integrator 62's output, if any, is corrected so that the upper sensor SP decreases the output signal amplitude. Thus, it is possible to provide control to produce a normal integrator output without saturating the integrator 62's output.

Figure 17:
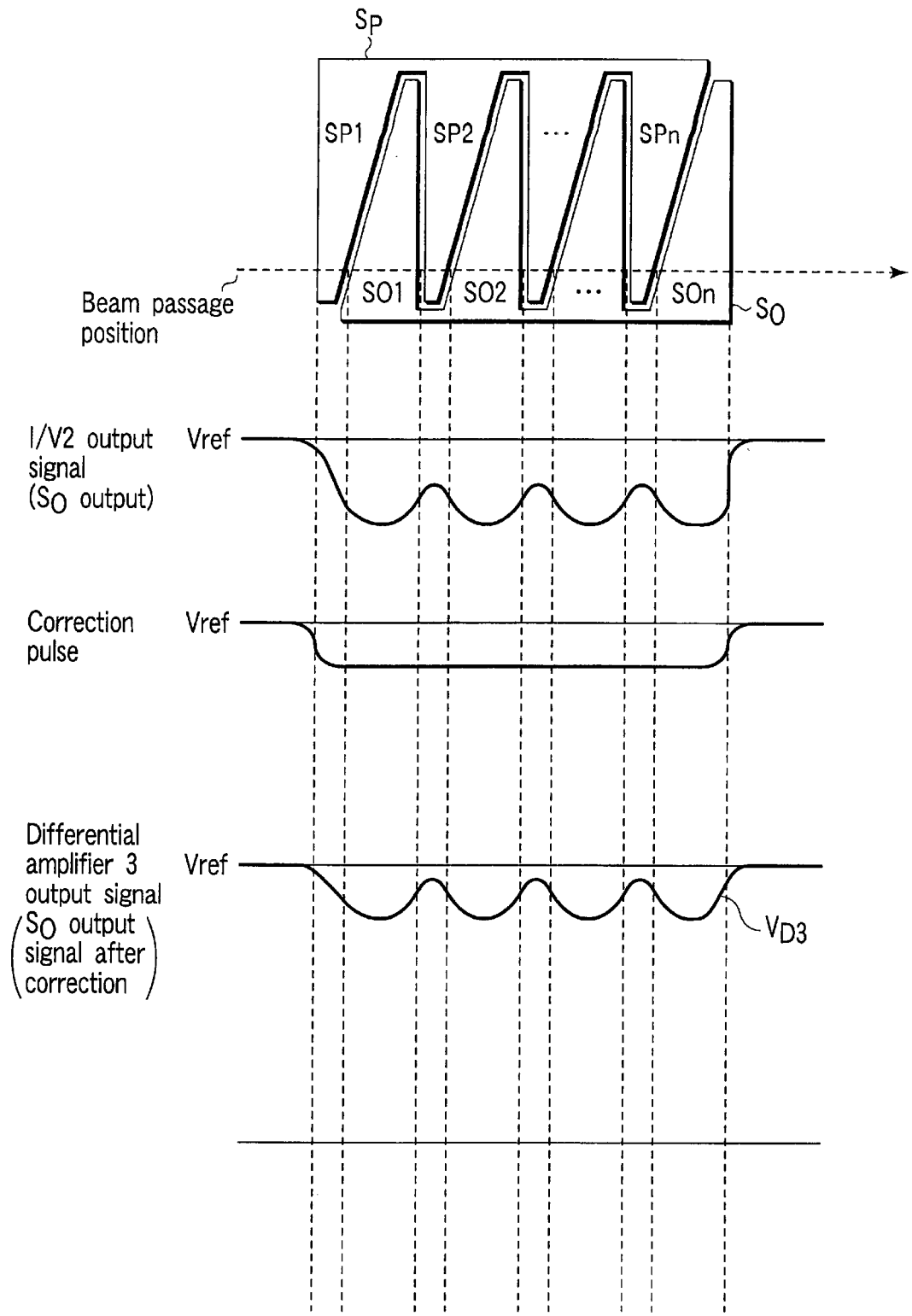
FIG. 17 exemplifies a sensor output, a differential amplifier output, and an integrator output according to a light beam passage position.

FIG. 17 shows how to correct an input signal to the integrator 62. In FIG. 17, a correction pulse is used for decreasing the amplitude of an output signal from the sensor SO. The correction pulse is removed from the sensor SO's output signal. This decreases the amplitude of output signals from the sensor SO. At this time, the CPU 51 freely controls the correction pulse amplitude.

Figure 18:
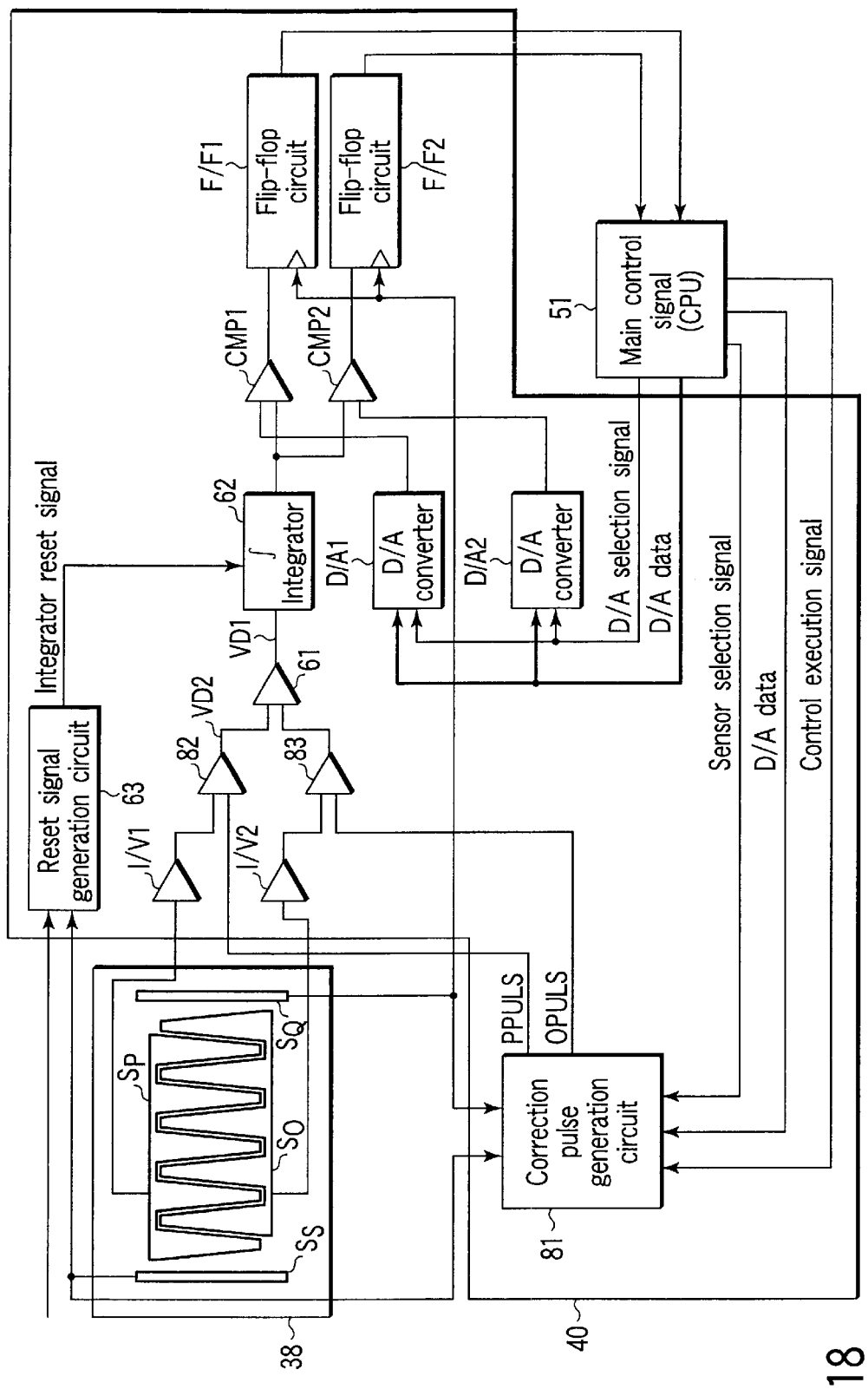
FIG. 18 is a block diagram showing a configuration example of a processing circuit for processing an output signal from the light beam detection section.

FIG. 18 is a block diagram showing a configuration example of the light beam scanning apparatus capable of providing control in FIG. 16 (indicated with solid lines) or FIG. 17.

A difference between the circuit configurations in FIGS. 18 and 5 is that a correction pulse generation circuit 81, differential amplifiers 82 and 83, and a timing sensor SS are added in FIG. 18. The correction pulse generation circuit 81 generates a correction pulse.

The differential amplifier 82 or 83 is provided between the current/voltage conversion amplifier (I/V1 or IV2) and the differential amplifier 61. The timing sensor SS takes timing for generating a correction pulse. The mutually corresponding parts in FIGS. 5 and 18 are designated by the same reference numerals and a detailed description is omitted for simplicity.

Here, as shown in FIGS. 16 and 17, operations of the circuitry in FIG. 18 are explained assuming that a light beam passes below the center of a pair of sensors SP and SO.

When the correction pulse generation circuit 81 sets the correction pulse to the reference (no correction), a normal beam detection is performed like the circuit in FIG. 5. According to this beam detection, the main control section (CPU) 51 is supplied with an output signal from the integrator 62 via the comparators (CMP1 and CMP2) and the flip-flop circuits (F/F1 and F/F2). The CPU 51 determines the necessity of correction depending on whether an integrator 62's output signal approaches the power supply voltage (Vmax) or the ground level (Vmin).

When the correction is determined to be needed, the CPU 51 determines which of a pair of sensors SP and SO requires correction for output signals. When an output signal from the integrator 62 approaches the power supply voltage (Vmax), the CPU 51 determines correction for the sensor SP's output. When an output signal from the integrator 62 approaches the ground level (Vmin), the CPU 51 determines correction for the sensor SO's output.

Namely, the circuitry in FIG. 18 corrects sensor SP outputs when the output signal from the integrator 62 approaches the power supply voltage (Vmax). The circuitry corrects sensor SO outputs when the output signal from the integrator 62 approaches the ground level (Vmin).

In the cases of FIGS. 16 and 17, for example, the circuitry in FIG. 18 corrects sensor SO outputs. At this time, the CPU 51 reads output signals of the flip-flop circuits (F/F1 and F/F2) and determines that the output signal approaches Vmin and that the sensor SO output needs to be corrected.

When determining correction of the sensor SO's output, the CPU 51 issues a control execution signal and a sensor selection signal. The control execution signal indicates that the correction control is applied to the correction pulse generation circuit 81. The sensor selection signal indicates an object to be corrected, namely the sensor SO's output to be corrected.

The CPU 15 sends D/A data indicating the correction pulse amplitude to the correction pulse generation circuit 81. A value (D/A value) indicated by this D/A data is predefined. It may be preferable to settle the value indicated by the D/A data by gradually adjusting a given initial value.

The correction pulse generation circuit 81 is designed to supply a correction pulse to only outputs from the sensor SO based on an instruction from the CPU 51. A correction pulse signal for sensor SP outputs is set to the reference voltage. Accordingly, no correction is performed for outputs from the sensor SP.

After the above setup, the circuitry in FIG. 18 performs correction when a light beam passes the sensor. When the light beam passes the sensor SS, the correction pulse generation circuit 81 generates the correction pulse (OPULS) as shown in FIG. 17. The generated correction pulse (OPULS) is input to the differential amplifier 83. The sensors SP and SO generate current outputs when the light beam passes. These current outputs from the sensors SP and SO are converted to voltage signals by the current/voltage conversion amplifiers (I/V1 and I/V2), and then are input to the differential amplifiers 82 and 83.

The differential amplifier 83 computes a difference between an output voltage from the current/voltage conversion amplifier (I/V2) for the sensor SO and a correction voltage as the correction pulse (OPULS) transmitted from the correction pulse generation circuit 81. The obtained difference becomes a voltage output VD3.

The differential amplifier 82 computes a difference between an output voltage from the current/voltage conversion amplifier (I/V1) for the sensor SP and the reference voltage (PPULS) transmitted from the correction pulse generation circuit 81. The obtained difference becomes a voltage output VD2. When a gain of the differential amplifier 82 is set once (×1), the VD2 equals an output voltage of the current/voltage converter (I/V1).

The differential amplifier 81 then computes a difference between the VD2 and the VD3. The computation result is input as an output voltage to the integrator 62. The integrator 62 integrates the output voltage from the differential amplifier 81. The window comparator, the A/D converter, the flip-flop circuit, and the like operate the same as described in FIG. 5 and a detailed description is omitted here for simplicity.

Similarly, when the light beam passage position is above the sensor's center position, the CPU 51 allows the correction pulse generation circuit 81 to correct only outputs from the sensor SP. The correction pulse (PPULS) becomes a correction voltage as a correction value. The correction pulse (OPULS) functions as a reference voltage without correction. Consequently, only an output signal from the sensor SP is corrected.

As mentioned above, a correction pulse is used for control based on a correction value determined by the CPU so that an integrator output is not saturated. This makes it possible to normally generate an output signal indicating the light beam detection position without saturating an integrator output even if the current/voltage conversion amplifier's amplification factor is increased or the integrator's integration constant is sensitized.

The correction pulse generation circuit 81 is detailed below.

FIG. 19 shows a configuration example of the correction pulse generation circuit 81. The correction pulse generation circuit 81 in FIG. 19 comprises a D/A converter 91, a reference voltage generation section 92, a logic circuit 93, resistors (R100, R101), operational amplifiers (A100, A101, A103, A104), analog switches (SW1, SW2), and the like.

The D/A converter 91 adjusts the correction pulse amplitude. Based on a digital signal supplied from the CPU 51, the D/A converter 91 generates an analog voltage and supplies it to the operational amplifier A100. The digital signal is digital data indicating a value of analog voltage to be generated.

The reference voltage generation section 92 generates and outputs a reference voltage in the correction pulse generation circuit 81. Since the example in FIG. 19 is a single power supply system of 0 to 5 V, the reference voltage generation section generates the 2.5 V reference voltage and supplies it to the succeeding stages.

The operational amplifiers (A100, A101, A103, A104) and the analog switches (SW1, SW2) generate correction pulses based on signals from the above-mentioned sections.

The logic circuit 93 comprises an AND circuit (AND1), flip-flop circuits (F/F100, F/F200), an exclusive OR circuit (EOR1), NAND circuits (NAND1, NAND2), and the like.

Based on a sensor selection signal (SEL0-1) from the CPU 51, the logic circuit 93 selects a sensor to be corrected. Based on control execution signals (SAOUT-0, CNTLV-1) from the CPU 51, the logic circuit 93 determines whether to perform correction. Further, the logic circuit 93 changes analog switches SW1 and SW2 according to timings of a sensor SS output (SSOUT-1) and a sensor SQ output (SQOUT-1).

Described below are operations of the correction pulse generation circuit 81.

First described is a portion comprising the D/A converter 91, the operational amplifiers A100, A101, A103, the analog switch (SW1), the resistor (R100), and the reference voltage generation section 92. The circuit comprising these parts is a sensor SO's correction pulse generation section which generates the correction pulse (PPULS) for correcting sensor SP outputs.

The D/A converter 91 generates an analog voltage (WINTHH) based on the digital signal supplied from the CPU 51. The analog voltage generated from the D/A converter 91 is input to a noninverting terminal of the operational amplifier A100. The analog voltage generated from the D/A converter 91 adjusts the correction pulse amplitude.

The operational amplifier A100 is a voltage follower. Accordingly, an output of the D/A converter 91 is output from the operational amplifier A100 as is. The reference voltage generation section 92 supplies 2.5 V which is the reference voltage for the correction pulse generation circuit 81. This output (reference voltage) is supplied to a noninverting input terminal of the operational amplifier A101.

When the analog switch SW1 goes OPEN, an output of the operational amplifier A100 is output as the correction pulse (PPULS) for correcting sensor SP outputs via the voltage follower of the operational amplifier A103. Accordingly, when the analog switch SW1 goes OPEN, an analog voltage is output as the correction pulse (PPULS) from the D/A converter 91 based on D/A data supplied from the CPU 51.

When the analog switch SW1 goes CLOSE, the operational amplifier A101 functions so that the operational amplifier A101's inverting input terminal generates an electric potential of 2.5 V. Accordingly, the A103's noninverting input terminal also becomes 2.5 V. The operational amplifier A103's voltage follower outputs 2.5 V as PPULS. When the analog switch SW1 goes CLOSE, an output of the reference voltage generation section 92 is generated as PPULS from the operational amplifier A103.

By turning on or off the analog switch SW1 at a given timing, the PPULS can be selected as an output from the reference voltage generation section 92 (reference voltage) or an output from the D/A converter 91 (analog voltage specified by the CPU 51).

The portion comprising the D/A converter 91, the operational amplifier A100, A101, A103, the analog switch (SW1), the resistor (R100), and the reference voltage generation section 92 functions as a sensor SO's correction pulse generation section. This is a circuit which generates a correction pulse (OPULS) for correcting sensor SO outputs.

Like the sensor SP's correction pulse generation section, the sensor SO's correction pulse generation section also uses the operational amplifiers A104 and A105 to generate the correction pulse (OPULS). Namely, the operational amplifiers A104 and A105 operate like the operational amplifiers A101 and A103. Accordingly, by turning on or off the analog switch SW2 at a given timing, the OPULS can be selected as an output from the reference voltage generation section 92 (reference voltage) or an output from the D/A converter 91 (analog voltage specified by the CPU 51).

The analog switch turns on or off depending on timings at which the sensor selection signal, the sensor SS, and the sensor SQ occur.

When a sensor SO's output is corrected, the sensor selection signal (SELO-1) goes "1". This sets one input side of the NAND circuit (NAND1) to "1" and one input side of the NAND circuit (NAND2) to "0". Accordingly, an output of the NAND circuit (NAND1) depends on an EOR1 output. An output of the NAND circuit (NAND1) always goes 1 independently of the EOR1 output.

An output of the NAND circuit (NAND1) turns on or off the analog switch SW1 at output timings of the sensors SS and SQ. The analog switch SW2 always maintains the ON (CLOSE) state according to an output of the NAND circuit (NAND2). The PPUL, as an output signal of the operational amplifier A103, becomes a pulse signal at the timing output from the sensors SS and SQ. The OPULS, as an output signal of the operational amplifier A105, becomes an output voltage of the reference voltage generation section 92, namely 2.5 V.

The above-mentioned configuration makes it possible to generate any pulse signal during a period between the sensor SS's output timing and the sensor SQ's output timing.

Figure 20:
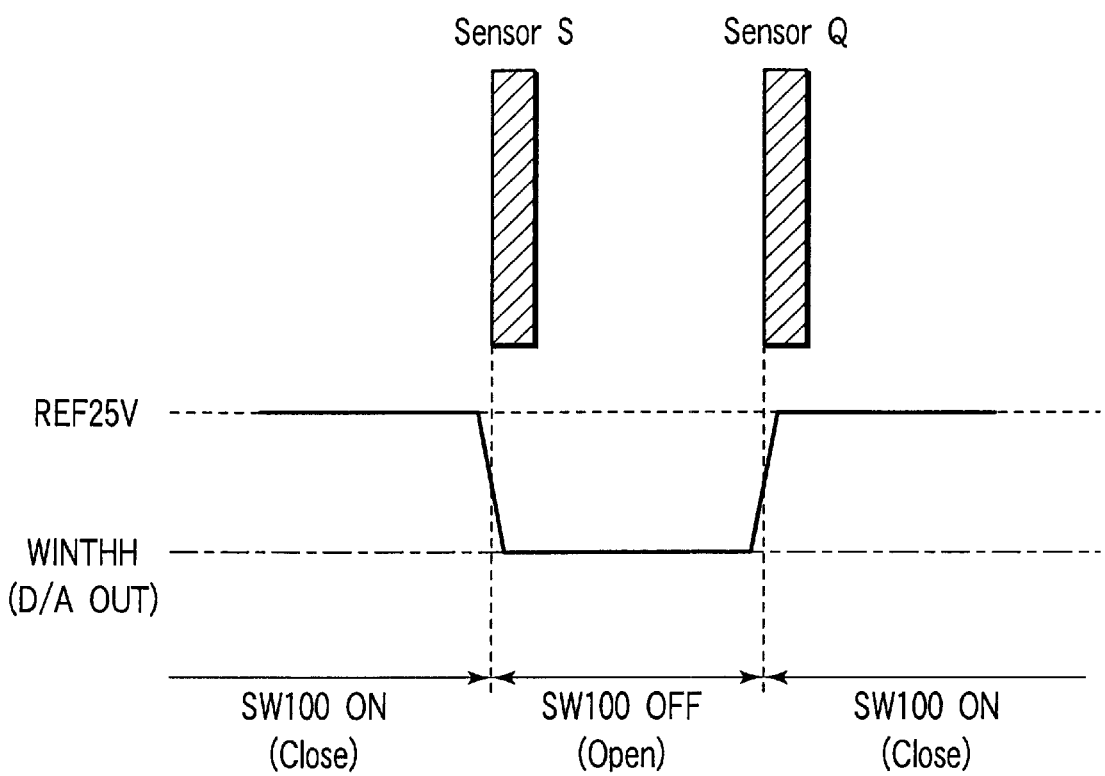
FIG. 20 shows relationship between a timing sensor and a correction pulse.

FIG. 20 shows the PPULS as an output signal of the operational amplifier A103. In this figure, the sensor SS output timing turns off the analog switch SW1. The PPULS changes from the reference voltage to the WINTHH. The sensor SQ output timing turns on the analog switch SW1. The PPULS changes from the WINTHH to the reference voltage.

Figure 21:
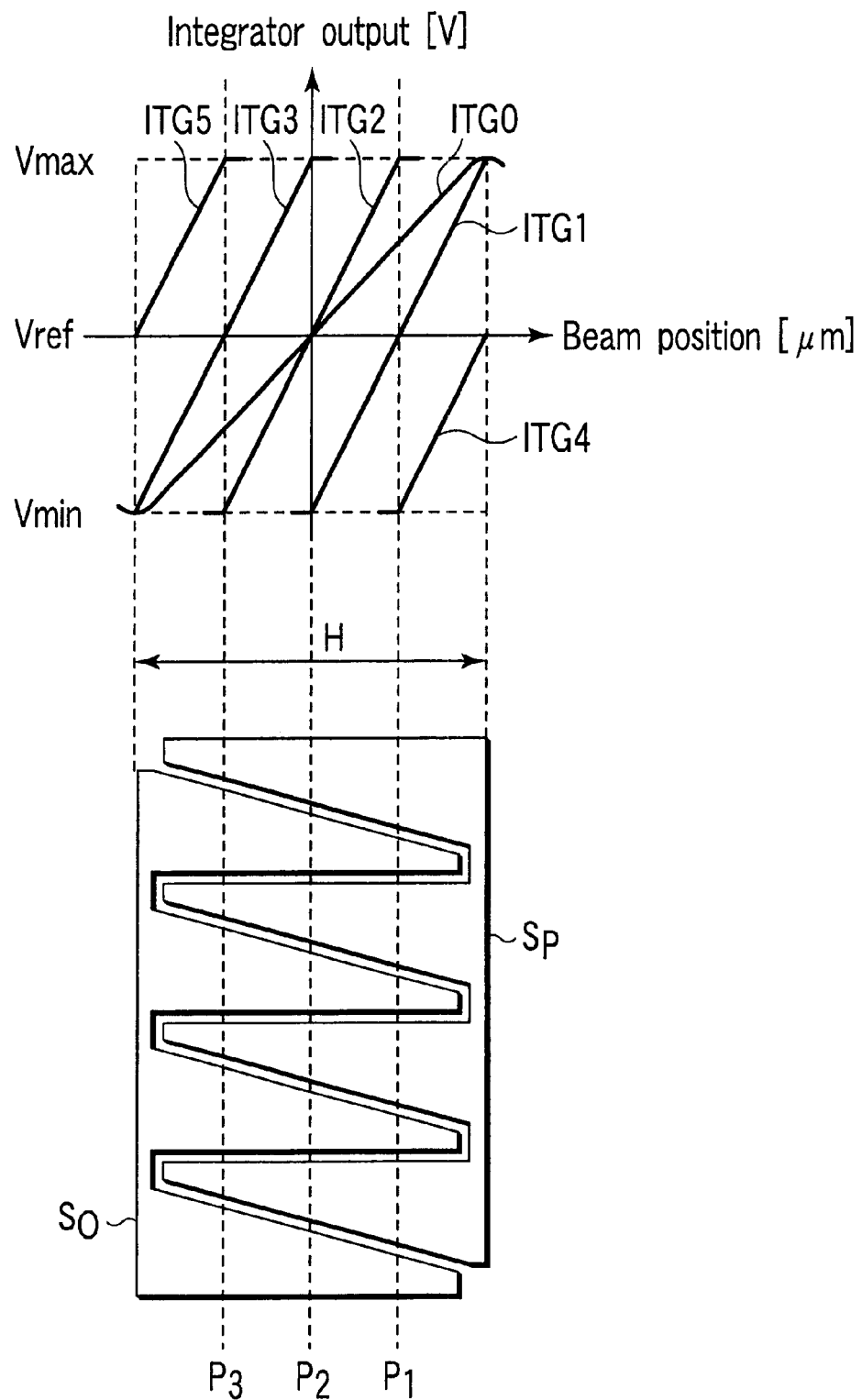
FIG. 21 shows relationship between a light beam passage position and an integration output.

FIG. 21 shows relationship between an integrator 62's output and the light beam passage position when the correction as described in the fourth operation example is performed. As seen from this figure, an integrator 62's output is almost saturated at the light beam passage positions P1 and P3. When the light beam passes above (outside) the passage position P1 or below (outside) the passage position P3, the light beam passage position cannot be detected.

When a light beam passes the passage position P3, the integrator 62's output becomes ITG2 without correction. The integrator 62's output becomes Vmin and approaches the saturation region. In this case, an ITG3's output can be obtained when an output from the sensor SO is corrected and the CPU 51 adjusts a specified value so as to set the integrator 62's output approximately to Vref. The ITG3 can detect a range of ±H/4 from the passage position P3 used as the center.

Similarly, when a light beam passes the passage position P1, the sensor SP should be corrected. Also in this case, an ITG1 output can be obtained when the CPU 51 adjusts a specified value so as to set the integrator 62's output approximately to Vref. The ITG1 can detect a range of ±H/4 from the passage position P1 used as the center.

It may be preferable to predetermine the relationship between a value specified by the CPU 51 and the beam detection characteristic. Based on the beam detection characteristic (integrator's output graph) as shown in FIG. 21, specified values should be predetermined so as to provide detection characteristics of ITG1, ITG2, ITG3, ITG4, and ITG5. It is possible to detect light beam passage positions all over the sensor regions by using these five specified values and corresponding beam detection characteristics (integration characteristics). Predetermining specified values simplifies adjustment of these values and makes the management easy.

Described below are control operations of the main control section (CPU) 51 in the thus configured circuit.

Figure 22:
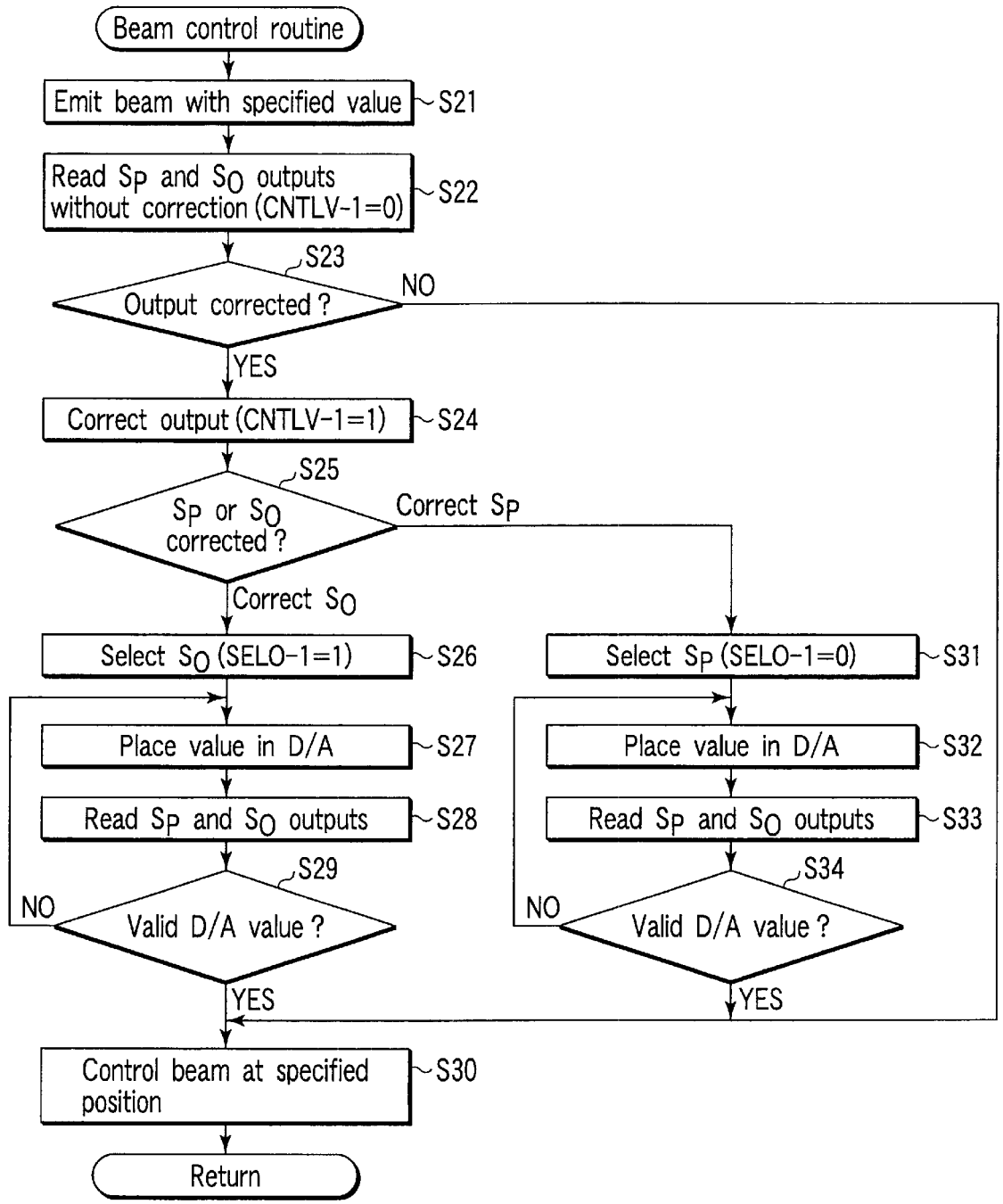
FIG. 22 is a flowchart showing an operation example of light beam control.

FIG. 22 is a flowchart for explaining CPU 51's control operations.

The CPU 51 first generates a light beam with a specified value (step S21). When the light beam is generated, the CPU 51 reads an output signal from the sensors SP and SO without correction (step S22). At this time, the CPU 51 sets the control execution signal (CNTLV-1) to "0" for operating the circuit without correction.

When reading output signals from the sensors SP and SO, the CPU 51 determines the necessity of correction based on output signal values (step S23). When it is determined that the correction is needed (YES at step S23), the CPU 51 sets the control execution signal (CNTLV-1) to "1" (step S24). Based on the read data, the CPU 51 determines whether to correct the sensor SP's output or the sensor SO's output (step S25).

When the sensor SO's output is determined to be corrected, the CPU 51 sets SEL0-1 to "1" which is a sensor selection signal to be corrected (step S26). The CPU 51 sets a specified value supplied to the D/A converter 91 according to an output signal value of the sensor SO (step S27). At this time, the CPU 51 sets specified values predefined for ITG1 to ITG5 as shown in FIG. 21, for example.

After supplying these signals to the correction pulse generation circuit 81, the CPU 51 rereads output signals from the sensors SP and SO (step S28). According to the read values for the sensors SO and SP, the CPU 51 checks if the specified values are set correctly (step S29). When it is determined that the specified values are incorrect, the CPU 51 returns to step S27 to reset the specified values. When it is determined that the specified values are proper (YES at step S29) or that no correction is needed (NO at step S23), the CPU 51 determines the detection result about the light beam position. Based on this determination, the CPU 51 controls the light beam to a specified position (step S30).

When it is determined that the sensor SP's output is corrected at step S23, the CPU 51 sets SEL0-1 to "0" which is a sensor selection signal indicating an object to be corrected (step S31). According to the sensor SP's output signal value, the CPU 51 sets a specified value supplied to the D/A converter 91 (step S32). At this time, the CPU 51 sets specified values predefined for ITG1 to ITG5 as shown in FIG. 21, for example.

After supplying these signals to the correction pulse generation circuit 81, the CPU 51 rereads output signals from the sensors SP and SO (step S33). According to the read values for the sensors SO and SP, the CPU 51 checks if the specified values are set correctly (step S34). When it is determined that the specified values are incorrect, the CPU 51 returns to step S32 to reset the specified values. When it is determined that the specified values are proper (YES at step S34), the CPU 51 determines the detection result about the light beam position. Based on this determination, the CPU 51 controls the light beam to a specified position (step S30).

The fifth operation example of the light beam scanning apparatus is explained hereinafter.

The fifth operation example applies the correction function in the fourth operation example to a light beam scanning apparatus according to the multi-beam optical system.

Figure 23:
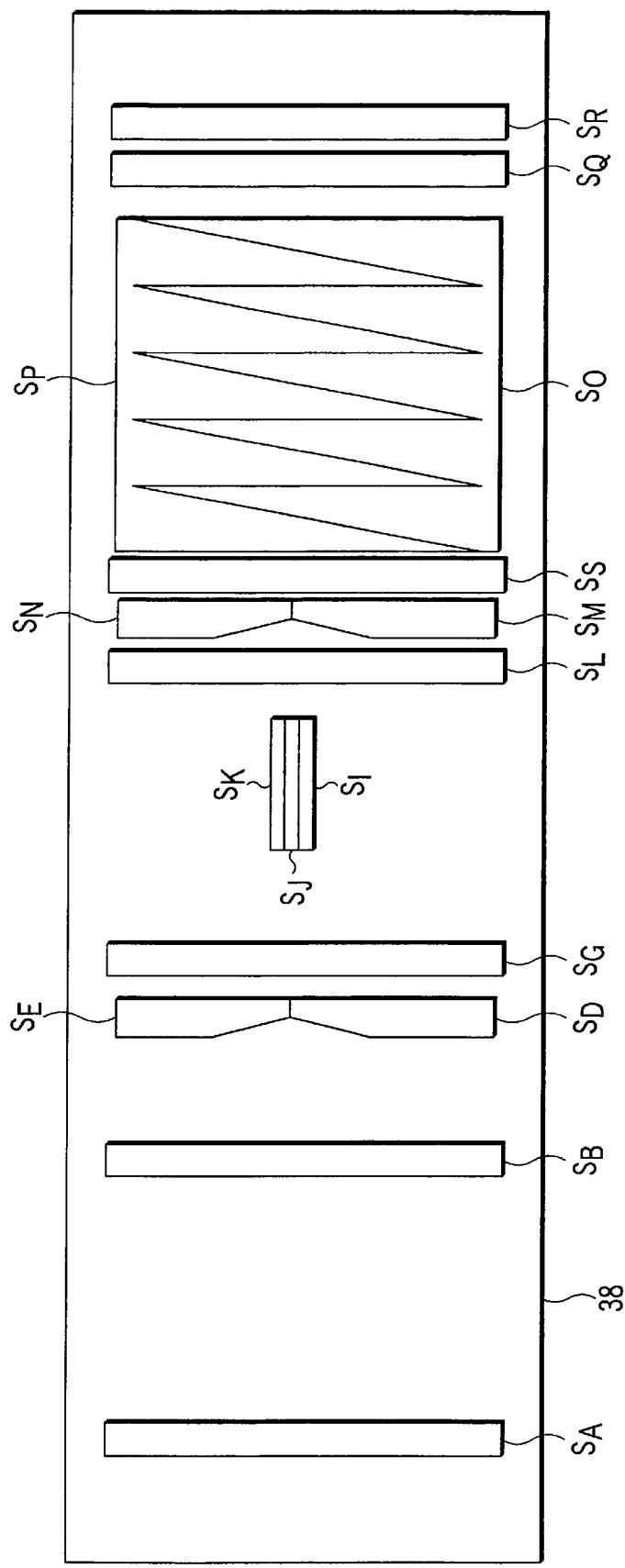
FIG. 23 shows a schematic configuration example of the light beam detection section.

FIG. 23 shows a configuration example for implementing the fifth operation example. A difference between FIGS. 23 and 8 is that a timing sensor SS is added in FIG. 23 for generating a correction pulse. Except the timing sensor SS, the mutually corresponding parts in FIGS. 8 and 23 are designated by the same reference numerals and a description is omitted for simplicity.

Described below is the multi-beam passage position control using the light beam detection section 38 in FIG. 23. The following description assumes a 4-beam multi-beam optical system having four laser oscillators and four actuators (galvanomirrors in this example) for moving respective light beams in the vertical scan direction. This multi-beam optical system is assumed to provide the 600 dpi resolution.

As mentioned in the fourth operation example, the light beam detection section 38 has the detection characteristic as shown in FIG. 21. When the sensor's effective detection region is assumed to be H[$\mu$m] in FIG. 21, a voltage value equivalent to 1[$\mu$m] is (|Vmax−Vmin|)/(H/2)=Vunit[V/$\mu$m]. In FIG. 21, ITG1 to ITG5 as output integrator's output characteristics should have voltage values equivalent to (|Vmax−Vmin|)/(H/2)=V unit[V/$\mu$m] per 1[$\mu$m]. In order to provide a pitch of 600 dpi=42.3 $\mu$m for a plurality of beams, the galvanomirrors should be adjusted so that an integration output difference between beams becomes Vunit×42.3[V]. This means controlling beam actuators.

To set a passage target position of the first light beam to P2, for example, the main control section 51 activates the first laser oscillator to rotate a polygon mirror. Then, the main control section 51 operates the galvanomirror for the first light beam so that the light beam can pass within the sensors SP and SO. After the light beam successfully passes within the sensor patterns, the main control section 51 uses the galvanomirror to adjust the first light beam passage position so that the integration output becomes Vref.

Then, the main control section 51 adjusts the second light beam passage position. The main control section 51 activates the second laser oscillator to at rotate the polygon mirror 35. Like the first light beam, the main control section 51 operates the galvanomirror for the second light beam so that the light beam can pass within the sensor patterns. Thereafter, the main control section 51 uses the galvanomirror for the second light beam to adjust the second light beam passage position so that the integrator output becomes Vref−Vunit×42.3[V].

These operations control and provide a pitch of 42.3[μm] between the first and second light beam passage positions. Similar operations are used for the third and fourth light beams. Namely, the galvanomirror for the third or fourth light beam is adjusted so that a difference between integration outputs of adjacent light beams becomes Vunit×42.3[V] equivalent to 42.3[μm].

The above operations provide control to maintain a pitch of 42.3[μm] between four light beam passage positions. Thus, it is possible to control four light beam passage positions to a specified pitch.

The sixth operation example of the light beam scanning apparatus is explained hereinafter.

The sixth operation example uses a fixed light beam passage position as a reference in a light beam scanning apparatus having the multi-beam optical system. Based on this, the operation example controls the remaining light beam passage positions to a specified pitch (relative position control).

Figure 24:
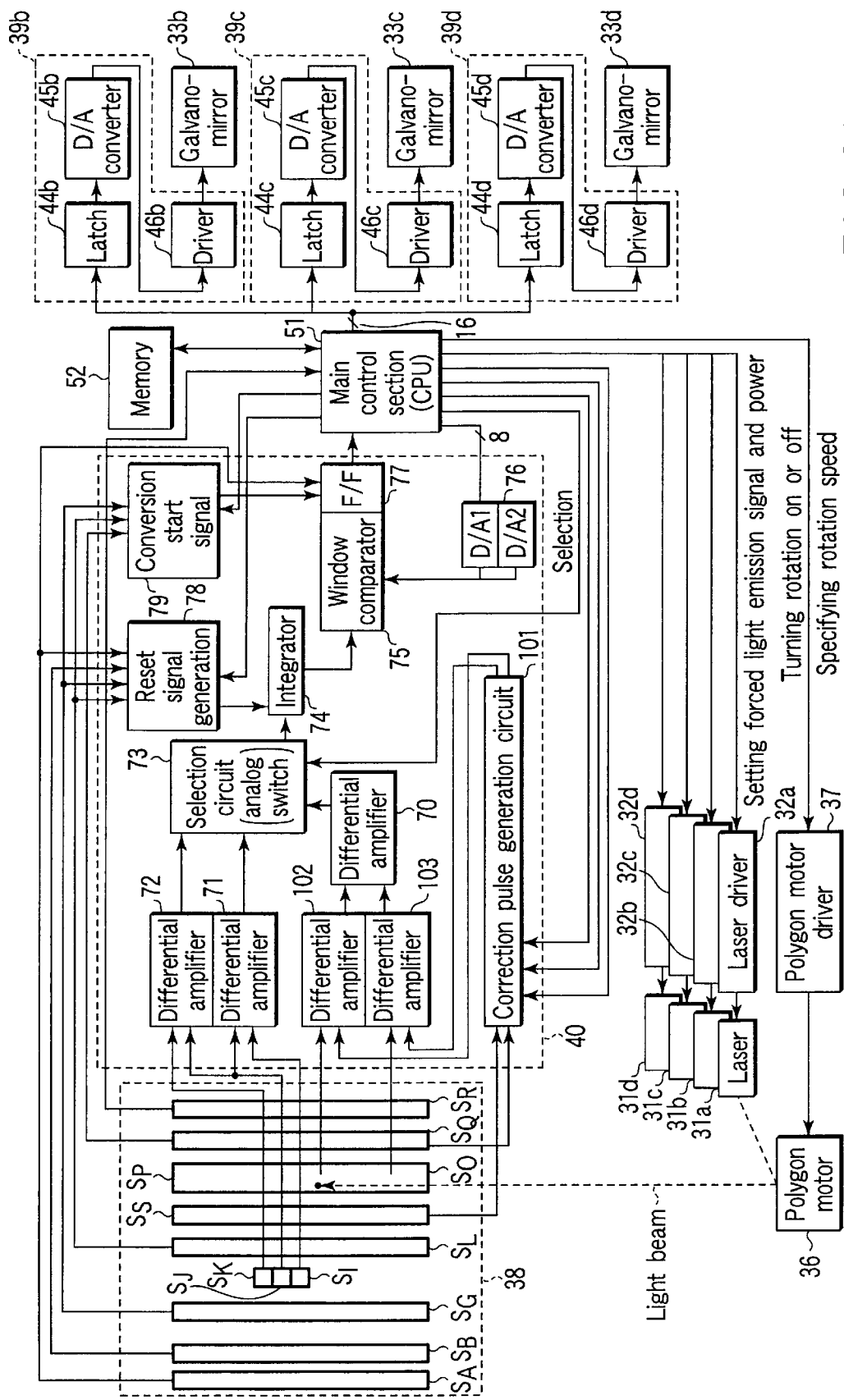
FIG. 24 is a block diagram schematically showing a configuration example of the optical control system.

FIG. 24 is a block diagram showing a configuration example for implementing the sixth operation example.

A difference between the circuits in FIGS. 24 and 12 is that differential amplifiers 102 and 103 are added before the differential amplifier 61 in FIG. 24. Further, there are added a timing sensor SS and a correction pulse generation circuit 101 for generating a correction pulse. Except these differences, the configuration is same as that in FIG. 12. Therefore, the same parts or components are depicted by the same reference numerals and a detailed description is omitted for simplicity. The correction pulse generation circuit 101 and the differential amplifiers 102 and 103 operate the same as the correction pulse generation circuit 81 and the differential amplifiers 82 and 83 described in the fifth operation example.

In the circuit of FIG. 24, the correction pulse generation circuit 101 connects with the main control section 51 and the timing sensors SS and SQ. The differential amplifiers 102 and 103 connect with the sensors SO and SP, respectively.

In the circuit of FIG. 24, an output of the integrator 74 is input to the main control section 51 based on the light beam position according to the same operation as in FIG. 12. Based on the integrator 74's output, the main control section 51 determines the necessity of correction. When determining the necessity of correction, the main control section 51 selects the sensor SO or SP to be corrected and sets a specified value for indicating the correction pulse value as a correction amount. At this time, the main control section 51 outputs a control execution signal indicating that the correction control is performed, a sensor selection signal indicating the sensor to be corrected, and the specified value indicating the correction pulse value to the correction pulse generation circuit 101. The main control section 51 sends a control signal to the selection circuit 73 for selecting the differential amplifier 70.

The correction pulse generation circuit 101 sets a correction pulse with a voltage value specified by the CPU 51 for the differential amplifier 102 (or 103) connected to the sensor SO (or SP) selected by the sensor selection signal from the main control section 51. At this time, a correction pulse is set to the reference voltage for the differential amplifier 103 (or 102) connected to sensor SP (or SO) not selected by the sensor selection signal. The correction pulse is supplied to the differential amplifiers 102 and 103 at the timing when the timing sensor SS detects a light beam.

When supplied with the correction pulses, the differential amplifiers 102 and 103 provide the differential amplifier 70 with a difference between the correction pulse and the sensor SO or SP whose output signal is input to either of the differential amplifiers. According to this operation, the differential amplifier 70 is supplied with output signals from the sensors SO and SP. At this time, these output signals are corrected with the value set by the main control section 51.

Detailed operations of the sixth operation example are described with reference to FIGS. 25 and 26.

FIG. 25 shows relationship between a light beam passage position and an integration output on the sensors SP and SO. Integrator outputs based on outputs from the sensors SP and SO have characteristics of ITG1 to ITG5 according to correction pulses from the correction pulse generation circuit 81. It should be noted that the ITG2 is an integration output (beam detection characteristic) when no correction is performed.

Figure 26:
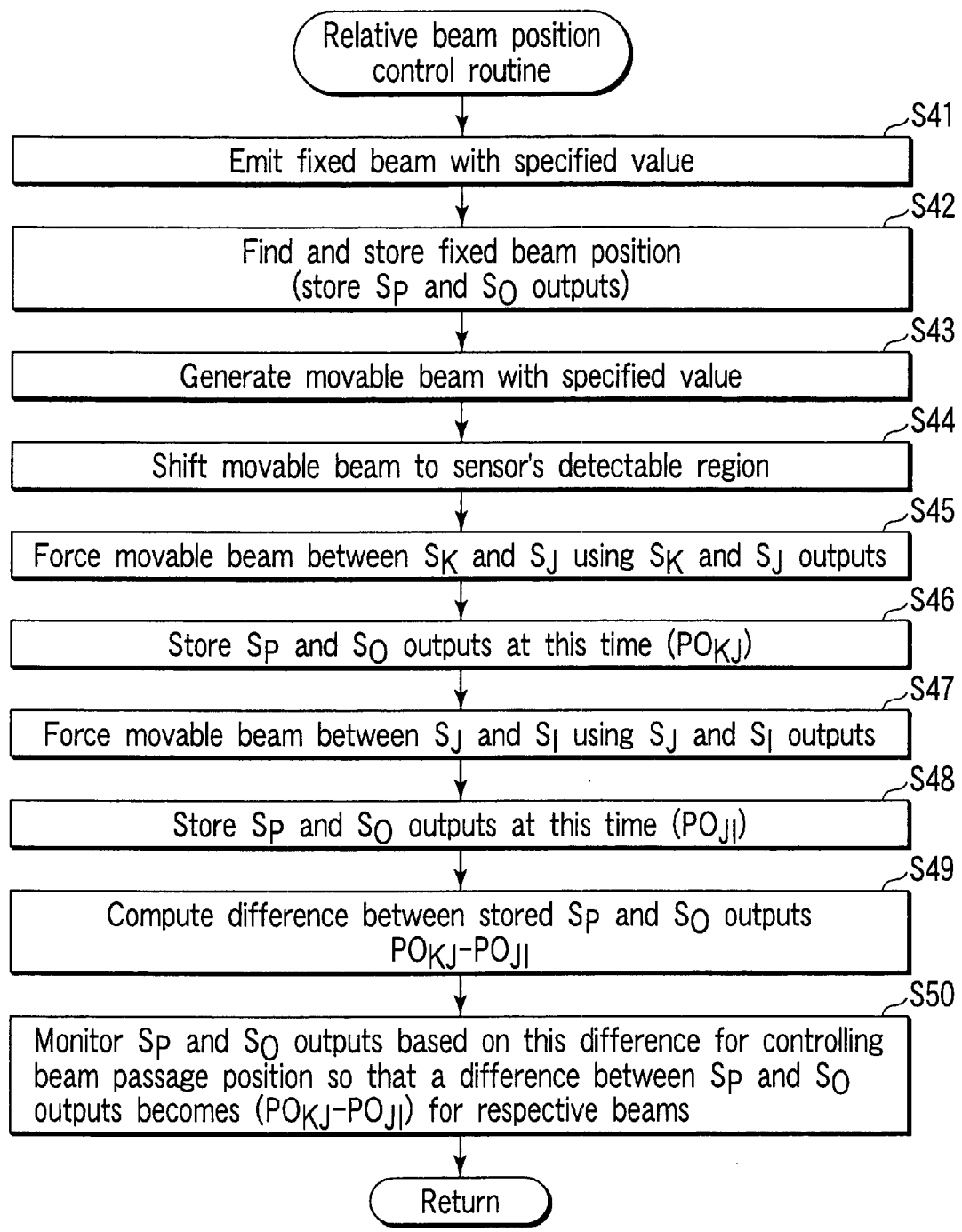
FIG. 26 is a flowchart showing an operation of relative light beam position control.

FIG. 26 is a flowchart showing the relative position control of light beams in the multi-beam optical system according to the sixth operation example. The flowchart in FIG. 26 shows operations of the circuitry as configured in FIG. 24.

First, the CPU 51 generates a fixed laser beam with a specified value (step S41). For example, the main control section 51 sends a specified value to the first laser driver 32a to activate the first laser oscillator 31a with a specified power. By doing so, the main control section 51 outputs the first light beam. It is assumed that the polygon mirror already rotates.

The main control section 51 then selects a specified value as the correction value and sends this value to the correction pulse generation circuit 101. When P1 is assumed to be a position where a fixed beam passes in FIG. 25, for example, the CPU 51 sets the specified value so that the ITG1 characteristic is selected.

Concurrently, the main control section 51 sends a selection signal to the selection circuit 73 for selecting the differential amplifier 70. By doing so, the main control section 51 sends a differential output between the sensors SP and SO to the integrator 74.

Likewise, the main control section 51 sends a sensor selection signal to the reset signal generation circuit 78 and the conversion start signal circuit 79. By doing so, the main control section 51 generates a reset signal for integrating a differential signal between the sensors SP and SO and an analog/digital conversion start signal. This step enables the main control section 51 to incorporate a differential output between the sensors SP and SO.

The light beam detection section output processing circuit 40 outputs an output signal to the CPU 51 corresponding to the passage position of the fixed beam detected by the light beam detection section 38 having the sensors SO and SP. The CPU 51 determines a detection characteristic based on the correction value determined by the specified value supplied to the light beam detection section output processing circuit 40. The CPU 51 detects the fixed beam's passage position based on the detection characteristic for the thus determined specified value and the output signal from the light beam detection section output processing circuit 40.

The CPU 51 records the passage position of the detected fixed beam in the memory 52 (step S42).

When a selected D/A value corresponds to the ITG1 characteristic in FIG. 25, for example, the CPU 51 determines ITG1 to be the detection characteristic. The CPU 51 detects the fixed beam's passage position based on the thus determined ITG1 characteristic and the output signal from the light beam detection section output processing circuit 40.

The following steps provide control so that the other three light beam passage positions maintain a specified pitch, e.g., a 42.3 μm pitch with reference to the first light beam passage position detected at this step S42.

The main control section 51 then generates a movable second light beam with a specified power (step S43). For example, the main control section 51 sends a specified value to the second laser driver 32b to activate the second laser oscillator 31b with a specified power.

Likewise, the main control section 51 selects an appropriate specified value and monitors a differential output between the sensor SP and SO according to the detection characteristic based on that specified value. Accordingly, the main control section 51 can identify the second light beam passage position. The main control section 51 operates the galvanomirror 33b so that the second light beam can pass within a detection region of the sensors SP and SO (step S44). Thereafter, the main control section 51 operates the galvanomirror 33b so that the second light beam passes near the center of the sensors SP and SO. It should be noted that high precision is not required for the light beam passage position adjustment at this step.

The main control section 51 controls the second light beam coarse adjusted at step S4 so that its passage position is centered on the gap between the sensors SK and SJ (step S45). The sensors SI, SJ, and SK are approximately centered between the sensors SP and SO. Accordingly, the main control section 51 can center the light beam passage position on the gap between the sensors SK and SJ without excessively varying that position and consuming time. Detailed below is processing at step S45.

The main control section 51 sends a selection signal to the selection circuit 73 for selecting the differential amplifier 71. Doing so supplies the integrator 74 with a differential output between the sensors SK and SJ. Likewise, the main control section 51 sends a sensor selection signal to the reset signal generation circuit 78 and the conversion start signal circuit 79. By doing so, the main control section 51 generates a reset signal for integrating a differential signal between the sensors SK and SJ and an analog/digital conversion start signal. This setting enables the main control section 51 to incorporate the differential output between the sensors SK and SJ.

The main control section 51 then operates the galvanomirror 33b for the second light beam and provides control to center the second light beam passage position on the gap between the sensors SK and SJ. For operating the galvanomirror 33b, the main control section 51 first places a specified value in the D/A converter 45b. A signal analog-converted by the D/A converter 45b is input to the driver 46b which outputs a current corresponding to the D/A converted value to the galvanomirror 33b. The galvanomirror 33b operates according to the output current value of the driver 46b. Accordingly, the main control section 51 can change the second light beam passage position by modifying the specified value supplied to the D/A converter 45b.

The main control section 51 re-reads a differential output between the sensors SP and SO without changing the setting for the galvanomirror 33b at step S45. At this time, the main control section 51 selects no correction and detects a light beam position according to the ITG2 characteristic shown in FIG. 25. This is because the sensors SI, SK, and SJ are approximately arranged at the center of the sensors SP and SO, eliminating the need for correction. When the light beam is centered on the gap between sensors SK and SJ according to this position detection, the main control section 51 stores the output value (POKJ) of the processing circuit 40 in the memory 52 (step S46). The POKJ value becomes the processing circuit 40's output value indicating that the light beam passage position is centered on the gap between sensors SK and SJ.

After the second light beam is centered on the gap between the sensors SK and SJ at step S46, the main control section 51 then centers this light beam on the gap between the sensors SJ and SI at step S47.

The main control section 51 sends a selection signal to the selection circuit 73 for selecting the differential amplifier 72. Doing so supplies the integrator 42 with a differential output between the sensors SJ and SI. Likewise, the main control section 51 sends a sensor selection signal to the reset signal generation circuit 78 and the conversion start signal circuit 79. By doing so, the main control section 51 generates a reset signal for integrating a differential signal between the sensors SJ and SI and an analog/digital conversion start signal. This setting enables the main control section 51 to incorporate the differential output between the sensors SJ and SI.

The main control section 51 operates the galvanomirror 33b for the second light beam to center the second light beam passage position on the gap between the sensors SJ and SP like step S45.

When the second light beam passes the center of the gap between the sensors SJ and SI, the main control section 51 re-reads a differential output between the sensors SP and SO. At this time, the main control section 51 selects no correction as a D/A value and detects a light beam position according to the ITG2 characteristic shown in FIG. 25. This is because the sensors SI, SK, and SJ are approximately arranged at the center of the sensors SP and SO, eliminating the need for correction. When the light beam is centered on the gap between sensors SJ and SI according to this position detection, the main control section 51 stores the output value (POJI) of the processing circuit 40 in the memory 52 (step S48). The POJI value becomes the processing circuit 40's output value indicating that the light beam passage position is centered on the gap between sensors SJ and SI.

Then, the main control section 51 computes a difference between the value POKJ in the memory 52 stored at step S46 and the value POJI in the memory 52 stored at step S48 (step S49). A pitch of 42.3 μm is provided between the center of sensors SK and SJ and the center of sensors SJ and SI. When the light beam is moved from step S45 (step S46) to step S47 (step S48), the moving distance is equivalent to 42.3 μm. The difference between POKJ and POJI computed at this step S49 equals the difference between differential outputs from the sensors SP and SO and is equivalent to the moving distance (42.3 μm) for the second light beam.

The sixth operation example detects a light beam position by using a detection characteristic corresponding to the specified value defined by the CPU 51. In order to implement a specified pitch (42.3 μm) as a relative distance between the first and second light beams, the position of the second light beam must be controlled based on the detection characteristic (ITG1) selected at step S42.

Namely, by setting the specified value selected at step S42, the second light beam is controlled so that its output becomes (the value stored in the memory 52 at step S42)-(POKJ-POJI). This provides the specified pitch (42.3 μm) between the passage position of the fixed light beam (first light beam) and the passage position of the movable light beam (second light beam). The processing at this step uses a differential output between the sensors SP and SO.

The passage position of the fixed light beam 20 (first light beam) is detected at step S42 and is stored in the memory 52. The main control section 51 operates the galvanomirror 33b to control the passage position of the second light beam (movable) so that this position provides a 42.3 μm pitch with reference to the first light beam.

Namely, the main control section first provides the processing circuit 40 with a D/A value similar to that at step S42 for generating the second light beam. The main control section 51 then changes the second light beam passage position (step S50) so that the processing circuit 40's output value indicating the second light beam passage position matches a value obtained by subtracting the value (POKJ-POJI) found at step S49 from the value in the memory 52 stored at step S42.

The above-mentioned operation maintains a pitch of 42.3 μm between the first and second light beam passage positions. A similar operation provides a pitch of 42.3 μm between the third and fourth light beam passage positions.

There has been described the mechanism of detecting relative positions of light beams in the light beam scanning apparatus having the multi-beam optical system.

Embodiments of the present invention will be described in further detail with reference to the accompanying drawings.

Described below is the first embodiment.

Figure 27:
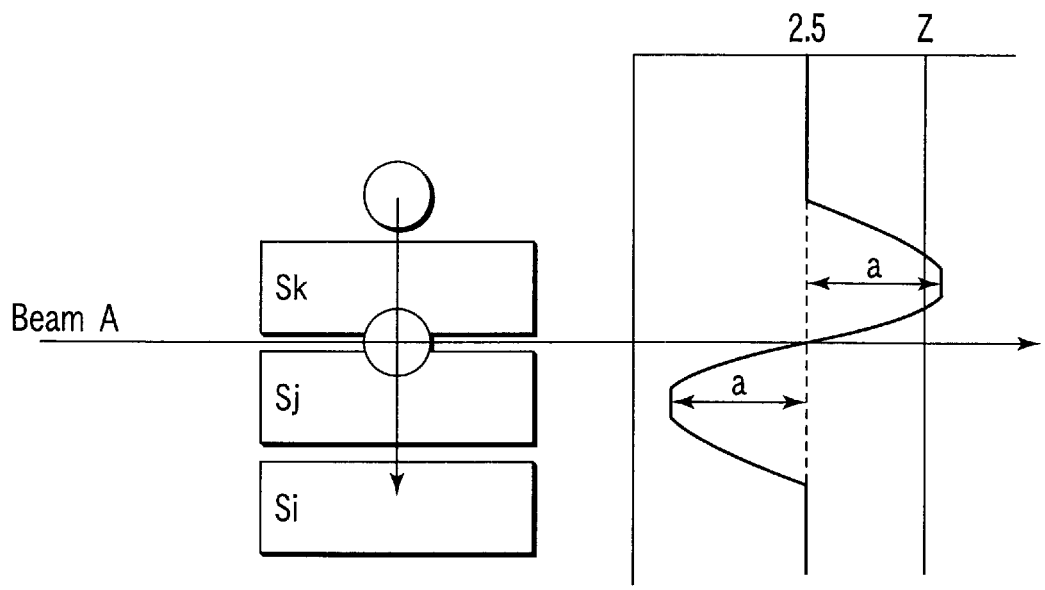
FIG. 27 shows relationship between a light beam passage position and an output signal against a reference pitch sensor in FIG. 11.

FIG. 27 shows a relationship between a light beam passage position and an output signal against reference pitch sensors SI, SJ, and SK. As described in the explanation of the relative position detection control, the reference pitch sensors SI, SJ, and SK are used for detecting and controlling light beam passage positions. For detecting a light beam passage position, the main control section 51 selects a combination of sensors SI and SJ or sensors SJ and SK from the reference pitch sensors SI, SJ, and SK. When a light beam passes over the combined sensors selected, each sensor outputs a current corresponding to a light quantity of the passing light beam. Currents output from the sensors are I/V-converted to produce a difference between the output values (differential output). The light beam passage position is determined based on the differential output.

FIG. 27 shows a relationship between a passage position and a differential output for light beam A when it is moved from the top of the upper sensor SJ toward the bottom of the lower sensor SK with the sensors SJ and SK selected. As shown in FIG. 27, when light beam A passes just the center of the sensors SJ and SK, the differential output equals the reference voltage (2.5 V). The differential output becomes a maximum value when all irradiated spots of light beam A pass over the sensor SJ, i.e., when only the sensor SJ detects light beam A entirely. The differential output becomes a minimum value when all irradiated spots of light beam A pass over the sensor SK, i.e., when only the sensor SK detects light beam A entirely. When only the sensor SK or SJ detects all of light beam A, the differential output becomes maximum amplitude a, i.e., a distance from the reference value.

If the light amount of the light beam A is assumed to be a specified power, the maximum amplitude a for the differential output is approximately determined from the light beam quantity, the constant for the I/V converter, and the constant for the differential amplifier.

Figure 28:
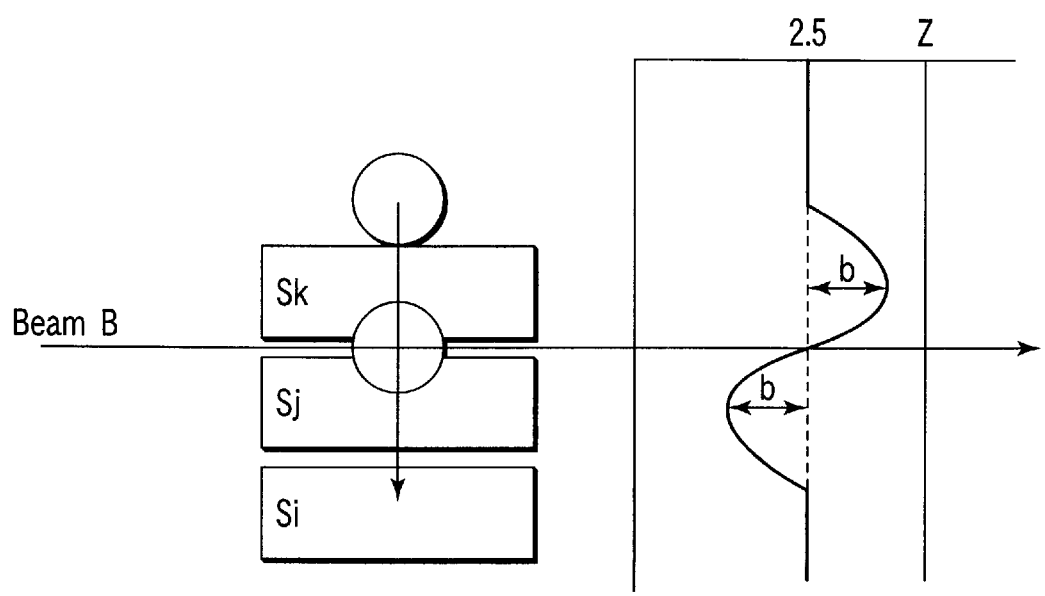
FIG. 28 shows relationship between a defocused light beam and a differential output.

By contrast, FIG. 28 shows a relationship between defocused light beam B and a differential output. When the light beam is defocused as shown in FIG. 28, the irradiated spot increases. When defocus occurs, the irradiated spot of light beam B exceeds the sensor SK or SJ if the light beam passes near the center of these sensors. When the size of a light beam spot exceeds the width of the sensor SK or SJ, the maximum amplitude decreases. As shown in FIG. 28, for example, light beam B causes a larger defocus than the width of the sensors SK, SJ, and SI. When this light beam B passes these sensors, a differential output causes maximum amplitude b. This maximum amplitude b is smaller than maximum amplitude a for focused light beam A as shown in FIG. 27.

In order to detect this defocus, predefined reference voltage value Z is specified as a reference value. The main control section 51 detects the maximum amplitude by gradually moving the light beam passage position. The main control section 51 determines whether the detected maximum amplitude is greater than reference voltage value Z. When the maximum amplitude is greater than the reference voltage value as a comparison result, the main control section 51 determines that the light beam is focused. When the maximum amplitude is smaller than the reference voltage value, the main control section 51 determines that the light beam is defocused.

The aforementioned reference voltage value Z is set to be smaller than maximum amplitude a for focused light beam A in FIG. 27 and greater than maximum amplitude b for defocused light beam B in FIG. 28. Reference voltage value Z is predetermined based on a maximum amplitude computed from the light beam quantity, the I/V converter's constant, and the differential amplifier's constant, an allowable range of defocusing, and an allowable range of variation of the light beam quantity (power).

When the sensor width is larger than the irradiated spot of the focused light beam, the maximum amplitude becomes constant while the entire irradiated spot moves inside the sensor as shown in FIG. 27. On the contrary, the maximum amplitude of the defocused light beam decreases due to an excess portion of the light beam's irradiated spot from the sensor.

If the defocus increases an irradiated spot, a sufficiently large sensor width nullifies an effect of defocus on the maximum amplitude. Accordingly, no defocus may be detected when the sensor width is extremely larger than the focused light beam's irradiated spot. The above-mentioned sensor width is smaller than the size of an irradiated spot caused by the defocus to be detected.

When detecting the light beam defocus as mentioned above, the main control section 51 uses the control panel 53 to display an occurrence of defocus or notification to the maintenance personnel. When defocus is detected, the main control section 51 does not stop digital copier operations. Consequently, it is possible to ensure user-friendliness and notify a user of the cause of a blurred output image.

When the digital copier is networked, it may be preferable to directly notify the maintenance personnel of an occurrence of defocus via the network. In this case, it is possible to immediately contact the nearby maintenance personnel, enabling prompt action.

The following describes operations for detecting light beam defocus.

FIG. 29 is a flowchart for describing operations for detecting light beam defocus.

The main control section 51 selects a combination of sensors (step S61). According to the configuration as shown in FIGS. 27 and 28, the main control section 51 selects a combination of sensors SK and SJ or SJ and SI. When selecting a combination of sensors, the main control section 51 gradually moves the light beam passage position (horizontal scanning position) from the upper to the lower (or from the lower to the upper) of two selected sensors as shown in FIGS. 27 or 28 (step S62).

When moving the light beam passage position, the main control section 51 I/V-converts an output current from each sensor and detects a differential output of that value. By doing so, the main control section 51 detects the maximum value for differential output detected as the light beam passage position moves (step S63). When detecting the maximum value for the differential output, the main control section 51 determines whether the detected maximum value is below the predefined reference value (step S64).

When it is determined that the maximum value is not smaller than the reference value (NO at step S64), the main control section 51 determines that the light beam is normal (step S65). When it is determined that the maximum value for the differential output is smaller than the reference value (YES at step S), the main control section 51 determines that the light beam is defocused (step S66).

When it is determined that the light beam is defocused, the main control section 51 notifies a user or the maintenance personnel that the light beam is defocused (step S67). For example, the main control section 51 notifies light beam defocusing by displaying this information on the control panel or informing the maintenance personnel of the defocus via the network.

According to the first embodiment as mentioned above, the light beam scanning apparatus scans a light beam by using the sensor generating an electric signal corresponding to an irradiated light quantity and detects an output signal from the sensor. The apparatus gradually moves the scanning position of the light beam against the sensor to detect the size of the maximum amplitude of an output signal detected by the sensor. The apparatus determines whether the light beam is focused depending on whether the maximum amplitude is smaller than the reference value. Thus, it is possible to easily determine the defocus and provide a high-precision light beam scanning apparatus.

When a defocused light beam is detected, this information is displayed on the control panel or is notified to the maintenance personnel via the network, etc. Accordingly, the user can promptly find that the defocused light beam prevents an image from being output correctly or precisely. Further, the maintenance personnel can be notified of the defocus via the network, etc., allowing prompt action against the light beam defocus.

The second embodiment is described below.

FIG. 30 exemplifies light beam C with a light quantity smaller than the specified amount. The light beam quantity may decrease due to chronological changes such as contamination on the lens, etc. When the light beam quantity decreases as shown in FIG. 30, the light quantity received by the sensor decreases even if the light beam is focused. This also decreases the maximum amplitude. When an attempt is made to detect defocus according to the same procedure as described in the first embodiment, the maximum amplitude becomes smaller than reference value Z even if no defocus occurs.

When considering the case where the light beam quantity decreases, it is impossible to determine the defocus or the decreased light quantity simply based on the size of the maximum amplitude as described in the first embodiment. Accordingly, finding the cause of image deterioration takes a long time.

When the maximum amplitude becomes smaller than the specified reference value Z, the main control section 51 determines the defocus or the decreased light quantity based on whether the light beam quantity (power) is smaller than the specified reference quantity. Namely, the main control section 51 detects the light beam quantity when the maximum amplitude is smaller than the specified reference value Z. When detecting the light beam quantity, the main control section 51 compares the light beam quantity with the specified reference quantity. When a comparison result shows that the detected light beam quantity is larger than the specified reference quantity, the main control section 51 determines the defocus. When the detected light beam quantity is smaller than the specified reference quantity, the main control section 51 determines that the light beam quantity is insufficient.

The determination result is displayed on the control panel as well as a maintenance personnel code prompting notification to the maintenance personnel. This makes it possible to immediately notify a user that the image deterioration is caused by the defocus or the insufficient light beam quantity. Accordingly, prompt action can be taken. It may be preferable to use the network to directly notify the nearby maintenance personnel that the defocus occurs or the light quantity is insufficient. This enables prompt action against the defocus or insufficient light quantity of the light beam.

As shown in FIG. 31, a pair of sensors SP and SO detect the light beam quantity. A conventional detection method is available for detecting the light beam quantity. For example, patent application Ser. No. 9/667,317 describes a method which detects the light beam quantity by adding output signals from the sensors SP and SO to assume these sensors as one sensor.

The following describes operations for detecting the defocus and insufficient light quantity of the light beam.

Figure 32:
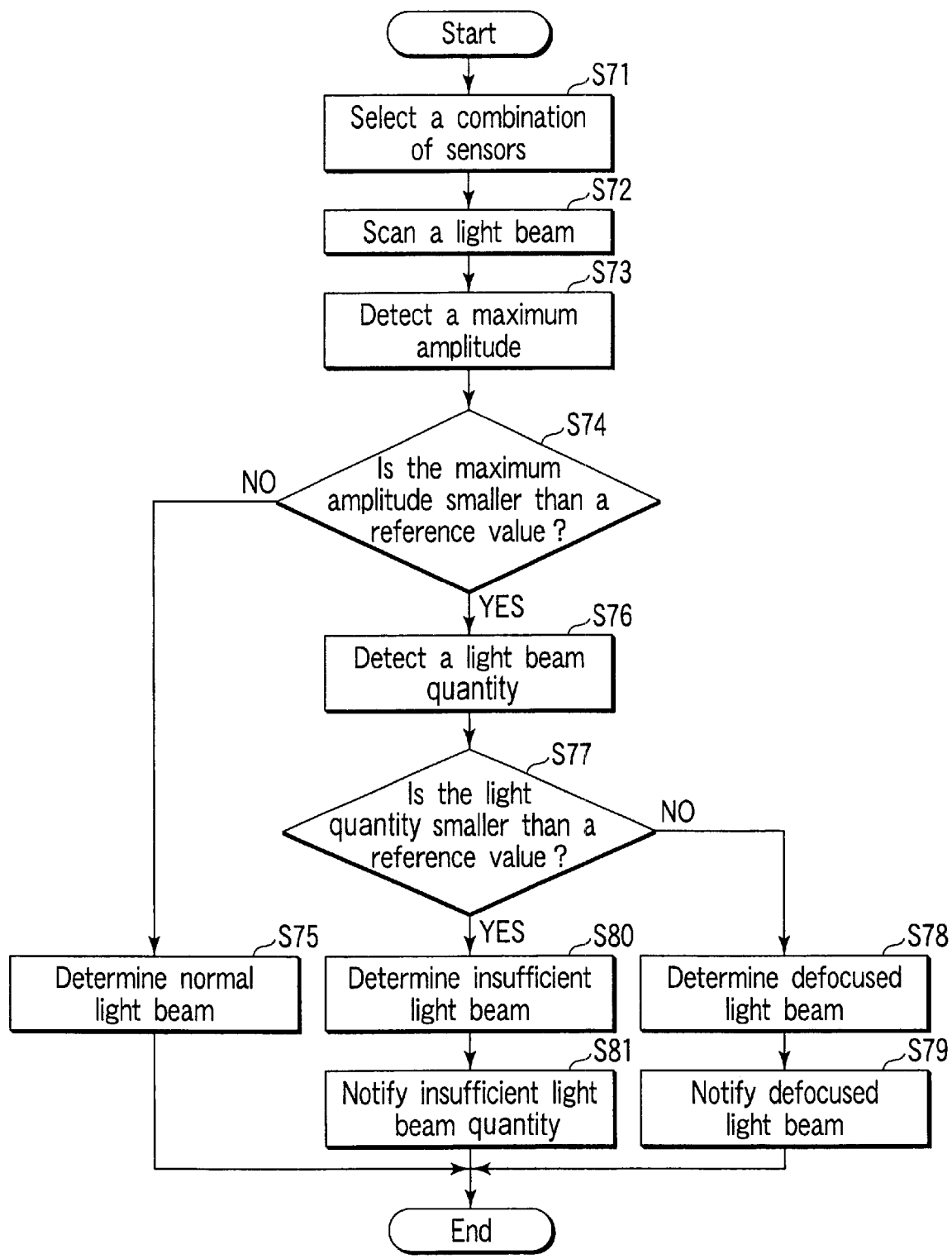
FIG. 32 is a flowchart for explaining operations for detecting the defocus and insufficient light quantity of the light beam.

FIG. 32 is a flowchart for explaining operations for detecting the defocus and insufficient light quantity of the light beam.

The main control section 51 selects a combination of sensors (step S71). According to the configuration as shown in FIGS. 30 and 31, the main control section 51 selects a combination of sensors SK and SJ or SJ and SI. When selecting a combination of sensors, the main control section 51 gradually moves the light beam passage position (horizontal scanning position) from the upper to the lower (or from the lower to the upper) of two selected sensors as shown in FIG. 30 or 31 (step S72).

When moving the light beam passage position, the main control section 51 I/V-converts an output current from each sensor and detects a differential output of that value. By doing so, the main control section 51 detects the maximum value for differential output detected as the light beam passage position moves (step S73). When detecting the maximum value for the differential output, the main control section 51 determines whether the detected maximum value is below the predefined reference value (step S74). When it is determined that the maximum value is not smaller than the reference value (NO at step S74), the main control section 51 determines that the light beam is normal (step S75).

When it is determined that the maximum value is smaller than the reference value (YES at step S74), the main control section 51 detects the light beam quantity (power) (step S76). When detecting the light beam quantity, the main control section 51 determines whether the detected light beam quantity is smaller than the specified reference quantity (step S77).

When it is determined that the light beam quantity is larger than the specified reference quantity (NO at step S77), the main control section 51 determines the defocused light beam (step S78). When the defocused light beam is detected, the main control section 51 notifies it to the user or the maintenance personnel (step S79). For example, the main control section 51 notifies light beam defocusing by displaying this information on the control panel or informing the maintenance personnel of the defocus via the network.

When it is determined that the light beam quantity is smaller than the specified reference quantity (YES at step S77), the main control section 51 determines the insufficient light beam (step S80). When the defocused light beam is determined, the main control section 51 notifies this condition to the user or the maintenance personnel (step S81). For example, the main control section 51 notifies the insufficient light beam quantity by displaying this information on the control panel or informing the maintenance personnel of the insufficient light beam via the network.

In addition to the first embodiment as mentioned above, when the maximum amplitude is smaller than the reference value, the second embodiment detects the light beam quantity to determine whether it is smaller than the specified light quantity. When the light beam quantity is smaller than the specified reference quantity, an insufficient light beam quantity is determined. When the light beam quantity satisfies the specified reference quantity, defocus is determined. This makes it possible to easily determine an insufficient light beam quantity and light beam defocusing, providing a high-precision light beam scanning apparatus.

When the insufficient light beam quantity or the defocus is detected, information about the insufficient light beam quantity or the defocused light beam is displayed on the control panel or is notified to the maintenance personnel via the network, etc. This makes it possible to immediately notify a user that the image cannot be output correctly or precisely because of the insufficient light beam quantity or the defocused light beam. Further, the maintenance personnel can be notified of the insufficient light beam quantity or the defocused light beam, allowing prompt action against the light beam defocus.

The third embodiment is described below.

Figure 33:
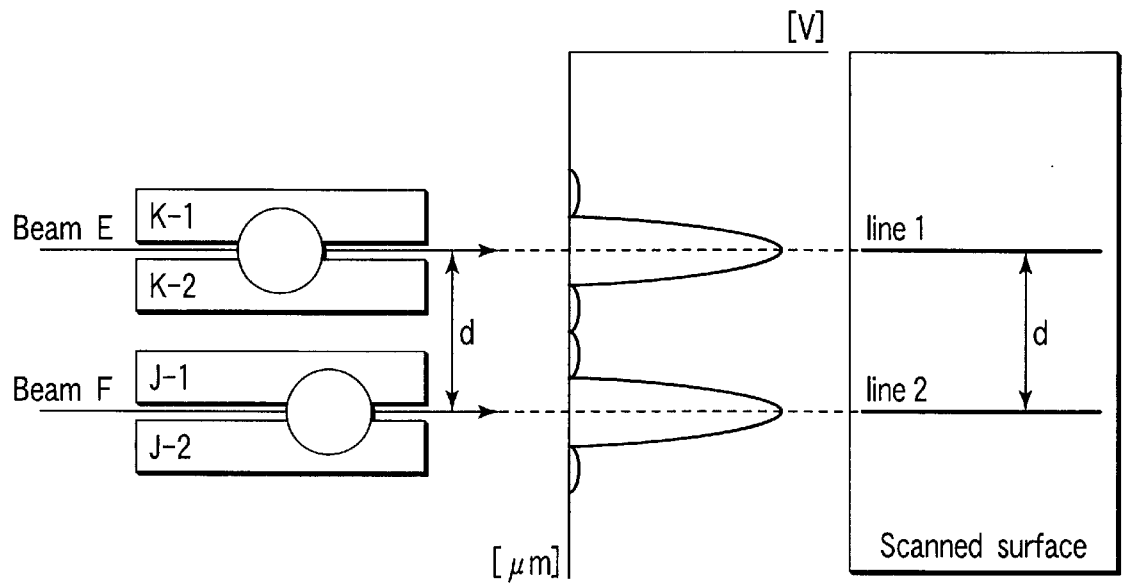
FIG. 33 shows a configuration example of sensors K-1, K-2, J-1, and J-2 for controlling a specified space between two light beams.

The light beam scanning apparatus uses a plurality of sensors to control a specified gap between two or more light beams. To ensure a gap d between light beams E and F, for example, there are provided four sensors K-1, K-2, J-1, and J-2 as shown in FIG. 33. The specified gap d is provided between sensors K-1 and K-2 and between sensors J-1 and J-2. The light beam E is controlled so that there is no difference between outputs from the sensors K-1 and K-2. The light beam F is controlled so that there is no difference between outputs from the sensors J-1 and J-2. Control is provided to adjust the light beams E and F so that the specified gap d is provided between the light beams E and F. An image is scanned and output at an interval of the gap d by using a plurality of light beams controlled to provide a specified gap.

Figure 34:
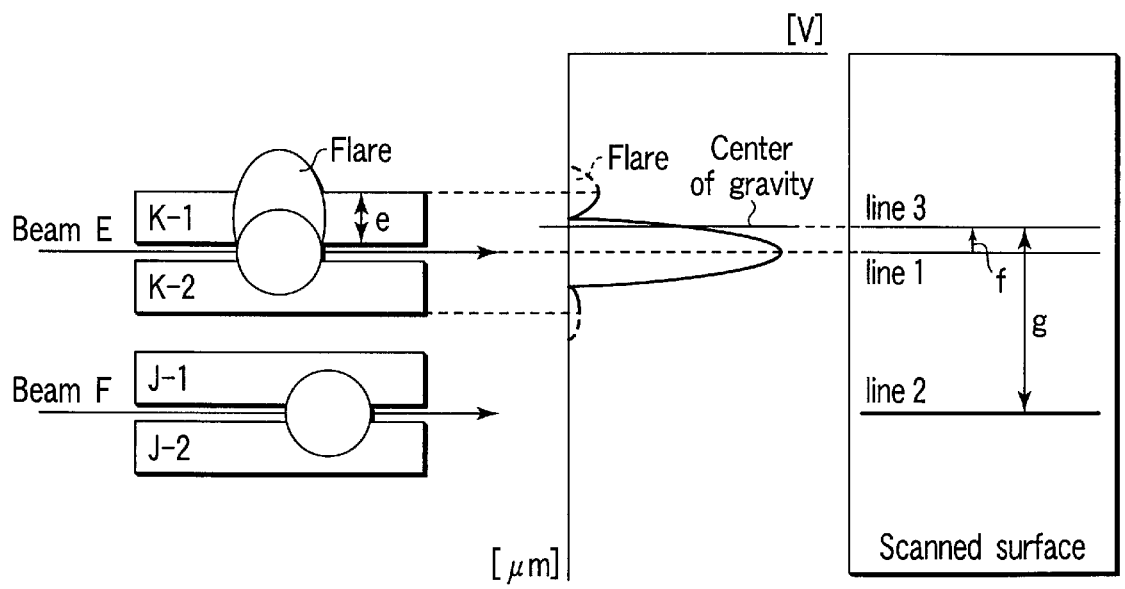
FIG. 34 shows relationship between the flare for a light beam and sensors.
Figure 35:
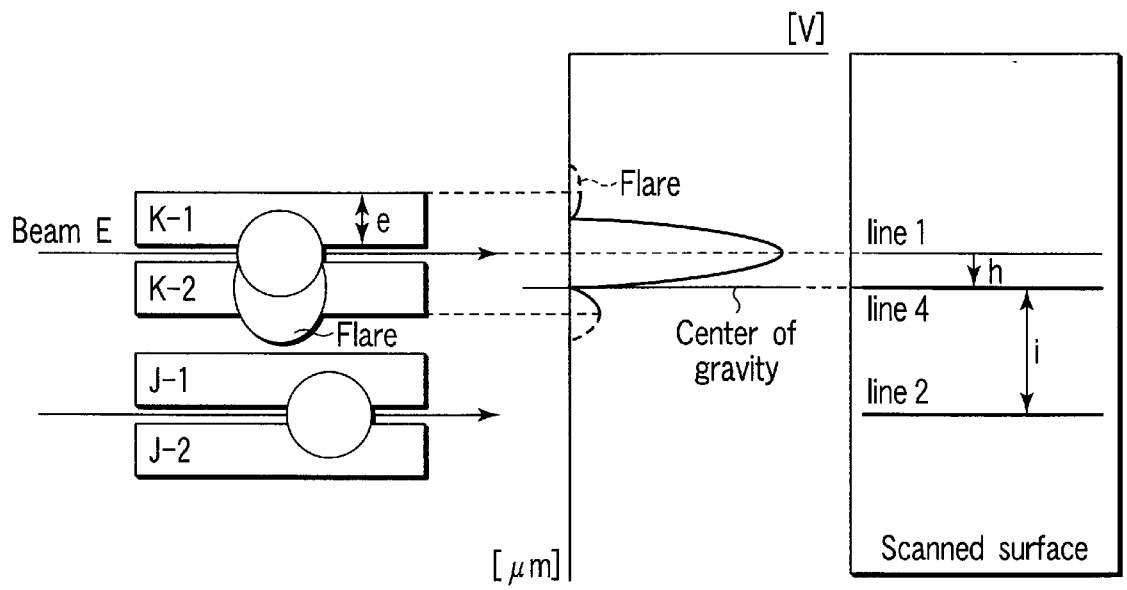
FIG. 35 shows relationship between the flare for a light beam and sensors.

As shown in FIGS. 34 and 35, the light beam may cause a flare. The flare is caused by a complicatedly configured optical system, etc. The flare also occurs if the light beam is focused. When the light beam is focused, its flare has a little effect on the image as an output result. However, the light beam's flare may greatly affect control of the light beam passage position. If the light beams E and F cause no flare, these light beams are controlled so that the specified gap d is provided between the centers of the irradiated spots.

This is because the pair of sensors K-1 and K-2 or J-1 and J-2 are configured to detect the centrobaric position for the light beam as a passage position based on the differential output. Namely, when the light beam causes no flare, or when it causes a vertically symmetrical flare, the center of the light beam corresponds to the centrobaric position of the entire light beam. On the contrary, when the light beam causes a flare, the center of the light beam does not correspond to the centrobaric position. Consequently, the sensors K-1, K-2, J-1, and J-2 thus configured may not be able to correctly control the light beam.

The following describes a case where a light beam E causes a flare as shown in FIGS. 34 or 35. FIG. 34 shows a flare occurs on a focused light beam. FIG. 35 shows a flare occurs under a focused light beam.

In the case of FIGS. 34 or 35, the sensors K-1 and K-2 each having a width e cannot detect a flare of the light beam E. In this case, the sensors K-1 and K-2 detect the light beam E's centrobaric position which differs from that of the actual light beam E. When the light beam E is adjusted to the center of the sensors K-1 and K-2, the light beam E's passage position is controlled by the centrobaric position detected by the sensors K-1 and K-2 according to the detection result. When the light beam E's width including the flare is greater than the sensor width e, the light beam's centrobaric position cannot be detected precisely. The light beam to be controlled may cause a deviation.

Figure 36:
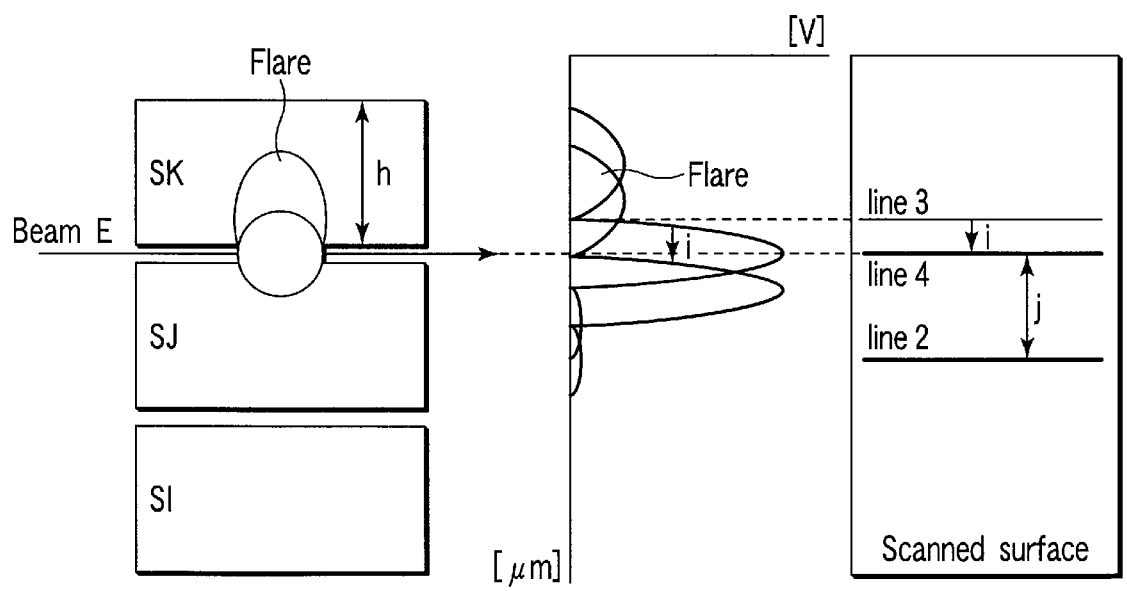
FIG. 36 is a configuration example of sensors for detecting a light beam including the flare.
Figure 37:
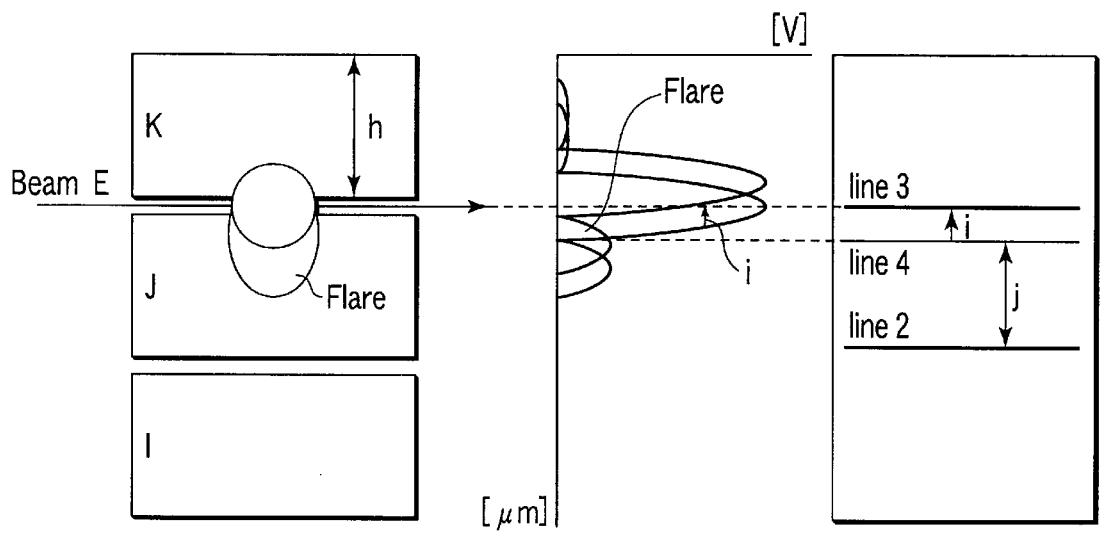
FIG. 37 is a configuration example of sensors for detecting a light beam including the flare.

This third embodiment configures the sensor width so as to detect the entire light beam including a flare. As shown in FIG. 36 or 37, for example, the sensors are configured so that the sensors K-1 and J-1 are combined to provide the sensor SJ having a width h. The sensors SK and SI each have the same width h as the sensor SJ. The width h of the sensors SK, SJ, and SI is capable of detecting the entire light beam E including a flare. The light beam's centrobaric position can be detected accurately by using the sensors each having a width capable of entirely detecting the light beam.

As mentioned above, the third embodiment allows the sensor width for detecting the light beam position to be capable of entirely detecting a flare caused by the light beam. The light beam's absolute position is controlled based on the centrobaric position detected by the sensors. Accordingly, it is possible to always detect the accurate centrobaric position even if the center of the light beam's irradiated spot deviates from the centrobaric position detected by the sensors.

The light beam position can be always detected with an accurate centrobaric position. The horizontal scanning line scanned by the light beam's irradiated spot is positioned so that the centrobaric position always corresponds to a gap between the sensors. As a result, the light beam is always controlled at a constant position if the light beam's centrobaric position is unchanged. Consequently, a stable, high-quality image is formed by scanning of the light beam without a scanning error due to the light beam.

The fourth embodiment is described below.

This fourth embodiment configures the sensor width so as to detect an entire light beam flare. The fourth embodiment provides relative position control for a plurality of beams by using sensors each having the width as shown in FIGS. 36 and 37. The relative position control for a plurality of beams is capable of the methods described in the above-mentioned third and sixth operation examples.

The relative position control according to the third and sixth operation examples uses a fixed light beam with the fixed passage position as a reference. An interval between passage positions for a plurality of light beams is controlled to match the distance (sensor SJ's width) between a gap between the sensors SK and SJ and a gap between the sensors SJ and SI.

Namely, a movable light beam is controlled to detect an output value (differential output) from the sensors SO and SP for passage between the sensors SK and SJ and an output value (differential output) from the sensors SO and SP for passage between the sensors SJ and SI. After detecting these output values, the main control section 51 computes a difference between the detected output values. After computing the difference between the detected output values, the main control section 51 controls each light beam's passage position so that the computed output value difference equals an output value difference for each light beam obtained from the sensors SO and SP. As a result, an interval (pitch) between light beams is controlled to match the distance between a gap between the sensors SK and SJ and a gap between the sensors SJ and SI.

When the width of the sensor SJ is assumed to be h, the fourth embodiment can control passage positions for a plurality of light beams at an interval of h with reference to the fixed light beam's passage position.

As mentioned above, the fourth embodiment controls passage positions for a plurality of light beams based on the relative position control by using sensors having a width capable of detecting the entire light beam including a flare. This decreases an effect of a light beam flare and enables accurate control of passage positions for a plurality of light beams.

The fifth embodiment is described below.

Figure 38:
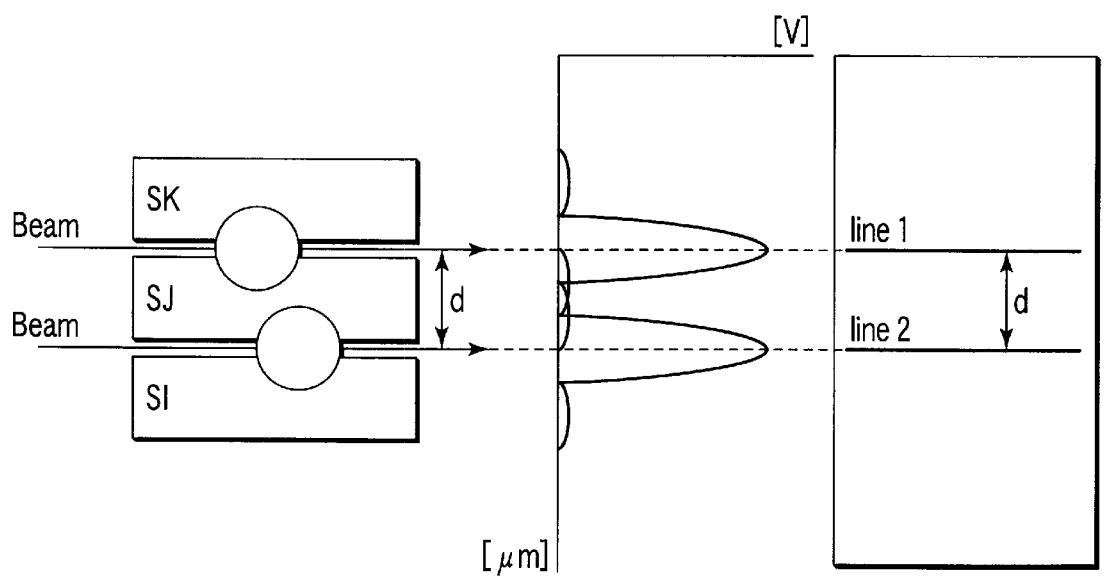
FIG. 38 shows relationship between a light beam including no flare and sensors.

The fifth embodiment uses a sensor width n times as large as a specified pitch d and controls an interval between the light beams' passage positions to be the specified pitch d. As described in the above-mentioned third and fourth embodiments, it is assumed that a plurality of light beams to be controlled causes no flare. In this case, as shown in FIG. 38, there are provided the sensors SK, SJ, and SI with the same width as the specified pitch d. By using these sensors, it is possible to easily control centrobaric positions for a plurality of light beams so as to provide a specified pitch.

However, as shown in FIG. 39, there may be a case where the sensors SK, SJ, and SI with the same width as the specified pitch d cannot detect a light beam's flare. In this case, it is impossible to detect a centrobaric position having the accurate light quantity with reference to the entire light beam. This degrades the accuracy of control over the light beam.

As shown in FIG. 40, the fifth embodiment uses a sensor having the width n times as large as the specified pitch d capable of detecting the entire light beam including a flare. When the specified pitch d is 42.3 μm, for example, the sensor width is set to n×42.3 μm. When the sensor SJ's width is set to a value n times as large as the specified pitch d, a plurality of light beams is subject to the relative position control as described in the above-mentioned third and sixth operation examples.

As shown in FIG. 40, the sensor width is set to nd. In this case, the main control section 51 controls a movable light beam to detect an output value (differential output) from the sensors SO and SP for passage between the sensors SK and SJ and an output value (differential output) from the sensors SO and SP for passage between the sensors SJ and SI. After detecting these output values, the main control section 51 computes a difference between the detected output values.

After computing the difference between these output values, the main control section 51 divides the computed difference between the output values by n. The width of the sensor SJ is n times as large as the specified pitch d (nd). Accordingly, the difference between the output values takes effect when the light beam interval is nd. A differential output from the sensors SO and SP is set to 0 at the center position and varies with a specified gradient. Dividing the output difference for the interval nd by n produces the output difference for the interval d.

When computing the output difference for the light beam interval d, the main control section 51 controls to provide the specified pitch d for an interval between a plurality of light beams based on the computed output difference.

As mentioned above, the fifth embodiment uses the sensor width n times as large as a specified pitch capable of detecting the entire light beam including a flare. The sensors SO and SP generate a differential output when the light beam passes between the sensors SK and SJ. The sensors SO and SP generate a differential output when the light beam passes between the sensors SJ and SI. A difference between these differential outputs is divided by n. Based on the computed value, the relative position control is performed for a plurality of light beams. This decreases an effect of a light beam flare and enables accurate control of passage positions for a plurality of light beams at a specified pitch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:

a light emitting device which generates a light beam;

a light beam scanning member which scans said light beam against a scanned surface so that said light beam output from said light emitting device scans on said scanned surface in a horizontal scan direction;

a sensor which is arranged on said scanned surface or a position equivalent to said scanned surface, detects said light beam scanned by said light beam scanning member, and outputs an electric signal;

a mirror which changes a passage position for a vertical scan direction of said light beam scanned by said light beam scanning member in said horizontal scan direction;

a detection section which detects a maximum value for the electric signal output from said sensor in response to said light beam with its passage position gradually moved by said mirror; and a control section which determines a normal light beam when said maximum value detected by said detection section is greater than a specified reference value, and determines a defocused light beam when the maximum value is smaller than said specified reference value.

2. The light beam scanning apparatus according to claim 1 further comprising:

a display section which notifies occurrence of said defocused light beam when said control section determines said defocused light beam.

3. The light beam scanning apparatus according to claim 1 further comprising:
a communication interface which sends data indicating occurrence of said defocused light beam to an external device when said control section determines said defocused light beam.

4. A light beam scanning apparatus comprising:
a light emitting device which generates a light beam;
a light beam scanning member which scans said light beam against a scanned surface so that said light beam output from said light emitting device scans on said scanned surface in a horizontal scan direction;
a sensor which is arranged on said scanned surface or a position equivalent to said scanned surface, detects said light beam scanned by said light beam scanning member, and outputs an electric signal;
a mirror which changes a passage position for a vertical scan direction of said light beam scanned by said light beam scanning member in said horizontal scan direction;
a detection section which detects a maximum value for said electric signal output from said sensor in response to said light beam with its passage position gradually moved by said mirror; and
a light quantity detection section which detects said light beam quantity when said maximum value detected by this detection section is smaller than a specified reference value; and
a control section which determines a normal light beam when said maximum value detected by said detection section is greater than said specified reference value, determines an insufficient light beam quantity when said maximum value is smaller than said specified reference value and said light beam quantity detected by said light quantity detection section is smaller than a specified reference quantity, and determines a defocused light beam when said maximum value is smaller than said specified reference value and said light beam quantity detected by said light quantity detection section satisfies said specified reference quantity.

5. The light beam scanning apparatus according to claim 4 further comprising:
a display section which notifies occurrence of said defocused light beam determined by said control section, and notifies occurrence of said insufficient light beam quantity determined by said control section.

6. The light beam scanning apparatus according to claim 4 further comprising:
a communication interface which sends data indicating occurrence of said defocused light beam to an external device when said control section determines said defocused light beam, and sends data indicating said insufficient light beam quantity to said external device when said control section determines said insufficient light beam quantity.

7. A light beam scanning apparatus comprising:
a light emitting device which generates a light beam;
a light beam scanning member which scans said light beam against a scanned surface so that said light beam output from said light emitting device scans on said scanned surface in a horizontal scan direction;
a plurality of sensors each of which is formed wider than a width in a vertical scan direction of said light beam including light generated near an irradiated spot of said light beam, are arranged on said scanned surface or a position equivalent to said scanned surface so that a fine gap is provided in said horizontal scan direction, and outputs an electric signal corresponding to an irradiated light beam quantity;
a mirror which changes a passage position for said vertical scan direction of said light beam scanned by said light beam scanning member in said horizontal scan direction; and
a control section which controls said light beam's passage position by using said mirror so that a centrobaric position of said light beam quantity detected by two adjacent sensors out of said plurality of sensors matches a gap between said two sensors.

8. The light beam scanning apparatus according to claim 7, wherein
each of said plurality of sensors is formed with a width in said vertical scan direction as large as a predetermined interval multiplied by a given number of times.

9. A light beam scanning apparatus comprising:
a plurality of light emitting devices configured to output light beams;
a light beam scanning member which scans said light beams against a scanned surface so that said light beam output from said light emitting device scans on said scanned surface in a horizontal scan direction;
a plurality of sensors each of which is formed wider than a width in a vertical scan direction of said light beams including light generated near an irradiated spot of said light beams, is arranged on said scanned surface or a position equivalent to said scanned surface so that a fine gap is provided in said horizontal scan direction, and outputs an electric signal corresponding to an irradiated light beam quantity;
a mirror which changes a passage position for said vertical scan direction of said light beams scanned by said light beam scanning member in said horizontal scan direction; and
a position detection sensor which is arranged on said scanned surface or a position equivalent to said scanned surface and continuously changes output values according to changes in scanning positions of said light beams;
a control section which computes a difference between two output values, comprising an output value from said position detection sensor when a centrobaric position for said light beam quantity matches a gap between first and second sensors adjacent to each other out of said plurality of sensors and an output value from said position detection sensor when said centrobaric position for said light beam quantity matches a gap between said second sensor and a third sensor adjacent thereto, and provides control so that an interval between light beams equals the computed difference.

10. The light beam scanning apparatus according to claim 9, wherein
each of said plurality of sensors is formed with a width in said vertical scan direction as large as a predetermined interval multiplied by a given number of times, and said control section controls an interval between light beams so that said interval equals a value equivalent to said computed difference divided by said given number of times.

11. A light beam scanning apparatus comprising:
a light emitting means for outputting a light beam;
a light beam scanning means for scanning said light beam output from said light emitting means onto a scanned surface in a horizontal scan direction;

a detection means, arranged on said scanned surface or a position equivalent to said scanned surface, for detecting said light beam scanned by said light beam scanning means, and outputting an electric signal;

a change means for changing a passage position for a vertical scan direction of said light beam scanned by said light beam scanning means in said horizontal scan direction;

a detection means for detecting a maximum value for said electric signal output from said detection means in response to said light beam with its passage position gradually moved by said change means; and a control means for determining a normal light beam when said maximum value detected by said detection means is greater than a specified reference value, and for determining a defocused light beam when said maximum value is smaller than said specified reference value.

12. A light beam scanning apparatus comprising:

a light emitting means for outputting a light beam;

a light beam scanning means for scanning said light beam output from said light emitting means onto a scanned surface in a horizontal scan direction;

a detection means, arranged on said scanned surface or a position equivalent to said scanned surface, for detecting said light beam scanned by said light beam scanning means, and outputting an electric signal;

a change means for changing a passage position for a vertical scan direction of said light beam scanned by said light beam scanning means in said horizontal scan direction;

a detection means for detecting a maximum value for said electric signal output from said detection means in response to said light beam with its passage position gradually moved by said change means; and a light quantity detection means for detecting said light beam quantity when a maximum value detected by said detection means is smaller than a specified reference value; and a control means for determining a normal light beam when said maximum value detected by said detection means is greater than said specified reference value, determining an insufficient light beam quantity when said maximum value is smaller than said specified reference value and said light beam quantity detected by said light quantity detection means is smaller than a specified reference quantity, and determining a defocused light beam when said maximum value is smaller than said specified reference value and said light beam quantity satisfies said specified reference quantity.

13. A light beam scanning apparatus comprising:

a light emitting means for outputting a light beam;

a light beam scanning means for scanning said light beam output from said light emitting means onto a scanned surface in a horizontal scan direction;

a plurality of detection means each of which is formed wider than a width in a vertical scan direction of said light beam including light generated near an irradiated spot of said light beam, is arranged on said scanned surface or a position equivalent to said scanned surface so that a fine gap is provided in said horizontal scan direction, and outputs an electric signal corresponding to an irradiated light beam quantity;

a change means for changing a passage position for said vertical scan direction of said light beam scanned by said light beam scanning means in said horizontal scan direction; and a control means for controlling said light beam's passage position by using said change means so that a centrobaric position of said light beam quantity detected by two adjacent detection means out of said plurality of detection means matches a gap between said two detection means.

14. A light beam scanning method comprising:

scanning a light beam against a scanned surface so that said light beam output from a light emitting device scans on said scanned surface in a horizontal scan direction;

detecting said beam scanned in said horizontal scan direction and outputting an electric signal by using a sensor which is arranged on said scanned surface or a position equivalent to said scanned surface;

gradually moving a passage position for a vertical scan direction of said light beam scanned in said horizontal scan direction;

detecting a maximum value for said electric signal output from said sensor in response to said light beam with its passage position gradually moved;

determining a normal light beam when the detected maximum value is greater than a specified reference value; and determining a defocused light beam when said maximum value is smaller than said specified reference value.

15. The light beam scanning method according to claim 14 further comprising:

displaying occurrence of said defocused light beam when said defocused light beam is determined.

16. The light beam scanning method according to claim 14 further comprising:

sending data indicating occurrence of said defocused light beam to an external device when said light beam is determined to be defocused.

17. A light beam scanning method comprising:

scanning a light beam output from a light emitting device onto a scanned surface in a horizontal scan direction;

detecting said light beam scanned in said horizontal scan direction and outputting an electric signal by using a sensor which is arranged on said scanned surface or a position equivalent to said scanned surface;

gradually moving a passage position for a vertical scan direction of said light beam scanned in said horizontal scan direction;

detecting a maximum value for said electric signal output from said sensor in response to said light beam with its passage position gradually moved;

determining a normal light beam when the detected maximum value is greater than a specified reference value;

detecting said light beam quantity by using a light quantity detection section when said maximum value is smaller than said specified reference value;

determining an insufficient light beam quantity when said maximum value is smaller than said specified reference value and said light beam quantity is smaller than a specified reference quantity; and determining a defocused light beam when said maximum value is smaller than said specified reference value and said light beam quantity satisfies said specified reference quantity.

18. The light beam scanning method according to claim 17 further comprising:

displaying occurrence of said defocused light beam when said light beam is determined to be defocused and displaying occurrence of said insufficient light beam quantity when said light beam quantity is determined to be insufficient.

19. The light beam scanning method according to claim 17 further comprising:

sending data indicating occurrence of said defocused light beam to an external device when said light beam is determined to be defocused, and sending data indicating said insufficient light beam quantity to said external device when said light beam is determined to be insufficient.

20. A light beam scanning method comprising the steps of:

scanning a light beam output from a light emitting device onto a scanned surface in a horizontal scan direction;

detecting said light beam scanned in said horizontal scan direction and outputting an electric signal by using a sensor which is arranged on said scanned surface or a position equivalent to said scanned surface;

gradually moving a passage position for a vertical scan direction of said light beam scanned in said horizontal scan direction;

detecting a maximum value for said electric signal output from said sensor in response to said light beam with its passage position gradually moved;

determining a normal light beam when said detected maximum value is greater than a specified reference value; and determining a defocused light beam when said detected maximum value is smaller than said specified reference value.

21. A light beam scanning method comprising the steps of:

scanning a light beam output from a light emitting device onto a scanned surface in a horizontal scan direction;

detecting said light beam scanned in said horizontal scan direction and outputting an electric signal by using a sensor which is arranged on said scanned surface or a position equivalent to said scanned surface;

gradually moving a passage position for a vertical scan direction of said light beam scanned in said horizontal scan direction;

detecting a maximum value for said electric signal output from said sensor in response to said light beam with its passage position gradually moved;

determining a normal light beam when said detected maximum value is greater than a specified reference value;

detecting said light beam quantity by using a light quantity detection section when said maximum value is smaller than said specified reference value;

determining an insufficient light beam quantity when said maximum value is smaller than said specified reference value and said light beam quantity is smaller than a specified reference quantity; and determining a defocused light beam when said maximum value is smaller than said specified reference value and said light beam quantity satisfies said specified reference quantity.

* * * * *